United States Patent
Morita

(10) Patent No.: US 8,682,294 B2
(45) Date of Patent: Mar. 25, 2014

(54) WIRELESS TRANSMISSION SYSTEM

(75) Inventor: Kugo Morita, Yokohama (JP)

(73) Assignee: Kyocera Corporation, Kyoto (JP)

(*) Notice: Subject to any disclaimer, the term of this patent is extended or adjusted under 35 U.S.C. 154(b) by 592 days.

(21) Appl. No.: 11/863,146

(22) Filed: Sep. 27, 2007

(65) Prior Publication Data

US 2008/0102796 A1 May 1, 2008

Related U.S. Application Data

(62) Division of application No. 10/853,604, filed on May 25, 2004.

(30) Foreign Application Priority Data

| May 29, 2003 | (JP) | 2003-152685 |
| Jun. 30, 2003 | (JP) | 2003-187111 |
| Oct. 16, 2003 | (JP) | 2003-356499 |
| Nov. 28, 2003 | (JP) | 2003-399451 |
| Mar. 31, 2004 | (JP) | 2004-104292 |

(51) Int. Cl.
  *H04M 1/66* (2006.01)
  *H04L 9/08* (2006.01)

(52) U.S. Cl.
  USPC .................. 455/411; 380/278; 380/279

(58) Field of Classification Search
  USPC ................... 455/411; 380/278, 279
  See application file for complete search history.

(56) References Cited

U.S. PATENT DOCUMENTS

| 5,034,596 A | 7/1991 | Utsunomiya |
| 5,459,665 A | 10/1995 | Hikita et al. |
| 5,736,940 A | 4/1998 | Burgener |
| 5,778,322 A | 7/1998 | Rydbeck |
| 5,867,785 A | 2/1999 | Averbuch et al. |
| 5,873,100 A | 2/1999 | Adams et al. |
| 5,914,668 A | 6/1999 | Chavez, Jr. et al. |
| 5,917,537 A | 6/1999 | Lightfoot et al. |
| 5,955,974 A | 9/1999 | Togawa |
| 6,009,403 A | 12/1999 | Sato |
| 6,031,528 A | 2/2000 | Langfahl, Jr. |
| 6,047,376 A | 4/2000 | Hosoe |

(Continued)

FOREIGN PATENT DOCUMENTS

| EP | 0890907 A1 | 1/1999 |
| EP | 1 107 516 | 6/2001 |

(Continued)

OTHER PUBLICATIONS

Japanese language office action and its English translation for corresponding Japanese application 2003-187111.

(Continued)

*Primary Examiner* — Ariel Balaoing
(74) *Attorney, Agent, or Firm* — DLA Piper LLP (US)

(57) ABSTRACT

A communication apparatus generates authentication information for a terminal apparatus. Before establishing communication with the terminal apparatus, the communication apparatus writes information related to the communication apparatus and the authentication information into a storage medium, The terminal apparatus, to which the storage medium has been presented, transmits and receives signals to and from the communication apparatus, based upon the information related to the communication apparatus that has been written into the storage medium, and permits data communication based upon the authentication information written into the storage medium.

8 Claims, 33 Drawing Sheets

(56) References Cited

U.S. PATENT DOCUMENTS

| | | | |
|---|---|---|---|
| 6,094,659 A | 7/2000 | Bhatia | |
| 6,098,878 A * | 8/2000 | Dent et al. | 235/380 |
| 6,132,306 A | 10/2000 | Trompower | |
| 6,212,560 B1 | 4/2001 | Fairchild | |
| 6,272,598 B1 | 8/2001 | Arlitt et al. | |
| 6,278,936 B1 | 8/2001 | Jones | |
| 6,374,176 B1 | 4/2002 | Schmier et al. | |
| 6,427,073 B1 * | 7/2002 | Kortesalmi et al. | 455/414.1 |
| 6,473,704 B1 | 10/2002 | Ito et al. | |
| 6,510,496 B1 | 1/2003 | Tarui et al. | |
| 6,526,131 B1 | 2/2003 | Zimmerman et al. | |
| 6,621,452 B2 | 9/2003 | Knockeart et al. | |
| 6,760,757 B1 | 7/2004 | Lundberg et al. | |
| 7,016,323 B2 | 3/2006 | Yun et al. | |
| 7,113,110 B2 | 9/2006 | Horstemeyer | |
| 2001/0046855 A1 | 11/2001 | Kil | |
| 2002/0002602 A1 | 1/2002 | Vange et al. | |
| 2002/0002603 A1 | 1/2002 | Vange | |
| 2002/0027889 A1 | 3/2002 | Yun et al. | |
| 2002/0073240 A1 | 6/2002 | Kokkinen et al. | |
| 2002/0103934 A1 | 8/2002 | Fishman et al. | |
| 2002/0107935 A1 | 8/2002 | Lowery et al. | |
| 2002/0123340 A1 | 9/2002 | Park | |
| 2002/0129207 A1 | 9/2002 | Matsumoto et al. | |
| 2002/0133633 A1 | 9/2002 | Kumar | |
| 2002/0146980 A1 | 10/2002 | Solondz et al. | |
| 2002/0196127 A1 * | 12/2002 | Benson | 340/10.4 |
| 2003/0018428 A1 | 1/2003 | Knockeart et al. | |
| 2003/0078880 A1 | 4/2003 | Alley et al. | |
| 2003/0125083 A1 * | 7/2003 | Iwasaki | 455/558 |
| 2003/0169460 A1 | 9/2003 | Liao et al. | |
| 2003/0169715 A1 | 9/2003 | Hiramatsu et al. | |
| 2003/0177236 A1 | 9/2003 | Goto et al. | |
| 2003/0196106 A1 * | 10/2003 | Erfani et al. | 713/200 |
| 2004/0002895 A1 | 1/2004 | Asari et al. | |
| 2004/0122561 A1 | 6/2004 | Fujinuma et al. | |
| 2004/0204151 A1 | 10/2004 | Muthuswamy et al. | |
| 2004/0254717 A1 | 12/2004 | Sugahara et al. | |

FOREIGN PATENT DOCUMENTS

| | | |
|---|---|---|
| EP | 1 128 249 | 8/2001 |
| EP | 1 158 748 | 11/2001 |
| EP | 1209928 A2 | 5/2002 |
| GB | 2343334 A | 5/2000 |
| JP | 08129699 A | 5/1996 |
| JP | 09146818 A | 6/1997 |
| JP | 10243015 A | 9/1998 |
| JP | 2000182193 A | 6/2000 |
| JP | 2000-295664 | 10/2000 |
| JP | 2001-145159 | 5/2001 |
| JP | 2001189722 A | 7/2001 |
| JP | 2001-222795 | 8/2001 |
| JP | 2001-238268 | 8/2001 |
| JP | 2001-331895 | 11/2001 |
| JP | 2002109689 A | 4/2002 |
| JP | 2002-199450 | 7/2002 |
| JP | 2002-204277 A | 7/2002 |
| JP | 2002236997 A | 8/2002 |
| JP | 2002247050 A | 8/2002 |
| JP | 2002251313 A | 9/2002 |
| JP | 2002-300644 | 10/2002 |
| JP | 2002297486 A | 10/2002 |
| JP | 2002312439 A | 10/2002 |
| JP | 2002319094 A | 10/2002 |
| JP | 2002-329293 | 11/2002 |
| JP | 2002334013 A | 11/2002 |
| JP | 2002344478 A | 11/2002 |
| JP | 2003030034 A | 1/2003 |
| JP | 2003085032 A | 3/2003 |
| JP | 2003-132205 A | 5/2003 |
| JP | 2003143236 A | 5/2003 |
| JP | 2003179542 A | 6/2003 |
| JP | 2003186785 A | 7/2003 |
| JP | 2003204540 A | 7/2003 |
| JP | 2003281021 A | 10/2003 |
| JP | 2003319462 A | 11/2003 |
| KR | 20020071068 A | 9/2002 |
| KR | 20030035245 A | 5/2003 |
| WO | 01/37497 | 5/2001 |
| WO | 02/067541 | 8/2002 |
| WO | 03/007162 | 1/2003 |

OTHER PUBLICATIONS

Japanese language office action and its English language translation for corresponding Japanese application 2003-152685.

Korean language office action and its English translation for corresponding Korean Application No. 10-2006-0067851.

Japanese language office action dated Jun. 8, 2010 and its English language translation for corresponding Japanese application 2004104292.

Japanese language office action dated Jun. 22, 2010 and its English language translation for corresponding Japanese application 2007287903.

Japanese language office action dated Aug. 4, 2009 and its English language translation for corresponding Japanese application 2007083052.

Japanese language office action dated Jun. 8, 2010 and its English language translation for corresponding Japanese application 2007083052.

Japanese language office action dated Oct. 16, 2012 and its English language translation issued in corresponding Japanese application 2008301441.

Japanese language office action dated Oct. 16, 2012 and its English language translation issued in corresponding Japanese application 2010277349.

U.S. advisory action dated Oct. 18, 2012 issued in related U.S. Appl. No. 10/853,604.

U.S. office action dated Dec. 7, 2012 issued in related U.S. Appl. No. 11/863,136.

U.S. office action dated Dec. 22, 2011 for related U.S. Appl. No. 11/863,155.

Japanese language office action (decision of rejection) dated Feb. 26, 2013 and its English language translation issued in corresponding Japanese application 2010277349.

Japanese language office action (decision for dismissal of amendment) dated Feb. 26, 2013 and its English language translation issued in corresponding Japanese application 2010277349.

U.S. office action dated Feb. 15, 2012 issued in related U.S. Appl. No. 11/863,136.

Chinese language office action dated Feb. 22, 2012 and its English language translation issued in corresponding Chinese application 201010157493.1.

U.S. final office action dated Mar. 15, 2013 issued in related U.S. Appl. No. 11/863,155.

U.S. final office action dated Apr. 4, 2013 issued in related U.S. Appl. No. 11/863,136.

Chinese language office action dated Jan. 26, 2011 and its English language translation for corresponding Chinese application 201010157493.1.

Japanese language office action dated Mar. 15, 2015 and its English language translation for corresponding Japanese application 2007083052.

Japanese language office action dated Mar. 8, 2011 and its English language translation for corresponding Japanese application 2007287903.

Japanese language office action dated Arp. 12, 2011 and its English language translation for corresponding Japanese application 2008301441.

Japanese language office action dated Mar. 13, 2012 and its English language translation issued in corresponding Japanese application 200783052.

Office action dated Mar. 28, 2011 for related U.S. Appl. No. 10/853,604.

U.S. office action dated Jun. 28, 2012 issued in related U.S. Appl. No. 10/853,604.

(56) References Cited

OTHER PUBLICATIONS

U.S. office action dated Jun. 22, 2012 issued in related U.S. Appl. No. 11/863,136.
Japanese language office action dated Jul. 24, 2012 and its English language translation issued in corresponding Japanese application 2010277349.
Office Action dated Jun. 27, 2011 for related U.S. Appl. No. 11/863,136, filed Sep. 27, 2007.
European office action dated Aug. 17, 2011 for corresponding European application 08008020.3.
European office action dated Aug. 18, 2011 for corresponding European application 08008021.1.
European office action dated Aug. 18, 2011 for corresponding European application 08008022.9.
Japanese language official inquiry dated Oct. 4, 2011 and its English language translation for corresponding Japanese application 2007287903.
US office action dated Dec. 8, 2011 for related U.S. Appl. No. 10/853,604.
Korean language office action and its English translation for corresponding Korean Application No. 10-2006-006785.
European search report for corresponding European application 08008022.9-2412.
Japanese language Notice of Allowance and its English language translation for corresponding Japanese application 2004104292.
U.S. advisory action dated Jul. 22, 2013 issued in related U.S. Appl. No. 11/863,136.
U.S. office action dated May 21, 2013 issued in related U.S. Appl. No. 10/853,604.
European search report for corresponding European application 08008020.3.
Japanese language office action and its English language translation for corresponding Japanese application 2003399451.
Japanese language office action and its English language translation for corresponding Japanese application 2003356499.
European Search Report for corresponding European application No. 08008017.9-2412.
European Search Report for corresponding European application No. 08008020.3.2412.
U.S. final office action dated Nov. 29, 2013 issued in related U.S. Appl. No. 10/853,604.

* cited by examiner

| TRAFFIC PATH | TIME ZONE | URL ACCESS FREQUENCY LIST |
|---|---|---|
| PATH 1 | 6:00~10:00 | URL1:100、URL2:98、URL3:80… |
| PATH 1 | 10:00~16:00 | URL1:45、URL4:30、URL6:21… |
| PATH 1 | 16:00~20:00 | URL7:80、URL8:75、URL9:60… |
| PATH 2 | 6:00~10:00 | URL2:120、URL1:80、URL5:60… |
| PATH 2 | 10:00~16:00 | URL4:45、URL10:20、URL11:19… |
|  |  | URL9:70、URL12:60、URL9:30… |
| PATH N | 6:00~10:00 |  |
| PATH N | 10:00~16:00 | URL4:45、URL10:20、URL11:19… |
| PATH N | 16:00~20:00 | URL9:70、URL12:60、URL9:30… |

FIG. 28

| RECOGNITION NUMBER | AUTHENTICATION INFORMATION | ENCODING INFORMATION | FREQUENCY INFORMATION |
|---|---|---|---|
| A1 | B1 | C1 | f1 |
| A2 | B2 | C2 | f1 |
| ⋮ | ⋮ | ⋮ | ⋮ |
| AN | BN | CN | fi |

432

WIRELESS TRANSMISSION SYSTEM

PRIORITY CLAIM

This application is a divisional of application Ser. No. 10/853,604 filed May 25, 2004, the entire contents of which are incorporated by reference. This application also claims benefit of priority under 35 U.S.C. §119 to Japanese Patent Application No. 2003-152685 filed May 29, 2003, Japanese Patent Application No. 2003-187111 filed Jun. 30, 2003, Japanese Patent Application No. 2003-356499 filed Oct. 16, 2003, Japanese Patent Application No. 2003-399451 filed Nov. 28, 2003 and Japanese Patent Application No. 2004-104292 filed Mar. 31, 2004, the entire contents of all of which are incorporated by reference.

BACKGROUND OF THE INVENTION

1. Field of the Invention

The present invention relates to a wireless transmission system. In particular, the present invention relates to a wireless transmission system, a wireless transmission device, and a wireless transmission terminal with which, when a wireless transmission terminal which is being used by a user and which is connected to a wireless transmission device accesses the internet, the wireless transmission device utilizes the public wireless transmission network.

In particular, the present invention relates to a wireless transmission system and to a moving wireless transmission device with which, when a wireless transmission terminal which is being used by a user and which is connected to a moving wireless transmission device accesses the internet, said moving wireless transmission device utilizes the public wireless transmission network.

In particular, the present invention relates to an authentication method for specifying a device which is the object of communication, and to a wireless transmission device and a wireless terminal device which take advantage of this authentication method.

In particular, the present invention relates to a traffic management system which performs vehicle traffic management by providing information to passengers (hereinafter termed "getting off information") which is related to guiding them for getting off or the like, using a wireless transmission function which has been built into a public transport vehicle such as a bus or a train or the like.

2. Description of Related Art

In recent years, various types of wireless transmission system such as mobile telephones and wireless LANs (Local Area Networks) and the like have come into widespread use, and their accessibility has greatly increased.

For example, a household LAN can be easily set up as a wireless LAN, and it is easy to download electronic mail outside the home by using a mobile telephone, and it has become everyday practice to read home pages upon the internet in this manner.

Furthermore, wireless LAN services within vehicles such as buses or trains in which passengers ride for comparatively long time periods have been considered. With a wireless transmission system for implementing this type of wireless LAN service, a wireless LAN is set up by providing a wireless transmission device for the wireless LAN as a wireless base station within the moving vehicle. Furthermore, as an access method to external networks such as the internet or the like, this wireless transmission device is endowed with a function of connection to a mobile telephone network, which is a public wireless transmission network. By doing this, it is possible to connect to the internet from a terminal such as a wireless LAN terminal or the like which is being employed by the user within the moving vehicle, such as a notebook type personal computer or the like, via the wireless transmission device and the public wireless transmission network.

As this public wireless transmission network, a cellular system or a PHS system or the like may be considered, but in particular, there is a per se known high speed wireless transmission system according to the cdma2000 1xEV-DO standard; for example, refer to Japanese Patent Laying Open Publication 2002-300644.

However there are the following problems with, for example, a wireless LAN which is a wireless transmission system according to the above described prior art. Connection between a wireless transmission device and the public wireless transmission network is performed, according to requirements, when accessing from the wireless LAN terminal to a device upon the exterior, such as a web server upon the internet or the like. Due to this, when for example the wireless LAN terminal makes a request to example a home page, the wireless transmission device first starts a connection to the public wireless transmission network, and, when this connection has been completed, it starts to access the home page which is the objective. However, when connecting from a moving vehicle to the public wireless transmission network, sometimes a long time period is required for establishing this connection, due to reasons such as variability of the wireless propagation environment and the like. In particular, this can become prominent with a public wireless transmission network upon which the PPP (Point to Point Protocol) is used, for example a PHS (Personal Handyphone System), or a network of the so called "cdma2000 1xEV-DO" type (CDMA: Code Division Multiple Access).

Because of this, sometimes it happens that a timeout occurs when accessing a home page with an application (a browser) from the side of the wireless LAN terminal before the connection to the public wireless transmission network has been completed, and in practice, irrespective of whether or not access to the home page is actually possible, a message may be displayed upon the wireless LAN terminal to the effect that access to the home page which is the objective cannot be provided. From the point of view of the user, this means that he cannot know whether connection to the public wireless transmission network is impossible or will take a long time, or whether really it is not possible to access the home page which is the objective, and accordingly a feeling of uncertainty and disquiet is imparted to the user, so that these operational conditions are very bad. Furthermore, on the side of the wireless LAN terminal, there is the problem that the wireless transmission device undesirably accesses the wireless transmission network without any dependence upon whether or not a display is being provided to the effect that a timer of the application has timed out so that access to the home page cannot be established, which is useless.

Furthermore, with a wireless transmission system of the above described prior art type, such as for example a wireless LAN, the problems described below also occur.

When a wireless transmission device within a moving vehicle connects to a public wireless transmission network, it is not possible absolutely to guarantee success in establishing a connection, because of the fact that the state of wireless communication with the public wireless transmission network changes from moment to moment due to changes in the position of the vehicle. Furthermore, with a public wireless transmission network which uses the PPP (Point to Point Protocol), such as for example a PHS (Personal Handyphone System) or a CDMA (Code Division Multiple Access) system of the so called cdma2000 1xEV-DO type, the time which is required for connection changes according to the state of wireless communication and the number of users of the wireless communication system and so on. However, the state of wireless communication with the public wireless transmission network and the number of users of the public wireless transmission network are not known to the users within the moving vehicle. Due to this, although a user may be trying indefatigably to establish an internet connection via the public wireless transmission network, if the wireless transmission device is, for example, out of range of the service of the public wireless transmission network, then the wireless transmission terminal of the user is not able to connect to the internet. Furthermore, even if the wireless transmission terminal of the user is able to establish access to the internet, if the traffic upon the public wireless transmission network is congested, then the wireless transmission device of the user experiences an extremely slow response.

In other words, since from the point of view of the user he does not know the state of wireless communication between the wireless transmission device and the public wireless transmission network or the number of users of the public wireless transmission network, there is the problem that sometimes he does not know the reason why he cannot connect to the internet, or the reason why the response is poor, even though he has established access to the internet.

Furthermore, the provision of a wireless LAN service within a moving vehicle such as a bus or a train in which passengers ride for a comparatively long time period is being considered. With a wireless transmission system for implementing such a wireless LAN service, the wireless. LAN is set up by providing a mobile wireless transmission device for a wireless LAN as a wireless base station within the moving vehicle. Furthermore, as a method for accessing an exterior network such as the internet or the like, such a mobile wireless transmission device is endowed with a function for connection to a mobile telephone network, which is a public wireless transmission network. By doing this, it is possible to connect to the internet via the mobile wireless transmission device and the public wireless transmission network from a terminal for a wireless LAN or the like, such as a notebook type personal computer or the like, which is being used by a user within the moving vehicle.

Although, as such a public wireless transmission network, a cellular system or a PHS system or the like may be considered, in particular, as a high speed wireless transmission system, there is a known type of such system which utilizes the cdma2000 1xEV-DO format. For example, reference may be made to Japanese Patent Laying Open Publication 2002-300644.

However, there are the following problems with the above described prior art type wireless transmission systems.

When establishing a connection to the internet from a mobile wireless transmission device within the moving vehicle upon a request from the wireless LAN terminal, although a mobile telephone network—which is a public wireless transmission network—may be utilized, the communication speed of such a mobile telephone network is insufficient by comparison to that of a wireless LAN or the like, and accordingly it is difficult to provide a comfortable internet access environment. Furthermore, the state of wireless communication with the mobile telephone network may be bad due to the position of the vehicle or the like, and, if a large number of mobile telephone users who are utilizing the same base station outside the moving vehicle are present, then the communication speed becomes even slower.

In recent years, as a next generation high speed wireless transmission format, the cdma2000.1x-EV-DO format (hereinafter termed the EV-DO format) has been developed. This EV-DO format is a format according to the cdma2000 1x format which corresponds to an extended third generation cdmaOne format, and is a format which offers a specially increased speed transmission rate for data communications. Here, "EV" means "evolved", and "DO" means "data only".

With the EV-DO format, the wireless interface structure of the uplink circuit from the wireless transmission terminal to the base station is almost the same as that for the cdma2000 1X format. With regard to the wireless interface structure of the downlink circuit from the base station wire to the less transmission terminal, on the one hand, that for the band which is regulated at 1.23 MHz is identical to that for the cdma2000 1x format, while that for the modulation method or the multiplexed method is greatly different from that for the cdma2000 1x format. With the modulation method, by contrast to QPSK or HPSK which are used in the cdma2000 1x format, with the EV-DO format, QPSK, 8-PSK, or 16QAM are changed over between according to the reception conditions in the downlink circuit in the wireless transmission terminal. As a result, if the reception conditions are good, the error tolerance is low and moreover a high speed transmission rate is used, while, if the reception conditions are bad, although the speed is low, a transmission rate is used for which the error tolerance is high.

Furthermore, in a multiplexed method for performing communication simultaneously from a single base station to a plurality of wireless transmission terminals, CDMA (Code Division Multiple Access) which is used in the cdmaOne format or in the cdma2000 1x format is not utilized, but instead a TDMA (Time Division Multiple Access) method is employed, in which communication is performed with a plurality of wireless transmission terminals by dividing time into units of $1/600$ sec, and by performing communication with a single wireless transmission terminal in each of these time units, and moreover by changing over the wireless transmission terminal which is the object of communication between each time unit and the next.

A wireless transmission terminal measures the carrier to interference power ratio of a pilot signal, as a quantity representative of the reception state of the downlink circuit from the base station which is the object of communication, and estimates the state of reception of the next reception timing from changes thereof, and notifies "the highest transmission speed at which it is possible to receive with less than a predetermined error rate" which is anticipated therefrom to the base station as a data rate control bit (hereinafter "DRC"). Here, this predetermined error rate is normally about 1%, although it depends upon the system design. The base station receives DRCs from a plurality of wireless transmission terminals, and a scheduler function within the base station determines, each time division unit, with which of the wireless transmission terminals to communicate; but, in concrete terms, as high a possible transmission rate is used in communication with each of the wireless transmission terminals, based upon the DRCs from the wireless transmission terminals.

With EV-DO, and with a downlink circuit which is made in the above described manner, it is possible to obtain a maximum transmission rate of 2.4 Mbps, for each sector. However, this transmission rate is the sum, upon a single frequency band, and normally for one among a plurality of sectors thereof, of the data communication rates for the plurality of wireless transmission terminals which are connected to the single base station, and if a plurality of frequency bands are utilized, the transmission rate is also increased. For example, reference should be made to the previously mentioned Japanese Patent Laying Open Publication 2002-300644.

Apart from this type of EV-DO format, due to the extension of the regions in which LAN networks can be used to company or home environments, wireless LANs are also being developed, and recently wireless LANs which follow the IEEE802.11b standard are endowed with a capability of providing a maximum communication speed of 11 Mbps over a communication area of a radius of 50 to 100 m. Generally this diffusion is taking place due to the increase in transmission speed, the reduction in the cost of access points and mobile terminals, and the spreading of ADSL within the home environment. Furthermore, wireless networks are also being utilized outdoors, and support and service in a street environment is starting within rather limited areas. In other words, with a wireless LAN, by comparison to the EV-DO format, the service area is rather narrow, but it is possible to provide a higher transmission speed.

On the other hand, attention is also being given to provision of a wireless LAN within a vehicle such as a bus or a train or the like in which people ride for comparatively long time periods, and, within moving vehicles, communication devices are being provided which include communication means with a wireless LAN and communication means with mobile telephones, and notebook type PCs and the like within the vehicle are connected via this wireless LAN; and moreover, by connecting to the internet outside the vehicle by taking advantage of the mobile telephone network, it becomes possible for connection to be established from notebook type PCs or the like within the vehicle to the internet outside the vehicle. If such a wireless LAN within the vehicle is utilized, from the viewpoint of the service provider, it is necessary to implement an authentication procedure in order to prevent a person who is not authorized from establishing a wireless connection to the wireless LAN, and furthermore it is necessary to implement encryption in order to prevent leakage to an unintended user of the information which a user is transmitting. Normally, with a wireless LAN, as a method for making it impossible for an unauthorized user to connect to an access point, encryption keys (WEP) and MAC address registers and the like are employed. With a wireless LAN service within a vehicle or the like, limitation of the users by the use of MAC address registers cannot be performed, since wireless LAN cards or the like are not distributed to the persons who are to utilize the service. Because of this, a method is employed in which encryption keys which correspond to the access point are provided to the users in advance, and these encryption keys are set up in the terminals which are being employed by the users. Furthermore, if a charge is being made for the service itself, it is also possible to display a predetermined portal website when the user has wirelessly connected to the wireless repeater device, and to perform user authentication via a user name and a password.

Encryption for such a wireless LAN as described above can only normally be performed with a single encryption key for a single access point. Due to this, each of the users who is connected to a single access point utilizes the same encryption key. The security threshold between the users who are utilizing the same access point is low, and there is a danger that information which is being transferred via wireless transmission can be read out. In order to enhance the level of safety, it is necessary for each of the users to be provided with different encoding information and with different authentication information. When a normal type of WEP key is employed, and when this is made to correspond with an authentication procedure, at least when first connecting to the system, typically, while looking at a paper form which is distributed in advance upon which encoding information and authentication information are written, the user may input encoding information and authentication information such as a user name and a password or the like for the authentication procedure by using an input means such as a keyboard or the like while looking at his terminal screen. Normally, in the case of a moving vehicle such as a bus or a train or the like, people are sitting next to one another at such distances apart that their shoulders are in mutual contact. In this type of environment, the contents of such a paper form upon which the encoding information and the authentication information are written in advance can easily be seen by a person who is sitting next to the user, so that the level of security is not very reliable, and moreover the above mode of operation is quite troublesome for the user, since he is required to input the encryption key accurately while sitting in the bus or the train which may be swaying about, and such an encryption key is difficult for him to hold in his short term memory.

In recent years, there has been an tendency for the bandwidth of mobile telephone apparatus to be extended, and a maximum communication speed in the downlink direction of 2.4 Mbps has been implemented (for example, refer to the previously mentioned Japanese Patent Laying Open Publication 2002-300644). Furthermore, with a LAN which is used for networking an office or a household, generally nowadays a wireless LAN is set up, because it is very easy to implement and use. In this connection, in recent years, next generation wireless LANs which conform to the IEEE802.11b standard have generally become widely diffused, due to the increase in transmission speeds and the reduction in the costs of access points and of mobile terminals, and also because ADSL has also become very prevalent in the home environment. Furthermore, support service in the street (hereinafter termed street support service) and the like has also commenced, in which it becomes possible to utilize this type of wireless LAN outdoors by using a mobile telephone apparatus.

Furthermore, with a wireless LAN, the connections between terminals by physical cabling in a prior art type LAN are replaced by wireless links, so that there is a high affinity with a prior art type LAN which uses physical cabling. With this type of background, a wireless LAN of the current type is one which follows the IEEE802.11b standard, and at the maximum its transmission speed can be raised to 11 Mbps. It should be understood that, with this type of wireless LAN, the area of a single access point is narrowed down to a radius of about 50~100 m, so that a street support service for mobile telephone equipment using this type of wireless LAN is a limited one in a limited area.

On the other hand, in recent years, the transmission speed of mobile telephone apparatus has become higher and higher along with the widening of its band, but as yet the transmission speed is still slow in comparison with a wireless LAN. However, the radius of the service area of a single access point has increased to about 2 km.

Furthermore, with a wireless LAN, a mobile IP technology has become widespread in which a large number of access points are set up, in the same way as with mobile telephone apparatus, and it is possible for a mobile node to access these access points continuously while traveling past them, without changing its IP address. With this type of mobile IP, there is a home agent, which is a router which has an interface upon a home link of a mobile node, and there is a foreign agent, which is a router which has an interface upon a mobile terminal link of a mobile node; and, furthermore, a mobile node acquires a care-of address upon the mobile terminal link, and registers this care-of address in the home agent as the care-of address of the mobile terminal. On the other hand, with a home agent, by transferring the packets which have been transmitted towards a mobile agent to the care-of address which has been encapsulated, there is no change in the IP address of the mobile node, and it becomes possible to transfer packets to the mobile node which is present upon the link to the mobile terminal.

Furthermore, with an ITS (Intelligent Transport System: a high quality road traffic system) which is an integration of a car navigation system and a wide area traffic management system, it is possible to anticipate an increase in the wireless transmission capabilities of the car navigation system, and, by connection through a mobile telephone apparatus or the like, it becomes possible to access the internet or the like, and to transmit and receive electronic mail and so on. Furthermore since, along with the reduction in cost of hard disks, it is also possible to access a CD (Compact Disk) or a DVD (Digital Versatile Disk) or the like at comparatively high speed, the accumulation of road information for car navigation systems upon DVDs or HDDs (Hard Disk Drives) has much progressed recently. Moreover, the implementation of systems which take advantage of wireless as an updating method for such road information is proceeding apace.

However, even if the user can verify a timetable which has been determined in advance for a moving vehicle such as a bus or a train, he cannot know traffic information such as through what locality the vehicle is passing at the moment in real time. Furthermore, if a delay due to traffic conditions or the like has occurred, the user cannot be aware in real time how the departure time instant from a stopping point such as his desired station, or the arrival time instant at such a stopping point, is being affected.

SUMMARY OF THE INVENTION

The present invention has been conceived of in the light of this type of problem, and it takes as its objective to provide a wireless transmission system, in which, when a wireless transmission terminal which is connected to a wireless transmission device and which is being utilized by a user accesses the internet, the wireless transmission device uses a public wireless transmission network, with which uncertainty and disquiet on the part of the user when connecting to the public transmission network are alleviated.

Furthermore, another objective of the present invention is to provide a wireless transmission device and a wireless transmission terminal which are used in such a wireless transmission system.

In order to solve the above described problems, the wireless transmission system according to the present invention is a wireless transmission system in which a wireless transmission terminal which is being employed by a user performs data communication via a wireless transmission device which is connected to a public wireless transmission network, wherein: said wireless transmission device comprises: a first wireless transmission means which performs wireless transmission with said wireless transmission terminal; a second wireless transmission means which performs wireless transmission with said public wireless transmission network; a detection means which detects the state of connection to said public wireless transmission network which is connected via said second wireless transmission means; and a control means which controls transmission to said wireless transmission terminal via said first wireless transmission means of said connection state information which has been detected; and said wireless transmission terminal comprises: a third wireless transmission means which performs wireless transmission with said wireless transmission device; and a notification means which notifies said connection state information which it has received via said third wireless transmission means to the user.

And another version of the wireless transmission system according to the present invention is a wireless transmission system in which a wireless transmission terminal which is being employed by a user accesses the internet via a wireless transmission device which is connected to a public wireless transmission network, wherein: said wireless transmission device comprises: a first wireless transmission means which performs wireless transmission with said wireless transmission terminal; a second wireless transmission means which performs wireless transmission with said public wireless transmission network; a detection means which detects the state of connection to said public wireless transmission network which is connected via said second wireless transmission means; a storage means which stores a web page; and a control means which, when an access request to said internet has been made from said wireless transmission terminal, if the connection state to said public wireless transmission network is non-connected, controls transmission to said wireless transmission terminal via said first wireless transmission means of a web page which is stored in said storage means; and said wireless transmission terminal comprises: a third wireless transmission means which performs wireless transmission with said wireless transmission device; an access requesting means which makes an access request to the internet via said third wireless transmission means; and a display means which displays said web page which has been received via said third wireless transmission means after said access request.

And the wireless transmission device according to the present invention is a wireless transmission device which, based upon a data communication request from a wireless transmission terminal which is being utilized by a user, is capable of performing said data communication by connecting to a public wireless transmission network, comprising: a first wireless transmission means which performs wireless transmission with said wireless transmission terminal; a second wireless transmission means which performs wireless transmission with said public wireless transmission network; a detection means which detects the connection state to said public wireless transmission network which is connected via said second wireless transmission means; and a control means which controls transmission to said wireless transmission terminal via said first wireless transmission means of said connection state information which has been detected.

And another aspect of the wireless transmission device according to the present invention is a wireless transmission device which makes it possible to access the internet by connecting to a public wireless transmission network, based upon an internet access request from a wireless transmission device which is being employed by a user, comprising: a first wireless transmission means which performs wireless transmission with said wireless transmission terminal; a second wireless transmission means which performs wireless transmission with said public wireless transmission network; a detection means which detects the state of connection to said public wireless transmission network which is connected via said second wireless transmission means; a storage means which stores a web page; and a control means which, when an access request to said internet has been made from said wireless transmission terminal, if the connection state to said public wireless transmission network is non-connected, controls transmission to said wireless transmission terminal via said first wireless transmission means of a web page which is stored in said storage means.

The wireless transmission terminal according to the present invention is a wireless transmission terminal which performs data communication via a wireless transmission device which has been connected to a public wireless transmission network, comprising: a wireless transmission means which performs wireless transmission with said wireless transmission device; and a notification means which notifies to the user connection state information between said wireless transmission device and the public wireless transmission network which has been received from said wireless transmission device via said wireless transmission means.

And another aspect of the wireless transmission terminal according to the present invention is a wireless transmission terminal which accesses the internet via a wireless transmission device which has been connected to a public wireless transmission network, comprising: a wireless transmission means which performs wireless transmission with said wireless transmission device; an access requesting means which makes a request for access to the internet via said wireless transmission means; and a display means which displays a web page which has been received via said wireless transmission means; and wherein: if, when said access requesting means has made a request for access to the internet to said wireless transmission means, said wireless transmission means has received from said wireless transmission device a different web page from the web page for which said access request has been made, said display means displays said web page which has been received.

Furthermore, the present invention has been conceived of in the light of the above type of problem, and it takes as another of its objectives to provide a wireless transmission system, which can decide, when a wireless transmission terminal which is being used by a user and which is connected to a wireless transmission device accesses the internet via the wireless transmission device, whether or not the user is trying to establish access to the public wireless transmission network, and with which, due to this, along with promising an enhancement of the efficiency of use of the processing power and the power consumed by the wireless transmission device by performing access from the user to the public wireless transmission network in an efficient manner, it is also possible to alleviate uncertainty and disquiet on the part of the user when connecting to the public wireless transmission network.

Furthermore, another objective of the present invention is to provide a wireless transmission device and a wireless transmission terminal which are used in this wireless transmission system.

In order to solve the above described problems, the wireless transmission system according to the present invention is a wireless transmission system in which a wireless transmission terminal which is being employed by a user performs data communication via a wireless transmission device which has been connected to a public wireless transmission network, wherein: said wireless transmission device comprises: a first wireless transmission means which performs wireless transmission with said wireless transmission terminal; a second wireless transmission means which performs wireless transmission with said public wireless transmission network; a detection means which detects the state of wireless communication to said public wireless transmission network which is connected via said second wireless transmission means; and a control means which controls transmission of said information about the state of wireless communication which has been detected to said wireless transmission terminal via said first wireless transmission means; and said wireless transmission terminal comprises: a third wireless transmission means which performs wireless transmission with said wireless transmission device; and a notification means which notifies to the user said information about the state of wireless communication which has been received via said third wireless transmission means.

And another aspect of the wireless transmission device according to the present invention is a wireless transmission device which makes it possible to connect to a public wireless transmission network and to perform data communication, based upon a data communication request from a wireless transmission terminal which is being employed by a user, comprising: a first wireless transmission means which performs wireless transmission with said wireless transmission terminal; a second wireless transmission means which performs wireless transmission with said public wireless transmission network; a detection means which detects the state of wireless communication to said public wireless transmission network which is connected via said second wireless transmission means; and a control means which controls transmission of said information about the state of wireless communication which has been detected to said wireless transmission terminal via said first wireless transmission means.

And the wireless transmission terminal according to the present invention is a wireless transmission terminal which performs data communication via a wireless transmission device which has been connected to a public wireless transmission network, comprising: a wireless transmission means which performs wireless transmission with said wireless transmission device; and a notification means which notifies to a user information about the state of wireless communication between said wireless transmission device and the public wireless transmission network which it has received from said wireless transmission device via said wireless transmission means.

Moreover, the wireless transmission system according to the present invention is a wireless transmission system in which a wireless transmission terminal which is being employed by a user performs data communication via a wireless transmission device which has been connected to a public wireless transmission network, wherein: said wireless transmission device comprises: a first wireless transmission means which performs wireless transmission with said wireless transmission terminal; a second wireless transmission means which performs wireless transmission with said public wireless transmission network; a detection means which detects the number of wireless transmission terminals which are performing data communication via said second wireless transmission means; and a control means which controls transmission of said number of terminals which has been detected to said wireless transmission terminal via said first wireless transmission means; and said wireless transmission terminal comprises: a third wireless transmission means which performs wireless transmission with said wireless transmission device; and a notification means which notifies to the user said number of terminals which it has received via said third wireless transmission means.

And, the wireless transmission device according to the present invention is a wireless transmission device which makes it possible to connect to a public wireless transmission network and to perform data communication, based upon a data communication request from a wireless transmission terminal which is being employed by a user, comprising: a first wireless transmission means which performs wireless transmission with said wireless transmission terminal; a second wireless transmission means which performs wireless transmission with said public wireless transmission network; a detection means which detects the number of wireless transmission terminals which are performing data communication via said second wireless transmission means; and a control means which controls transmission of said number of terminals which has been detected to said wireless transmission terminal via said first wireless transmission means.

Furthermore, the wireless transmission terminal according to the present invention is a wireless transmission terminal which performs data communication via a wireless transmission device which is connected to a public wireless transmission network, comprising: a wireless transmission means which performs wireless transmission with said wireless transmission device; and a notification means which notifies the number of wireless transmission terminals that are performing data communication by taking advantage of said public wireless transmission network, which has been received from said wireless transmission device via said wireless transmission means.

Furthermore, the present invention has been conceived in the light of the above described problems, and another objective thereof is to provide a wireless transmission system which, if a wireless transmission terminal uses a mobile wireless transmission device which accesses the internet by taking advantage of a public wireless transmission network, can alleviate the communication burden which is imposed upon the public wireless transmission network, and can enhance the internet access environment.

Furthermore, another objective of the present invention is to provide a mobile wireless transmission device which may be used in this wireless transmission system.

In order to solve the above described problems, the mobile wireless transmission device according to the present invention is a mobile wireless transmission device which makes it possible to access the internet by connecting to a public wireless transmission network, based upon an internet access request from a wireless transmission device which is being employed by a user, comprising: a first wireless transmission means which performs wireless transmission with said wireless transmission terminal; a second wireless transmission means which performs wireless transmission with said public wireless transmission network; a first storage means which stores web pages which have been accessed via said second wireless transmission means; and a control means which, when an access request to said internet has been made from said wireless transmission terminal, searches for a web page which complies with said access request from within the web pages which are stored by said first storage means, and, if a compliant web page has been found, controls transmission of said web page to said wireless transmission terminal via said first wireless transmission means.

And, the wireless transmission system according to the present invention is a wireless transmission system in which a wireless transmission terminal which is being employed by a user accesses the internet via a mobile wireless transmission device which has been connected to a public wireless transmission network, comprising: a mobile wireless transmission device which comprises: a first wireless transmission means which performs wireless transmission with said wireless transmission terminal; a second wireless transmission means which performs wireless transmission with said public wireless transmission network; a first storage means which stores web pages which have been accessed via said second wireless transmission means; a measurement means which measures the access frequencies to web pages for which access attempts have been made via said second wireless transmission means; a second storage means which stores web pages for which it has been estimated that the access frequency is high; and a control means which, when an access request to said internet has been made from said wireless transmission terminal, searches for a web page which complies with said access request from within the web pages which are stored by said first and said second storage means, and, if a compliant web page has been found, controls transmission of said web page to said wireless transmission terminal via said first wireless transmission means; and a management device which comprises a third storage means which stores web pages in said second storage means which have been accessed by each of a plurality of said mobile wireless transmission devices in correspondence with identification information for each of said mobile wireless transmission devices.

According to the present invention as described above, since web pages upon the internet which have been accessed in the past are stored upon the mobile wireless transmission device, accordingly, when accessing a web page for a second time, it is possible to take advantage of said stored web pages. Since, due to this, the frequency with which the mobile wireless transmission device makes use of the public wireless transmission network to access the internet is reduced, accordingly it is possible to alleviate the communication burden which is imposed upon the public wireless transmission network, and it is accordingly possible to anticipate an enhancement of the internet access environment within the moving vehicle.

The present invention has been conceived in the light of recognition of these kind of conditions, and one of its objectives is to provide an authentication method and a communication device and a terminal device which utilize this method, which can ensure a high level of safety with a simple method of actuation.

Another preferred embodiment of the present invention is a communication device. This device comprises: a generating means which generates authentication information for a terminal device; a storage means which stores information related to said communication device; a writing in means which writes said authentication information which has been generated and said information related to said communication device which has been stored into a storage medium; an ejection means which ejects said storage medium to the exterior of said communication device; a communication means which transmits and receives signals to and from a terminal device to which said storage medium has been presented, based upon said information related to said communication device which has been written into said storage medium; an acquiring means which acquires authentication information from said terminal device via said communication means; an authentication means which authenticates said terminal device, based upon said authentication information which has been acquired and said authentication information which has been generated; and a permission means which permits data communication between said terminal device which has been authenticated and said communication means.

"Eject" does not only refer to the case of forcible expulsion to the outside, but also includes the case of voluntary removal by the user himself.

With the above device, since the storage medium upon which the authentication information has been written is ejected to the exterior, and authentication is performed via the wireless network for the terminal device which has acquired the authentication information from said storage medium, accordingly leakage of the authentication information is prevented.

Another preferred embodiment of the present invention is a terminal device. This terminal device comprises: a presentation reception means which physically receives presentation from an external device of a storage medium into which information related to a communication device which is an object of communication, and authentication information, have been written; an acquisition means which acquires, from said storage medium which has been presented and received, said information related to said communication device which is an object of communication, and said authentication information; a communication means which transmits and receives signals to and from said communication device which is an object of communication, based upon said information related to said communication device which is an object of communication which has been acquired; a generating means which generates, from said authentication information which has been acquired, a signal for an authentication procedure for said communication device which is an object of communication; and a command means which commands transmission of said signal for said authentication procedure which has been generated, and which, when said communication device which is an object of communication has been authenticated, commands data communication with said communication means.

With the above device, since the storage medium upon which the authentication information has been written is presented from the wireless device which is to be the object of communication, and the authentication information is acquired from said storage medium, and a request is made to the wireless device for authentication via the wireless network, accordingly leakage of the authentication information is prevented.

Another preferred embodiment of the present invention is an authentication method. With this method, before establishing communication with a terminal device, a communication device writes information related to said communication device and authentication information into a storage medium, and said terminal device which has received presentation of said storage medium performs transmission and reception of signals to and from said communication device, based upon said information related to said communication device which has been written into said storage medium, and moreover permits data communication based upon said authentication information which has been written into said storage medium.

Moreover, it should be understood that any combination of the above structural elements, i.e. of the method, the device, the system, the recording medium, and the computer program according to the present invention, and any variation thereof, would be a valid preferred embodiment of the present invention.

According to the present invention, it is possible to ensure a high level of safety with a simple actuation procedure.

Furthermore, the present invention has been made in the light of the problems described above, and it takes as one of its objects to provide a traffic management system which can perform traffic management appropriately by notifying traffic information to a portable terminal which is being carried by a passenger who is riding within a moving vehicle such as a bus or a train or the like.

Therefore, the traffic management system according to the present invention comprises a management center which comprises a management means which manages the traffic states of a plurality of vehicles, and a vehicle which comprises a transmission means which transmits said traffic state via a network to said management center, wherein: said management center comprises an estimation means which, from the traffic states of said plurality of vehicles, estimates the traffic time of each vehicle, and a traffic time transmittal means which transmits the traffic time which has been estimated by said estimation means to each vehicle via said network; and said vehicle comprises a reception means which receives the traffic time that has been estimated by said estimation means, and a notification means which notifies the traffic time which has been received by said reception means.

According to the traffic management system of the present invention as described above, a wireless LAN is set up within a vehicle such as a bus or a train or the like, and, via this wireless LAN, a stopping reservation for a station or a stopping point at which a passenger within the vehicle who is carrying a portable terminal wishes to get off the vehicle is registered in advance from the portable terminal upon a sub-computer. When this is done, based upon traffic information from a host computer, the sub-computer notifies the getting off reservation information via this portable terminal before the vehicle arrives at the station or stopping point for which the getting off reservation has been made. By doing this, the passenger is able to get off at the station or the stopping point at which he wishes to get off reliably, even if he should miss hearing an audio guide to this station or stopping point at which he wishes to get off. In other words since, according to this traffic management system according to the present invention, a passenger who is riding in the vehicle such as a bus or the like can make a reservation for the stopping point at which he plans to get off before passing the stopping point one before the one for which he wants to make the getting off reservation, accordingly if he does not hear the broadcast within the bus, or if he cannot see a display board upon which the next stopping point is displayed, still he is able reliably to notify the attendant of the moving vehicle of the fact that he wishes to get off. Furthermore, since it is possible, based upon the information related to the getting off reservation which has been provided by the passenger, for a notification to the effect that the stopping point at which the passenger plans to get off is the next stopping point to be received by the portable terminal which this passenger is carrying, accordingly it is possible reliably to prevent in advance the occurrence of a situation such as the passenger passing the stopping point at which he plans to get off due to not paying attention.

Furthermore, according to the traffic management system of the present invention as described above, as a function which is similar to that of a car navigation system, it is possible for the present position of the moving vehicle to be determined by a system upon a host computer which is provided upon the ground, using actual position data and actual traffic speed data, and for the journey time instant and/or the required time for passing a specified ground point to be notified to the portable terminal. For example, it is possible to reflect the state of congestion upon the road by calculating the journey time to the next stopping point at the time point of passing the stopping point directly before by taking advantage of the data such as the time period required by the bus which is running one before this bus, and it is possible to estimate the time instant of arrival of the bus at its next stopping point comparatively accurately.

Yet further, according to the traffic management system of the present invention as described above, when a getting off reservation is made, along with notifying the attendant to the effect that this getting off reservation has been made, also it is possible forcibly to press a getting off button which is provided within the vehicle, thus illuminating the getting off button and sounding a buzzer or the like. By doing this, along with notifying to all the passengers that the bus will stop at the next stopping point, by also instructing the attendant to stop the bus, it is possible to cause the bus to stop at the stopping point for which the reservation has been made accurately and smoothly in an efficient manner.

According to the traffic management system of the present invention as described above, by registering in advance the stopping point at which a passenger wishes to get off from his portable terminal upon a sub-computer as getting off reservation information, it is possible for the sub-computer to notify the getting off reservation information automatically to the portable terminal of the passenger shortly before the stopping point at which he wants to get off. By doing this, the passenger who is carrying the portable terminal is able reliably to get off at the stopping point for which he has made the getting off reservation. Furthermore, a passenger who is waiting at the stopping point for the bus is able to await the bus with a spiritually calm feeling, since a time instant at which it is anticipated that the bus will arrive at the stopping point which reflects the current traffic conditions may be displayed upon his portable terminal.

As has been explained above, according to the traffic management system of the present invention as described above, a user who is taking advantage of a moving vehicle such as a bus or a train does not need to consult a timetable which is determined upon in advance, and can be informed in real time of traffic information such as where the bus is at the present moment. Furthermore, even if due to traffic conditions or the like a delay in traffic has occurred, the user is able to know in real time what type of influence is being exerted upon the departure time instant from or the arrival time instant at his stopping point such as his desired station or the like.

BRIEF DESCRIPTION OF THE DRAWINGS

FIG. 28 is a figure showing the data structure of information related to terminal devices which has been stored in a storage section which is shown in FIG. 27.

FIG. 37 is a schematic figure showing, in a preferred embodiment of the present invention, how an arrival time instant is estimated, in consideration of the number of passengers for a stopping point and the weather and so on.

DESCRIPTION OF THE PREFERRED EMBODIMENTS

In the following, various preferred embodiments of the present invention will be described with reference to the appended drawings.

Figure 1:
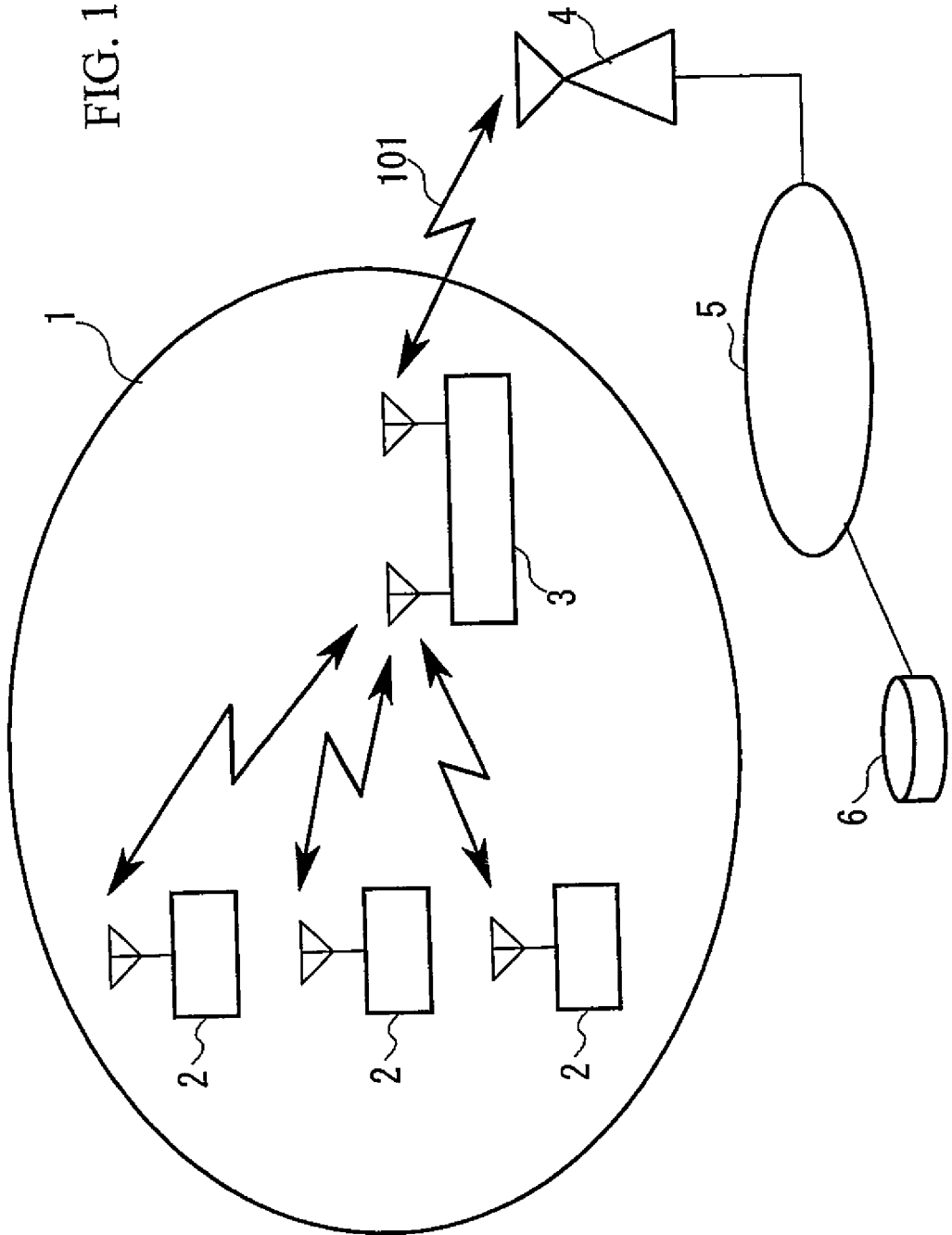
FIG. 1 is a block diagram showing the structure of a wireless transmission system 1 (a wireless LAN) according to a preferred embodiment of the present invention.

FIG. 1 is a block diagram showing the structure of a wireless transmission system 1 which is a preferred embodiment of the present invention. In this figure, the reference symbol 1 denotes a wireless LAN system, which comprises a number of wireless LAN terminals 2 and a wireless transmission device 3. This wireless LAN is set up within a moving vehicle such as a bus or a train or the like. As this wireless LAN 1, for example, there may be utilized one which conforms to the standard "IEEE802.11b"

The wireless LAN terminals 2 are endowed with the function of acting as wireless transmission terminals for the wireless LAN 1. As these wireless LAN terminals 2, for example, there may be utilized notebook type personal computers, portable type terminals such as those termed "PDA"s (Personal Digital Assistants: information devices for individual use), or the like.

The wireless transmission device 3 is endowed with the function of serving as a wireless base station and server for the wireless LAN 1. Each of the wireless LAN terminals 2 is connected to the wireless transmission device 3 via wireless, and is capable of communicating with that wireless transmission device 3. Furthermore, since each of the wireless LAN terminals 2 is connected via wireless with the wireless transmission device 3, it is capable of accessing the internet and the like via that wireless transmission device 3.

Furthermore, the wireless transmission device 3 comprises a means for connection to, for example, a mobile telephone network, which is one example of a public wireless transmission network (hereinafter termed an external network). The wireless transmission device 3 is connected via wireless to a mobile telephone base station 4, and establishes a wireless transmission circuit 101 for external access between itself and that mobile telephone base station 4. This mobile telephone base station 4 is a wireless base station of a mobile telephone network in which, for example, the PPP protocol is used. For example, it may be a wireless base station of a TDMA type PHS, or of a CDMA type network of the so called "cdma2000 1xEV-DO" type. This wireless transmission circuit 101 for external access is established via PPP. When this wireless transmission circuit 101 for external access is established, the wireless LAN terminal 2 is able to connect to the internet 5 via the wireless LAN 1 and the mobile telephone network. By doing this, the wireless LAN terminal 2 is able to access a web server 6, for example, so that the user is able to read any desired home page.

Figure 2:
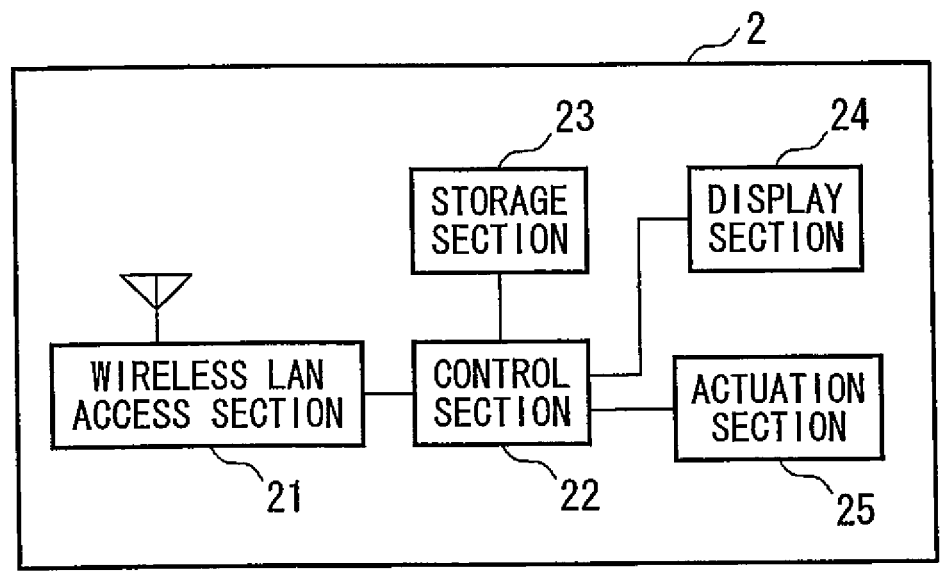
FIG. 2 is a block diagram showing the structure of a wireless LAN terminal 2 according to a preferred embodiment of the present invention.

FIG. 2 is a block diagram showing the structure of a wireless LAN terminal 2 according to a preferred embodiment of the present invention. In this figure, the wireless LAN terminal 2 comprises a wireless LAN access section 21, a control section 22, a storage section 23, a display section 24, and an actuation section 25.

The wireless LAN access section 21 transmits and receives wireless signals to and from the wireless transmission device 3. The control section 22, along with processing the signals which are transmitted and received by the wireless LAN access section 21, controls the various sections of the wireless LAN terminal 2. The storage section 23 is accessed by the control section 22, and stores various types of data. The display section 24 comprises a display device such as a LED or a liquid crystal display panel or the like, and a display control circuit. And the actuation section 25 comprises an input device such as a keyboard or the like.

The control section 22 is endowed with various types of network service function such as an electronic mail function, a function of reading home pages (a web browser function), and the like. Furthermore, as a means for notifying the user of the wireless transmission connection state, it is endowed with a function of displaying upon the display section 24 the state of the wireless connection with the wireless transmission device 32 and with a function of displaying upon the display section 24 the state of connection from the wireless LAN 1 to the external network (the connection to the wireless transmission circuit 101 for external access).

Figure 3:
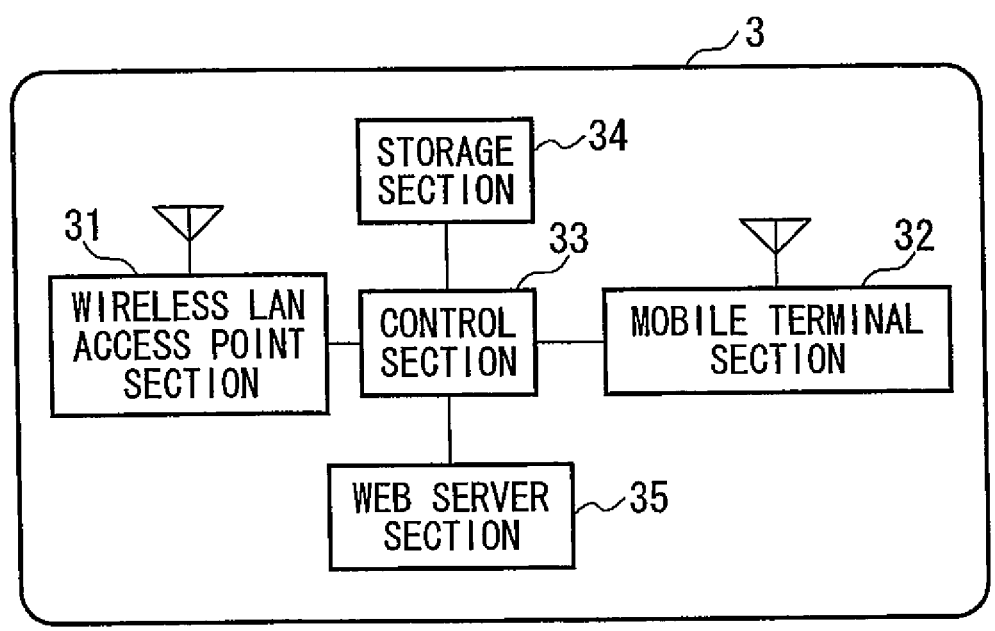
FIG. 3 is a block diagram showing the structure of a wireless transmission device 3 according to the first preferred embodiment of the present invention.

FIG. 3 is a block diagram showing the structure of the wireless transmission device 3 according to the first preferred embodiment of the present invention. In this figure, the wireless transmission device 3 comprises a wireless LAN access point section 31, a mobile terminal section 32, a control section 33, a storage section 34, and a web server section 35.

The wireless LAN access point section 31 sends and receives wireless signals to and from each of the wireless LAN terminals 2, and performs data communication by establishing a wireless transmission circuit with each of the wireless LAN terminals 2. The mobile terminal section 32 sends and receives wireless signals to and from the mobile telephone base station 4 of the external network, and performs data communication by establishing the wireless transmission circuit 101 for external access.

The control section 33, along with processing the data which is send and received by each of the wireless LAN access point section 31 and the mobile terminal section 32, also controls each of the sections of the wireless transmission device 3. The storage section 34 is accessed by the control section 33, and stores various items of data. And the web server section 35 opens home pages in order to provide them to the wireless LAN terminals 2.

The control section 33 is endowed with the function of relaying communication between the wireless LAN terminals 2 and the exterior of the wireless LAN 1. Furthermore, it is endowed with the function of notifying to the wireless LAN terminals 2 the state of their wireless connections to the external network.

Figure 4:
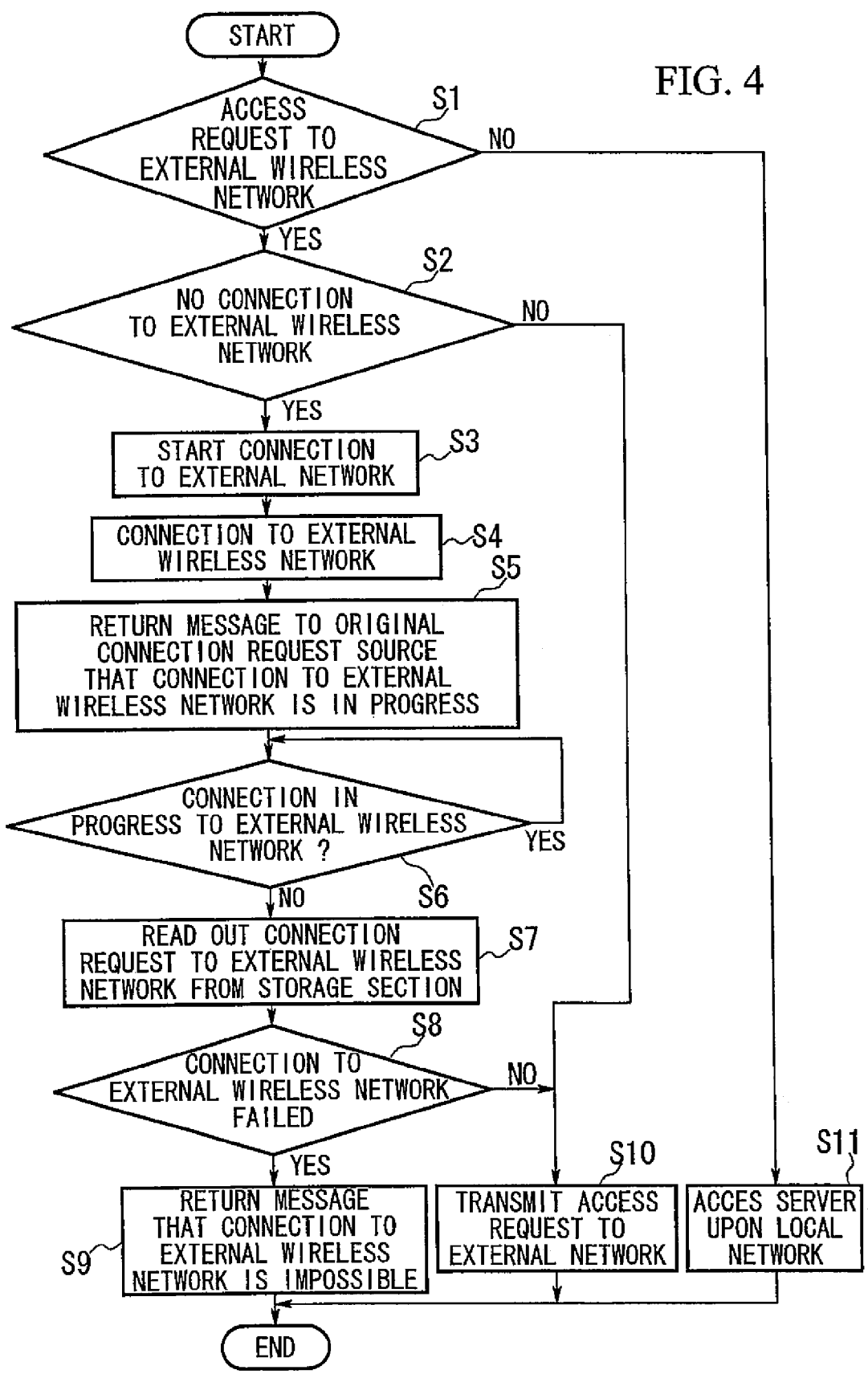
FIG. 4 is a flow chart showing the flow of a communication control procedure which is performed by the wireless transmission device of FIG. 3.
Figure 5:
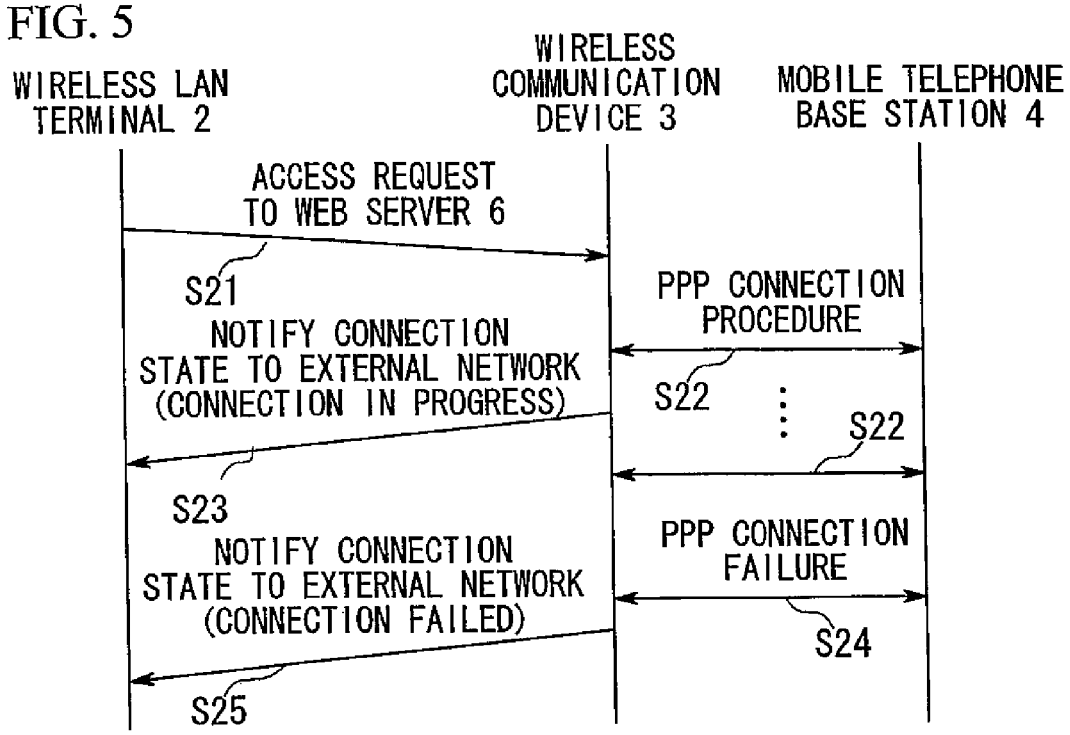
FIG. 5 is a sequence chart showing the flow of a communication control procedure with a wireless LAN 1 according to the first preferred embodiment of the present invention.
Figure 6:
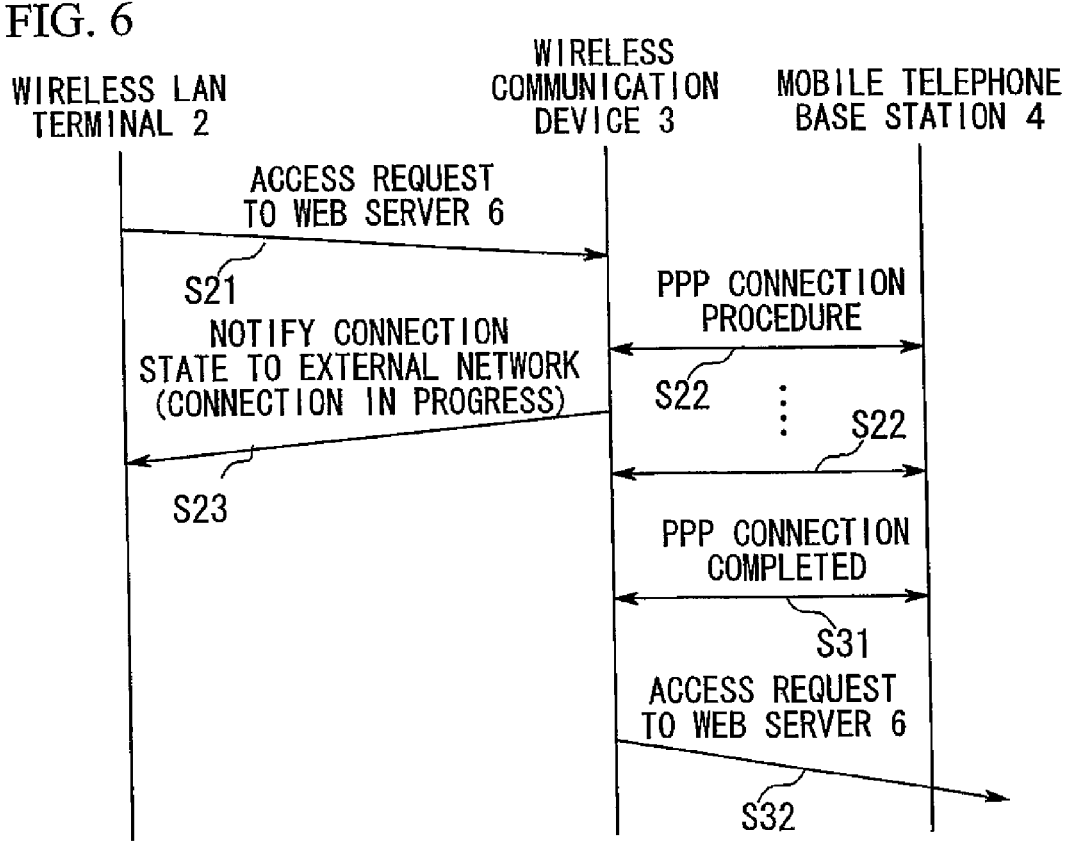
FIG. 6 is a sequence chart showing the flow of a communication control procedure with a wireless LAN 1 according to the first preferred embodiment of the present invention.

Next, with reference to FIGS. 4 through 6, the operation related to communication control for the wireless LAN 1 according to the first preferred embodiment of the present invention will be explained. FIG. 4 is a flow chart showing the communication control procedure which is performed by the wireless transmission device 3 of the above described FIG. 3. And FIGS. 5 and 6 are sequence charts showing the flow of the communication control procedure for the wireless LAN 1 according to the first preferred embodiment of the present invention.

Referring to FIG. 4, when the wireless transmission device 3 receives an access request (a packet) from a wireless LAN terminal 2, it inspects the destination of the said packet, and makes a decision as to whether or not that destination is the external network (in a step S1). Here, if the destination is not the external network, then (in a step S11) it accesses the appropriate server within the wireless LAN 1 (for example the web server section 35).

If in the step S1 the result of the decision is that the destination is the external network, then the flow of control proceeds to a step S2, in which the connection state to the external network is decided upon. Here, if a connection to the external network is already operational, then an access request to the external network is transmitted (in a step S10) via the mobile terminal section 32 to the external network.

If the result of the decision in the step S2 is that there is no connection to the external network, then the flow of control proceeds to a step S3, in which, along with starting a connection to the external network, the access request which has been received from the wireless LAN terminal 2 is stored in the storage section 34 (in a step S4).

Next, a message is returned to the wireless LAN terminal 2 which is the original transmission source of said access request to the effect that a connection is being established to the external network (in a step S5). When it has received this message, the wireless LAN terminal 2 displays said message which it has received. By doing this, the user is able to recognize that at the present time a connection is being established to the external network.

Next, when the connection procedure to the external network is completed, the wireless transmission device 3 reads out from the storage section 34 the access request which is stored (in steps S6 and S7). Next, a decision is made as to whether or not the connection to the external network has succeeded or has failed (in a step S8). Here, if the connection to the external network has failed, a message is returned to the wireless LAN terminal 2 which is the original transmission source for said access request to the effect that connection with the external network is impossible (in a step S9). The wireless LAN terminal 2 which has received this message displays said message which has received. By doing this, the user is able to recognize that the wireless transmission device 3 has not been able to establish a connection to the external network.

If the result of the decision in the step S8 is that the connection to the external network has been successful, then the wireless transmission device 3 transmits said access request via the mobile terminal section 32 to the external network (in a step S10).

In FIG. 5 there is shown a sequence chart for the case in which, in the above described communication control procedure for the wireless LAN 1, the connection to the external network has failed. In this example shown in FIG. 5, first, the wireless LAN terminal 2 requests access to the internet 5 to the web server 6 (in a step S21). Upon this access request, the wireless transmission device 3, along with starting a PPP connection procedure with the mobile telephone base station 4 (in a step S22), also transmits "connecting" as an external network connection state notification to said wireless LAN terminal 2 (in a step S23). And when (in this case) said PPP connection fails (in a step S24), the wireless transmission device 3 transmits "connection failed" as an external network connection state notification to said wireless LAN terminal 2 (in a step S25). Due to this, upon the wireless LAN terminal 2, first, a message to the effect that connection to the external network is taking place is displayed, and thereby the user is notified that connection to the external network is taking place; and, subsequently, a message to the effect that connection to the external network has failed is displayed, and thereby the user is notified that connection to the external network has failed.

In FIG. 6 there is shown a sequence chart for the case in which, in the above described communication control procedure for the wireless LAN 1, the connection to the external network has succeeded. In this example shown in FIG. 6, in the same manner as with the above described FIG. 5, first, the wireless LAN terminal 2 requests access to the internet 5 to the web server 6 (in a step S21). Upon this access request, the wireless transmission device 3, along with starting a PPP connection procedure with the mobile telephone base station 4 (in a step S22), also transmits "connecting" as an external network connection state notification to said wireless LAN terminal 2 (in a step S23). And when (in this case) said PPP connection succeeds (in a step S31), the wireless transmission device 3 transmits the access request to the web server 6 to the mobile telephone network (in a step S32). Due to this, the access request from the wireless LAN terminal 2 to the web server 6 is executed.

It should be understood that, upon completion of the PPP connection, it will also be acceptable for the wireless transmission device 3 to transmit "connection completed" as an external network connection state notification to the wireless LAN terminal 2 which was the original source of the external access request. By doing this, a message to the effect that connection to the external network has been successful is displayed upon the wireless LAN terminal 2 which was the original source of the external access request, so that the user thereof may be notified of the fact that the connection to the external network has been successful.

According to the above described first preferred embodiment of the present invention, since the connection state to the external network is notified to the user by notifying it to the wireless LAN terminal 2 which was the original source of the external access request, thereby it is possible for the user to recognize definitely and unambiguously the connection state during external access, and uncertainty and disquiet upon the part of the user when connecting to an external network are alleviated. As a result, the level of reliability of the wireless transmission service from the point of view of the user is enhanced, and the excellent beneficial result is attained of contribution to the expansion of the wireless transmission service.

Figure 7:
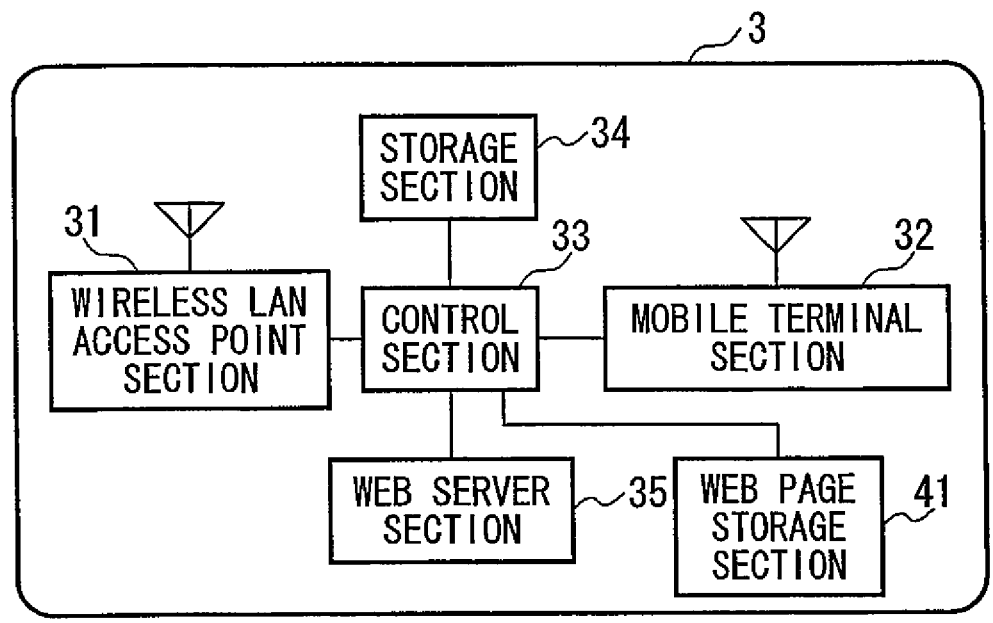
FIG. 7 is a block diagram showing the structure of a wireless transmission device 3 according to the second preferred embodiment of the present invention.

Next, a second preferred embodiment of the present invention will be explained. With this second preferred embodiment, the wireless transmission device 3, when notifying the external network connection state, transmits a web page (for example, an HTML document) which is stored upon the wireless transmission device 3 to the wireless LAN terminal 2, and causes it to be displayed thereon. FIG. 7 is a block diagram showing the structure of the wireless transmission device 3 according to this second preferred embodiment of the present invention. In the wireless transmission device 3 which is shown in FIG. 7, to the structure of the first preferred embodiment of the present invention which was described above and shown in FIG. 3, there is additionally provided a web page storage section 41. This web page storage section 41 stores a web page (for example, an HTML document). The objective of this web page is to prevent a timeout of the browser function of the wireless LAN terminal 2, and it is primarily for showing upon the wireless LAN terminal 2 that the wireless transmission device 3 is attempting to establish a connection to the external network. And, during the notification of the external network connection state in the steps S5 and S9 of FIG. 4 described above, the control section 33 transmits said web page to the wireless LAN terminal 2. And, by displaying this web page, it is possible to cause the state of the connection to the external network to be displayed.

It should be understood that, when the connection to the external network has been completed, the web page to which access has been requested is transmitted to the wireless LAN terminal 2.

The data of this web page is received by the wireless LAN terminal 2 which was the original source of said access request, and is displayed thereupon. Furthermore, upon said wireless LAN terminal 2, by the data of said web page being received, the occurrence of a timeout when accessing the home page, which is one of the functions of a web browser, is prevented. Due to this, when the wireless transmission device 3 is connecting to an external network, along with it being possible for the user definitely and unambiguously to recognize the connection state during external access, it is also possible for uncertainty and disquiet on the part of the user to be alleviated, since the web browser as well does not perform any timeout display; and, when the connection to the external network has been completed, the web page which has been requested by the wireless LAN terminal 2 is displayed thereupon.

Figure 8:
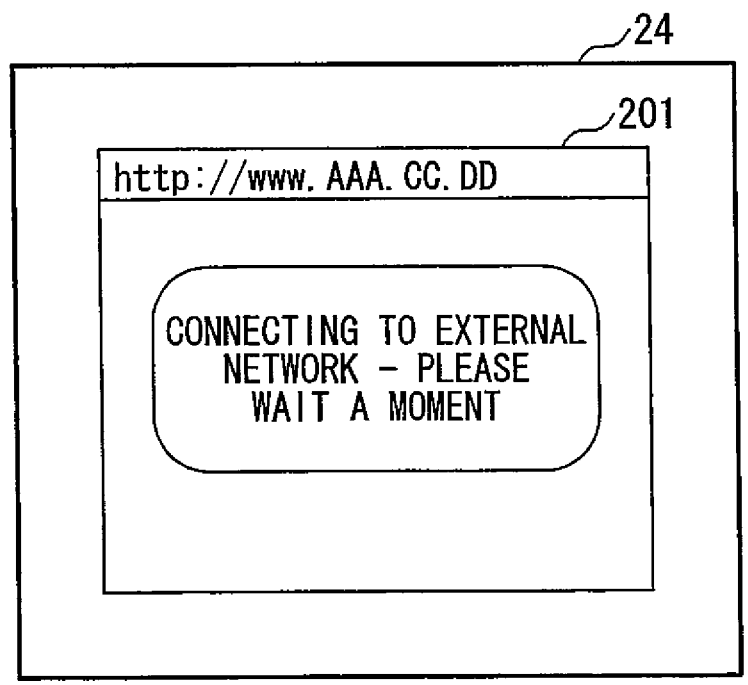
FIG. 8 is a figure showing an example of the structure of a web page.

FIG. 8 is a figure showing a constructional example of a web page on which a message to the effect that connection to an external network is in progress has been displayed. In the example shown in this figure, a web page screen 201 which is stored by the wireless transmission device 3 is being displayed upon the display section 24 of the wireless LAN terminal 2. And a message is being displayed upon said web page screen 201 for notifying to the user the fact connection to an external network is in progress, and that it will take some time before the connection is completed.

It should be understood that, as such a web page, it would also be acceptable to provide one which consisted of a plurality of frames, with information which the wireless transmission device 3 provides (advertisements and so on) being displayed in one of these frames, and the display relating to the fact that connection is under way being provided in another one of these frames, or the like.

Figure 9:
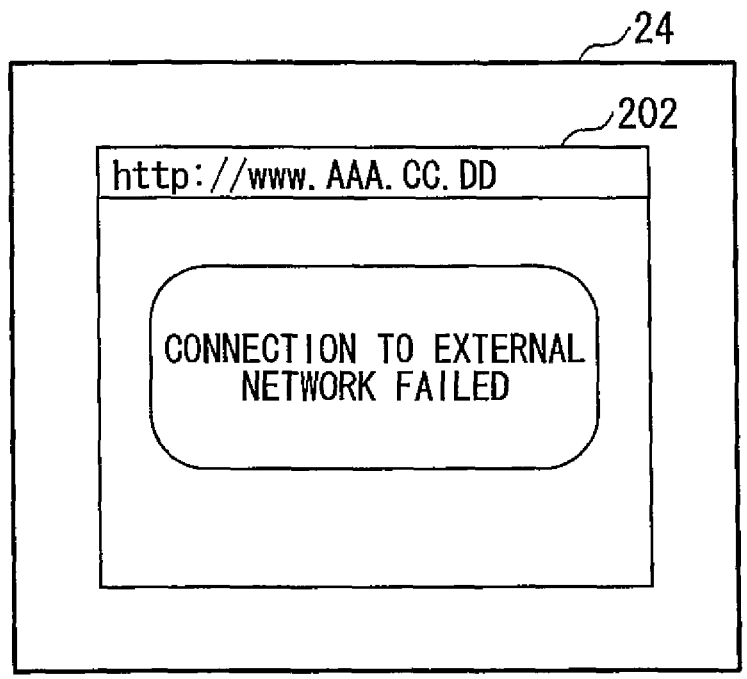
FIG. 9 is a figure showing an example of the structure of a web page.

FIG. 9 is a figure showing a structural example of a web page upon which a message has been displayed to the effect that connection to the external network has failed. In the example shown in this figure, the web page screen 202 is being displayed upon the display section 24 of the wireless LAN terminal 2. And a message for notifying to the user that the connection to the external network has failed is being displayed upon this web page 202.

Figure 10:
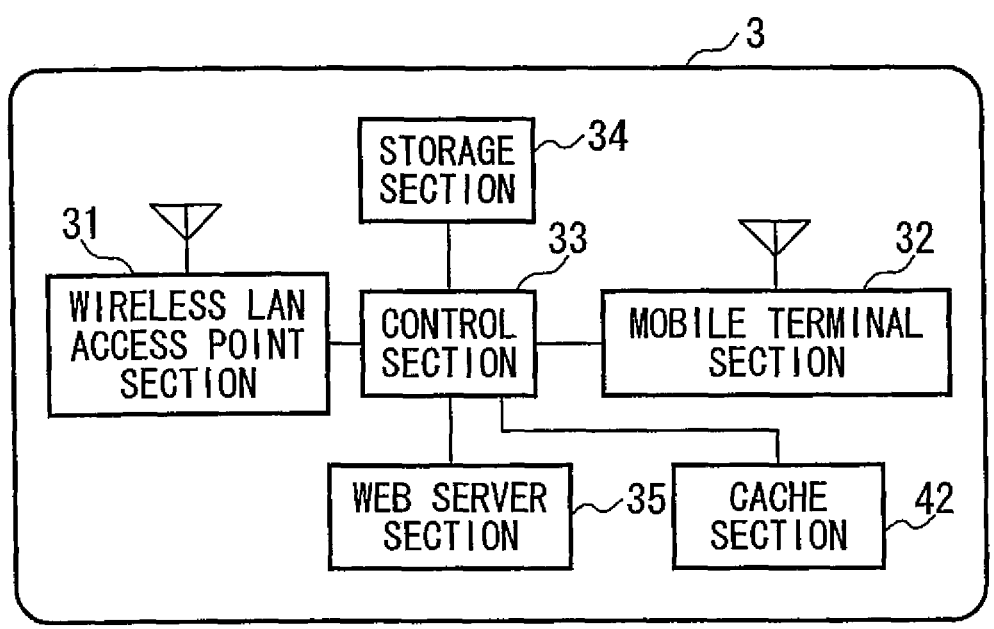
FIG. 10 is a block diagram showing the structure of a wireless transmission device 3 according to the third preferred embodiment of the present invention.

Next, a third preferred embodiment of the present invention will be explained. In this third preferred embodiment, if the wireless transmission device 3 has cached a screen consisting of the web page with the address which is being requested by the wireless LAN terminal 2, then the wireless transmission device 3, during the period while it is connecting to the external network, displays this cached data upon the wireless LAN 2. FIG. 10 is a block diagram showing the structure of the wireless transmission device 3 according to this third preferred embodiment of the present invention. This figure shows that this wireless transmission device additionally incorporates a cache section 42, in addition to the elements shown in FIG. 3 which were incorporated in a previously described preferred embodiment of the present invention. This cache section 42 is endowed with the function of storing page data which has been accessed. And, during the external network connection state notification procedure in the step S5 of the above described FIG. 4 flow chart, if the cache section 42 has stored the page data for the same address as the one which has been requested, the control section 33 transmits said page data in the cache section 42 to the wireless LAN terminal 2 which was the original source of the external access request.

This page data is received by said wireless LAN terminal 2 which was the original source of the access request, and is displayed thereby. Furthermore, the occurrence of a timeout upon said wireless LAN terminal 2 during the access to the web page is prevented by its receiving this page data. In this manner, along with uncertainty and disquiet upon the part of the user while he is standing by being alleviated since the page screen which is cached is displayed until the connection to the external network is completed, also the newest version of the page is displayed when the connection to the external network is completed.

Next, a fourth preferred embodiment of the present invention will be explained. This fourth preferred embodiment is different from the above described first rough third preferred embodiments, in that it is arranged for an enquiry about the external network connection state to be transmitted from the wireless LAN terminal 2 to the wireless transmission device 3. In this fourth preferred embodiment, the wireless LAN terminal 2 stores a program which can operate upon the wireless LAN terminal 2. This program is an autonomously operating type computer program, and it is for implementing the function of enquiring about the external network connection state from the wireless LAN terminal 2 to the wireless transmission device 3.

Figure 11:
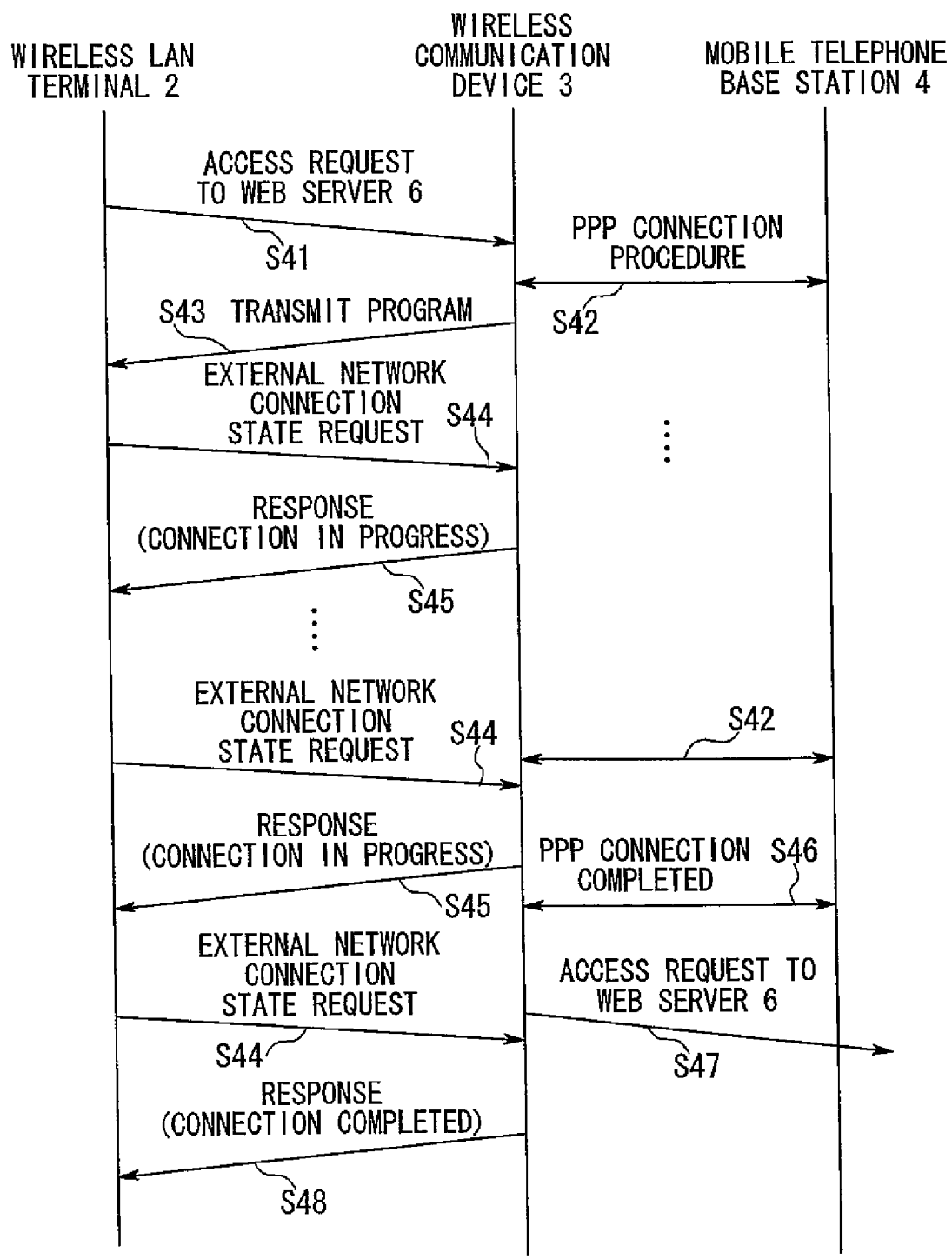
FIG. 11 is a sequence chart showing the flow of a communication control procedure with a wireless LAN 1 according to the fourth preferred embodiment of the present invention.

Next, with reference to FIG. 11, the operation of this fourth preferred embodiment of the present invention will be explained. In FIG. 11, there is shown a sequence chart which gives the flow of the communication control procedure with the wireless LAN 1 according to this fourth preferred embodiment of the present invention. In FIG. 11, first, the wireless LAN terminal 2 makes an access request to the web server 6 over the internet (in a step S41). Upon this access request, along with the wireless transmission device 3 starting a PPP connection procedure with the mobile telephone base station 4 (in a step S42), it also transmits a stored program to said wireless LAN terminal 2 (in a step S43).

Next, when it receives this program, the wireless LAN terminal which was the source of the external access request executes said program, and periodically transmits an external network connection state request to the wireless transmission device 3 (in a step S44). When the wireless transmission device 3 receives this external network connection state request, it responds with the current connection state. With the response in the step S45, "connecting" is returned as a response, since as yet the PPP connection is not completed. By doing this, a message to the effect that connection to the external network is still being established is displayed upon the wireless LAN terminal 2 which was the original source of the external access request, and thereby the user is notified that connection to the external network is still being established.

Next, if the PPP connection is completed (in a step S46), the wireless transmission device 3 transmits to the external network an access request to the web server 6 (in a step S47). Furthermore, due to the completion of the PPP connection, the wireless transmission device 3 transmits "connection completed" as a response to the external network connection state request (in a step S48). By doing this, a message to the effect that connection to the external network has been successfully established is displayed upon the wireless LAN terminal 2 which was the original source of the external access request, and thereby the user is notified that connection to the external network has succeeded.

According to the above described fourth preferred embodiment of the present invention, it is possible to acquire the external network connection state autonomously from the side of the wireless LAN terminal.

It should be understood that, in the above described fourth preferred embodiment of the present invention, it would also be acceptable for the wireless LAN terminal 2 to contain the program in advance.

Furthermore it would be acceptable, when an access request to the external network arrives from a wireless LAN terminal 2, for the wireless transmission device 3 not immediately to transmit said access request to the external network immediately after the PPP connection has been completed, but instead to transmit said access request to the external network, after the PPP connection has been completed, upon the condition that an external network connection state request has been received from the wireless LAN terminal 2 which was the original source of the external access request. By doing this, transmission of useless packets (access requests) to the external network is prevented, even if the wireless LAN terminal 2 has withdrawn the access request.

Furthermore, it would also be acceptable for the wireless LAN terminal 2 to store up the external access request which has been transmitted, and, when a connection completed with the external network has been received, to again transmit this access request, and for the wireless transmission device 3, upon this access request, to transmit said access request to the external network.

Although, in the above, certain preferred embodiments of the present invention have been described in detail with reference to the drawings, the concrete details of the structure are not to be considered as being limited to those described above with regard to these preferred embodiments; rather, various changes and alterations may be made in the details of any particular embodiment, provided that the gist of the present invention is adhered to.

For example, the notification means in the wireless LAN terminal 2 which notifies the state of wireless connection to the external network is not to be considered as being limited to the one which provides the above described screen display. It would be acceptable for the wireless LAN terminal 2 to notify the state of wireless connection to the external network by turning on a display lamp, or the like. Furthermore, it would also be acceptable to notify the state of wireless connection to the external network by emitting a sound such as a beep or the like.

Yet further, the wireless LAN 1 may acceptably be one which is set up in a fixed operational environment, such as a LAN within a home or a small office or the like.

Even further, the public wireless transmission network for external access may acceptably be a wireless transmission network which is accessed via a communication connection protocol other than the PPP protocol.

Moreover, it would be possible to the user to verify the state of connection before making an access request to the external network, provided that it is arranged for the wireless transmission terminal always to receive, and to notify, the connection state with the external network.

As has been explained above, according to this preferred embodiment of the present invention, if the wireless transmission terminal which is being used by the user accesses, via a wireless transmission device which is connected to the public wireless transmission network, a network such as the internet or the like which is external to the wireless transmission device, it is possible to alleviate uncertainty and disquiet on the part of the user by notifying the connection state between the wireless transmission device and the public wireless transmission network to the user. As a result, the beneficial results are obtained that the degree of confidence which the user accords to the wireless transmission service is enhanced, and that thereby a contribution is made to the dissemination of wireless transmission services.

Figure 12:
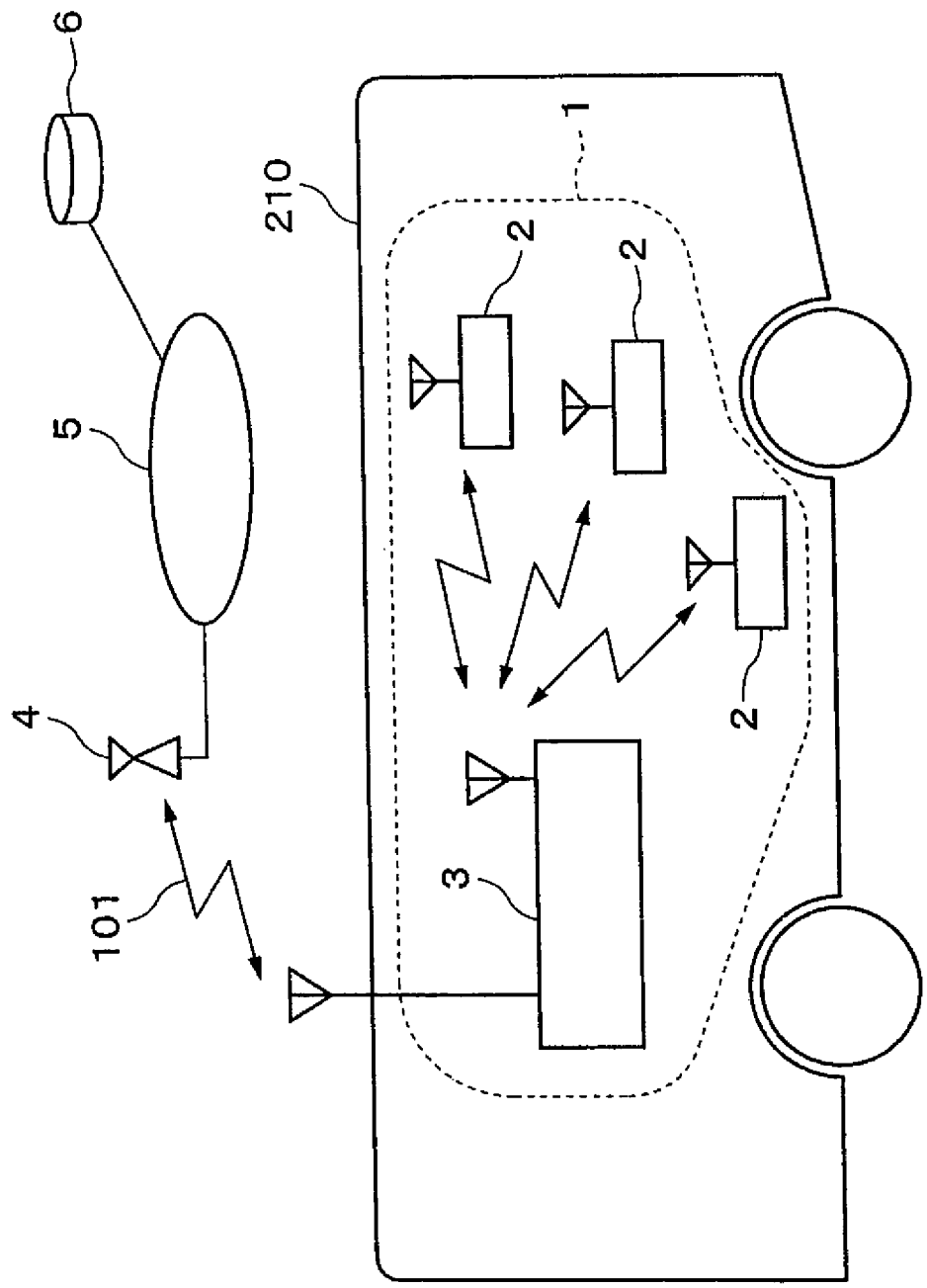
FIG. 12 is a block diagram showing the structure of a wireless transmission system 1 (a wireless LAN system) according to a preferred embodiment of the present invention.

FIG. 12 is a block diagram showing the structure of a wireless transmission system according to another preferred embodiment of the present invention. In this figure, apart from the fact that a moving vehicle 210 like a bus or a train or the like is shown with certain of the components of the wireless transmission system mounted therein, the other details are the same as those shown in FIG. 1 with reference to the first preferred embodiment of the present invention. Accordingly, the explanation of this FIG. 12 will be curtailed.

A block diagram showing the structure of a wireless LAN terminal 2 according to a preferred embodiment of the present invention is shown in FIG. 2. Since the explanation of this wireless LAN terminal 2 has already been given above, here it will be curtailed.

However, the following matters have been added. The control section 22 is endowed with various network service functions, such as an electronic mail function, a function of reading home pages (a web browser function), and the like. Furthermore, as a means for notifying to the user the state of wireless transmission connection, it is, further endowed with a function of displaying upon a display section 24 information about the state of wireless communication which gives the state of wireless communication (the state of the wireless transmission circuit 101 which is used for external access) between the wireless transmission device 3 and the external network, and with a function of displaying the number of users of the external network (the number of terminals currently in use) upon the display section 24. The information about the state of wireless communication and the number of terminals in use are items of information which are referenced by the user of the wireless LAN terminal 2 when utilizing the external network. In the following explanation, the information about the state of wireless communication and the number of terminals in use will collectively be referred to as external network utilization information.

Figure 13:
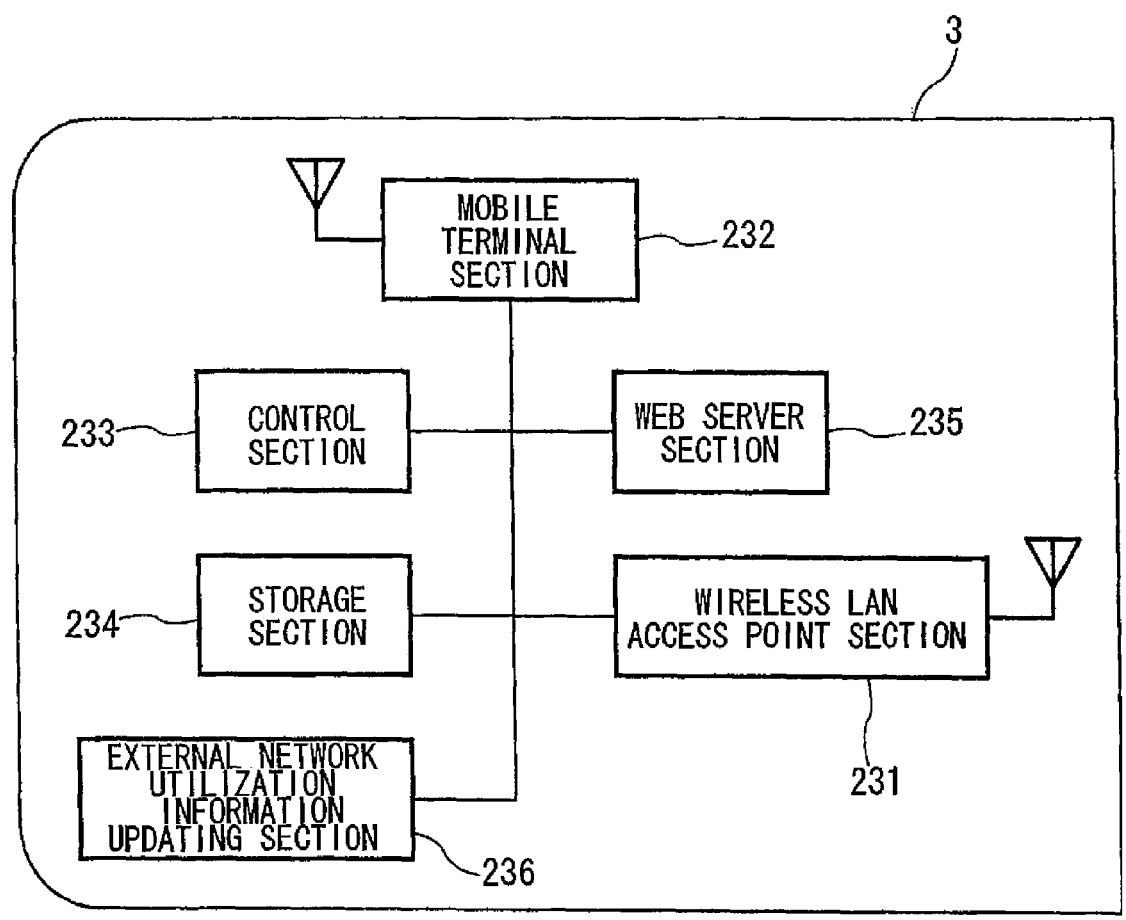
FIG. 13 is a block diagram showing the structure of a wireless transmission device 3 according to a preferred embodiment of the present invention.

FIG. 13 is a block diagram showing the structure of a wireless transmission device 3 according to another preferred embodiment of the present invention. In this figure, the wireless transmission device 3 comprises a wireless LAN access point section 231, a mobile terminal section 232, a control section 233, a storage section 234, a web server section 235, and an external network utilization information updating section 236.

The wireless LAN access point section 231 transmits and receives wireless signals between itself and each of the wireless LAN terminals 2, and performs data communication by establishing wireless transmission circuits with each of the wireless LAN terminals 2.

The mobile terminal section 232 transmits and receives wireless signals between itself and a mobile telephone base station 4 of the external network, and performs data communication by establishing a wireless transmission circuit 101 for external access. Furthermore, the mobile terminal section 232 is endowed with a function of measuring information about the state of wireless communication which specifies the state of wireless communication with the external network.

As this type of information about the state of wireless communication, for example, there may be suggested the received electric field intensity, the amount of wireless transmission bandwidth which is allocated, or the like. Furthermore, the mobile terminal section 232 detects the number of the wireless LAN terminals 2 which are currently being used for performing data communication with the external network (the number of terminals in use).

The control section 233, along with processing the data which is transmitted and received by each of the wireless LAN access point section 231 and the mobile terminal section 232, also controls each of the sections of the wireless transmission device 3. The storage section 234 stores various types of data which are accessed by the control section 233. And the web server section 235 opens home pages for provision thereof to the wireless LAN terminals 2.

The external network utilization information updating section 236 acquires, from the mobile terminal section 232, external network utilization information (the information about the state of wireless communication and the number of terminals in use), and stores this information in the storage section 234. And the external network utilization information updating section 236 periodically acquires said external network utilization information from the mobile terminal section 232, and updates the external network utilization information which is stored in the storage section 234.

The above described control section 233 is endowed with the function of relaying communication between the wireless LAN terminals 2 and the exterior of this wireless LAN system 1. Furthermore, the control section 233 is endowed with the function of notifying the external network utilization information which is stored in the storage section 234 to the wireless LAN terminals 2.

Figure 14:
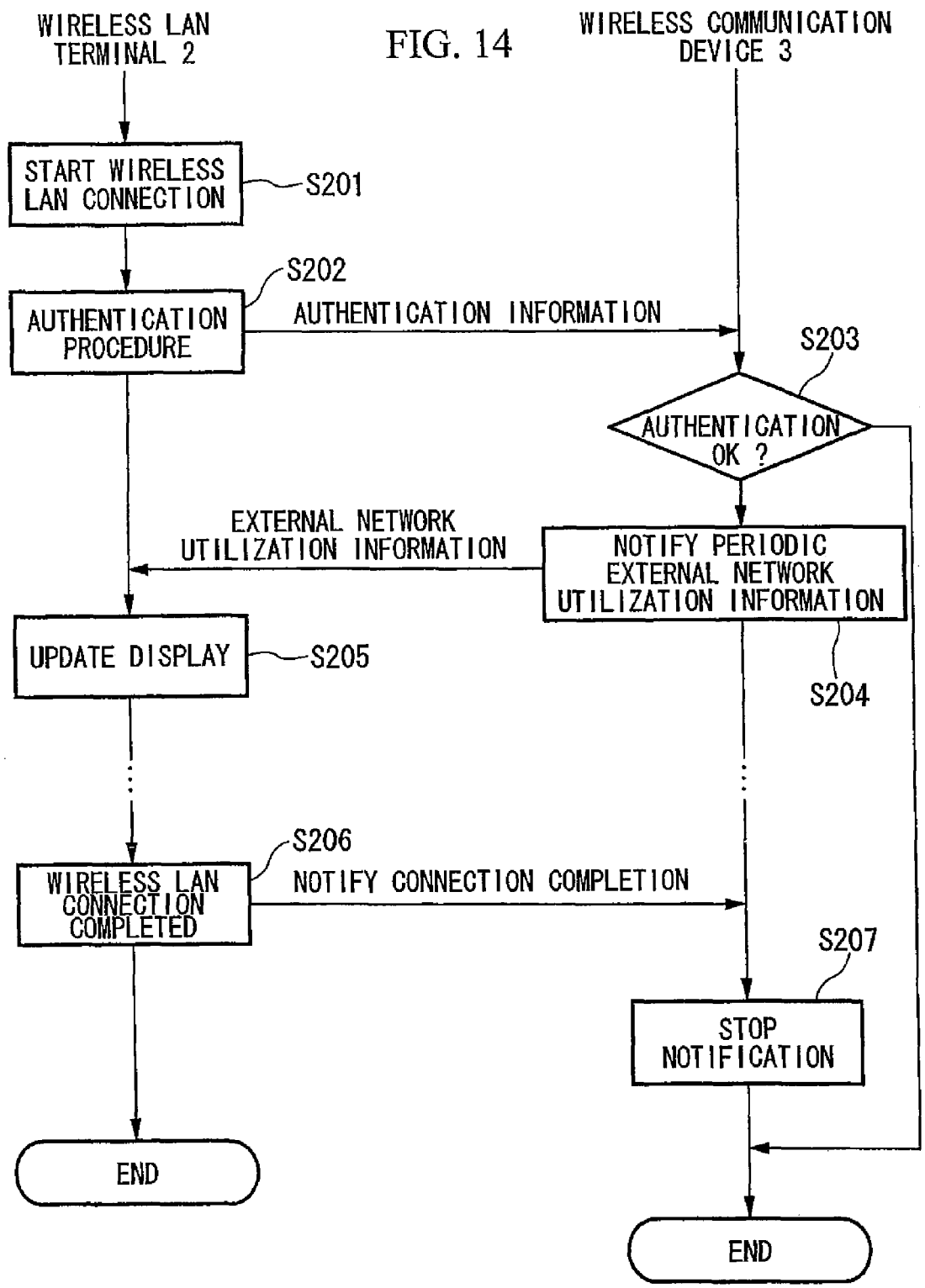
FIG. 14 is a sequence chart showing the flow of a communication control procedure with a wireless LAN system 1 according to the fifth preferred embodiment of the present invention.

Next, the operation for communication control of a wireless LAN system 1 according to a fifth preferred embodiment of the present invention will be explained with reference to FIG. 14. FIG. 14 is a sequence chart showing the flow, within the communication control procedure of the wireless LAN system 1 according to this fifth preferred embodiment of the present invention, of the processing related to notification of external network utilization information.

As the normal processing of the wireless transmission device 3, the mobile terminal section 232 detects the external network utilization information (the information about the state of wireless communication and the number of terminals in use) at a predetermined period, for example once per second. Furthermore, the external network utilization information updating section 236 acquires the external network utilization information from the mobile terminal section 232 at a predetermined period, for example at a period (such as 3 seconds) which is greater than the detection period by the mobile terminal section 232, and updates the external network utilization information which is stored in the storage section 234.

Referring to FIG. 14, first, the wireless LAN terminal 2 starts wireless LAN connection (in a step S201). And it transmits authentication information to the wireless transmission device 3 and performs an authentication procedure (in a step S202). In this authentication information, there may be utilized individual identification information which is recorded in a vehicle ticket of the vehicle 210, or a control ticket for transportation payment, a prepaid card or the like for transportation payment, or the like. Furthermore, it may also take advantage of a card which is specific to the individual, such as for example the card number of a credit card or the like.

Next, when it receives the authentication information from the wireless LAN terminal 2, the control section 233 of the wireless transmission device 3 tests that this authentication information is genuine, and if it is genuine it decides that authentication has been performed (in a step S203). Next, in the case that authentication has succeeded, the control section 233 reads out the external network information which is stored in the storage section 234 in a predetermined cycle, and transmits it to the appropriate one of the wireless LAN terminals 2 (in a step S204). Desirably, the external network utilization information is read out from the storage section 234 and is transmitted to the wireless LAN terminal 2 at a period (for example 3 seconds) which is greater than the updating period of the external network utilization information by the external network utilization information updating section 236.

When it receives the external network utilization information from the wireless transmission device 3, the control section 22 of the wireless LAN terminal 2 displays this external network utilization information which it has received upon the screen of the display section 24. And, upon receiving the external network utilization information, the control section 22 updates the contents of the screen display of the display section 24 with this external network utilization information which it has received (in a step S205). By doing this, the user is able to make a decision as to whether or not to attempt to establish connection to the external network, based upon the state of wireless communication between the wireless transmission device 3, and the number of terminals in use. For example, if the state of wireless communication is bad, he may cease his attempt to establish access to the external network. Or, if the number of terminals in use is great, he may wait to try to establish access to the external network until the number of terminals in use has diminished.

The procedure of the above described steps S204 and S205 is executed continuously until the wireless LAN connection for the wireless LAN terminal 2 has been completed. Next, when the wireless LAN connection for the wireless LAN terminal 2 has been completed, the wireless transmission device 3 stops the notification of the external network utilization information (in steps S206 and S207).

According to the above described fifth preferred embodiment of the present invention, since the external network utilization information (the information about the state of wireless communication between the wireless transmission device 3 and the external network, and the number of terminals in use upon the external network) is notified by being notified to the wireless LAN terminal 2, accordingly it is possible for the user to make a decision as to whether or not to try to access the external network, based upon said external network utilization information. As a result, because, for example it may be expected that the user will abstain from accessing the external network if the wireless state is bad, accordingly it becomes possible to utilize the processing capabilities of the wireless transmission device 3, and the electrical power which it consumes, in an efficient manner, since the connection to the external network is performed efficiently.

Furthermore, from the point of view of the user, since the cause of his having difficulty in accessing the external network is understood to be the poorness of the state of wireless communications, or the great number of terminals in use, accordingly his uncertainty and disquiet are alleviated. Furthermore, it is very convenient for the user to use this system, since he is able to apprehend the external network utilization information by a procedure which he himself initiates.

Next, a sixth preferred embodiment of the present invention will be explained. The point in which this sixth preferred embodiment differs from the fifth preferred embodiment of the present invention described above, is that the external network utilization information is requested from the wireless LAN terminal 2 to the wireless transmission device 3. In this sixth preferred embodiment of the present invention, the wireless LAN terminal 2 stores a program which can operate upon said wireless LAN terminal 2. This program is a computer program of an autonomously operating type, and it is one which implements a function of requesting the external network utilization information from the wireless LAN 2 to the wireless transmission device 3, and a function of performing control for notifying this external network utilization information.

Figure 15:
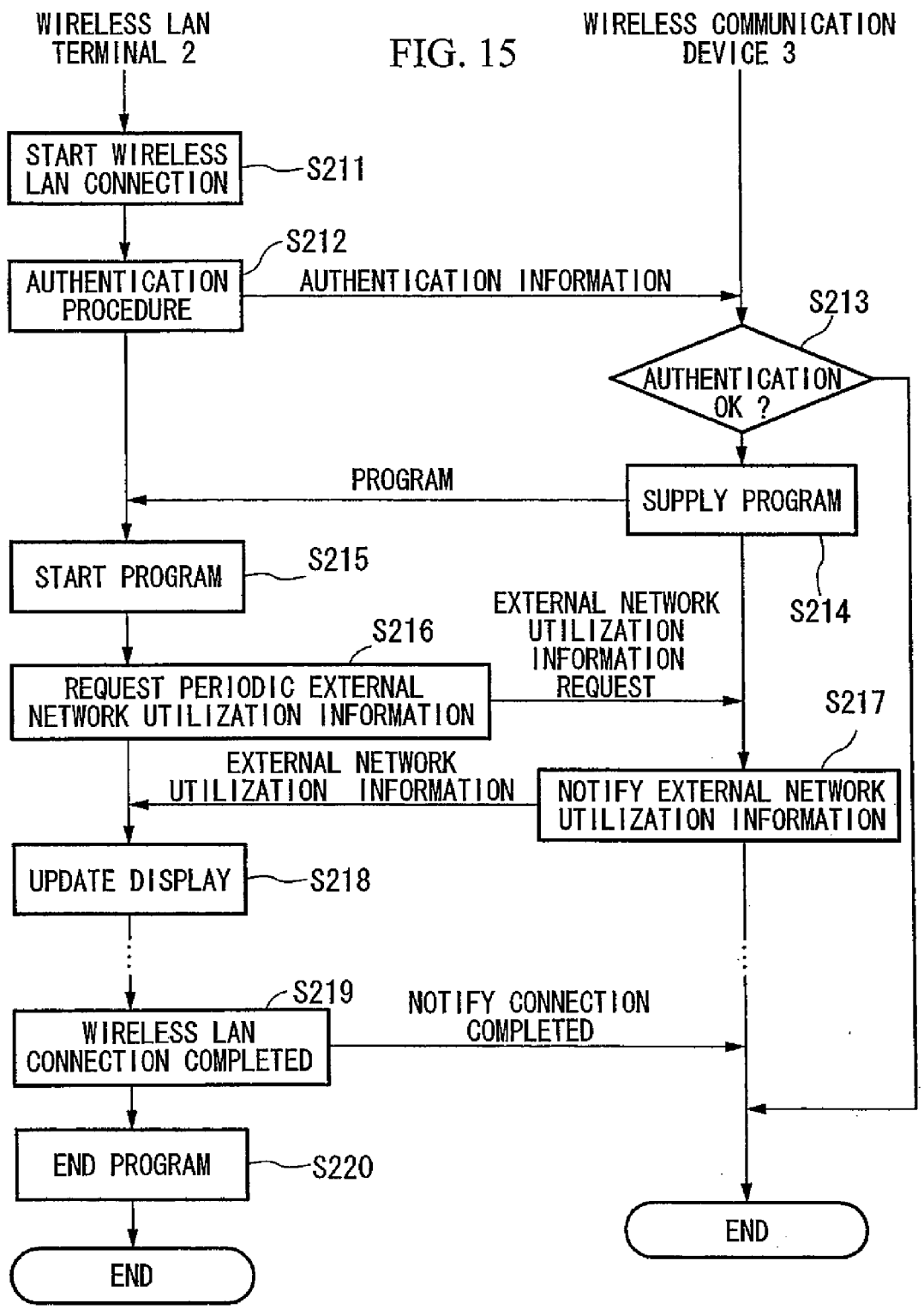
FIG. 15 is a sequence chart showing the flow of a communication control procedure with a wireless LAN system 1 according to the sixth preferred embodiment of the present invention.

Next, the operation of this sixth preferred embodiment of the present invention will be explained with reference to FIG. 15. FIG. 15 is a sequence chart showing, in the communication control procedure of the wireless LAN system 1 according to this sixth preferred embodiment of the present invention, the flow of a procedure which is related to notification of the external network utilization information.

In this sixth preferred embodiment, just like the first preferred embodiment of the present invention described above, as the normal processing of the wireless transmission device 3, the mobile terminal section 232 periodically detects the external network utilization information, and the external network utilization information updating section 236 periodically acquires the external network utilization information from the mobile terminal section 232 and updates the external network utilization information in the storage section 234.

Referring to FIG. 15, first, the wireless LAN terminal 2 starts the procedure of wireless LAN connection (in a step S211). And it transmits authentication information to the wireless transmission device 3 and performs an authentication procedure (in a step S212). When it receives this authentication information from the wireless LAN terminal 2, the control section 233 of the wireless transmission device 3 verifies that this authentication information is genuine, and if it has been verified to be genuine, it makes the decision that authentication has been successful (in a step S213). Next, if the authentication has been successful, the control section 233 transmits the program that is stored in the storage section 234 to the wireless LAN terminal 2 (in a step S214).

When it receives this program, the wireless LAN terminal 2 starts the operation of the program, and periodically requests the external network utilization information from the wireless transmission device 3 (in steps S215 and S216). When it receives this request, the control section 233 of the wireless transmission device 3 reads out the external network utilization information which is stored in the storage section 234, and transmits it to said wireless LAN terminal 2 (in a step S217).

When it receives the external network utilization information from the wireless transmission device 3, the wireless LAN terminal 2 displays this external network utilization information which it has received upon the screen of the display section 24. And, each time it receives the information about the state of wireless transmission and so on, it updates the contents of the screen display of the display section 24 with the external network utilization information which it has received (in a step S218). By doing this, it is possible for the user to make a decision as to whether or not to try to access the external network, based upon the external network utilization information (in other words, based upon the information relating to the state of wireless communication with the external network, and upon the number of terminals of the external network which are in use).

The processing of the above described steps S216 through S218 is continually executed until the wireless LAN connection of the wireless LAN terminal 2 has been completed. Next, when its wireless LAN connection has been completed, the wireless LAN terminal 2 terminates the program (in steps S219 and S220).

Thus, according to the above described sixth preferred embodiment of the present invention, it is possible to acquire the external network utilization information autonomously from the side of the wireless LAN terminal.

It should be understood that, in the above described sixth preferred embodiment of the present invention, it would also be acceptable to provide the program in advance in the wireless LAN terminals 2.

Next, a concrete example of display of the external network utilization information in the above described preferred embodiments of the present invention will be explained. FIGS. 16 through 19D are figures showing examples of display of such external network utilization information.

Figure 16:
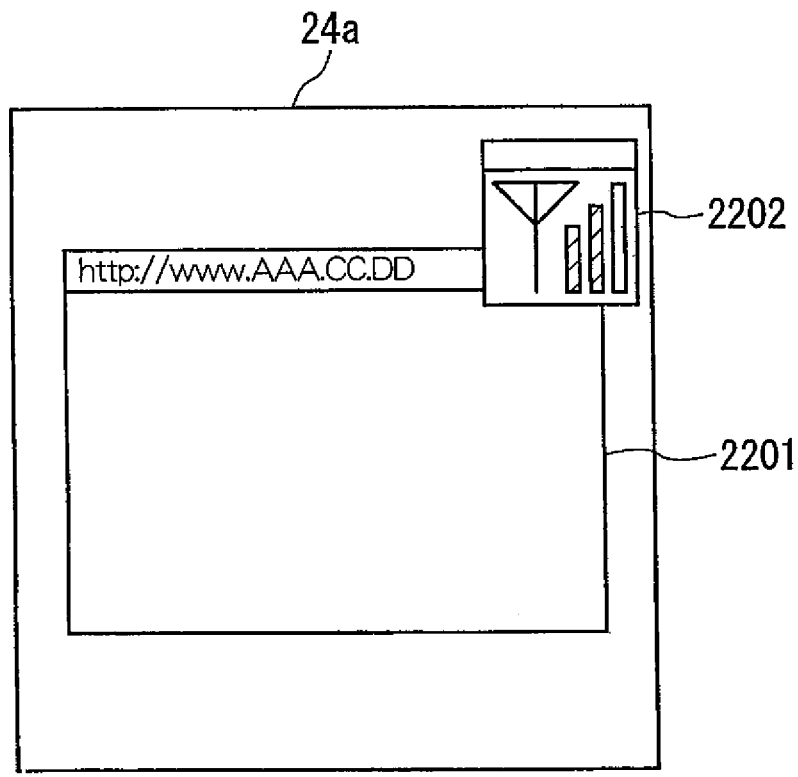
FIG. 16 is a figure showing an example of the structure of a display screen 24 of the wireless LAN terminal 2.

FIG. 16 is a figure showing an example of the structure of a display screen 24*a* of the display section 24 of the wireless LAN terminal 2. In the example shown in FIG. 16, along with a web screen 2201, an external network utilization information screen 2202 is displayed upon the display screen 24*a*. The external network utilization information screen 2202 is a screen upon which the external network utilization information is displayed. This external network utilization screen 2202 is set to a size with which the external network utilization information can be recognized by the user. Desirably, it is as small a screen as possible. By doing this, it is possible to display the external network utilization information without interposing any obstacle to other displays upon the display screen 24. Furthermore it may be arranged to call up the external network utilization information screen 2202, and to close it, as required, by a predetermined actuation of the actuation section 25.

Figure 17:
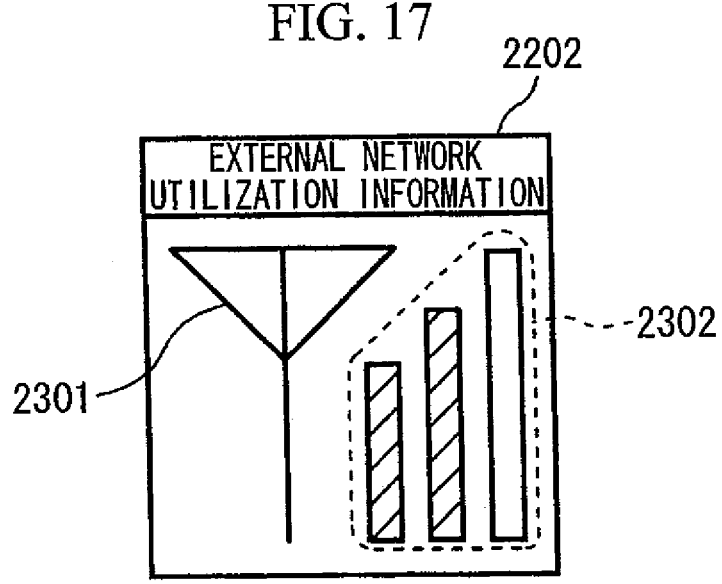
FIG. 17 is a figure showing an example of a first structure of an external network utilization information screen 2202.

FIG. 17 is a figure showing a first example for the structure of the external network utilization information screen 2202. In the example shown in this FIG. 17, the received electric field intensity is utilized in the external network utilization information as the information about the state of wireless communication. In this figure, along with a display 2301 representing an antenna, the received electric field intensity is displayed in a display region 2302 as one of three levels. In the example shown in FIG. 17, the power level of a received signal is at level 2. Since the power level of the received signal is taken in this manner as being a criterion of the state of wireless communication between the wireless transmission device 3 and the external network, it becomes possible for the user to tell at a glance whether this state of wireless transmission is good or bad, and this is extremely easy for the user to understand.

Figure 18A:
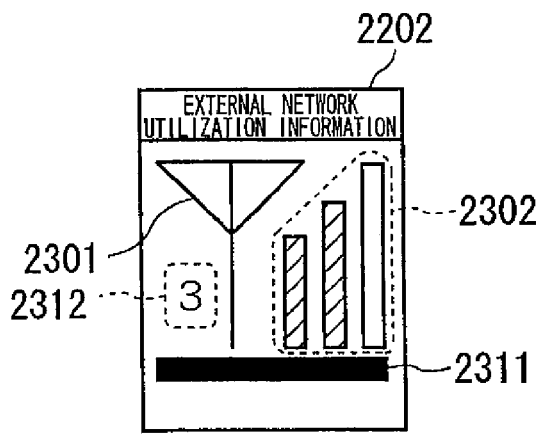
FIGS. 18A and 18B are figures showing examples of a second structure of the external network utilization information screen 2202.
Figure 18B:
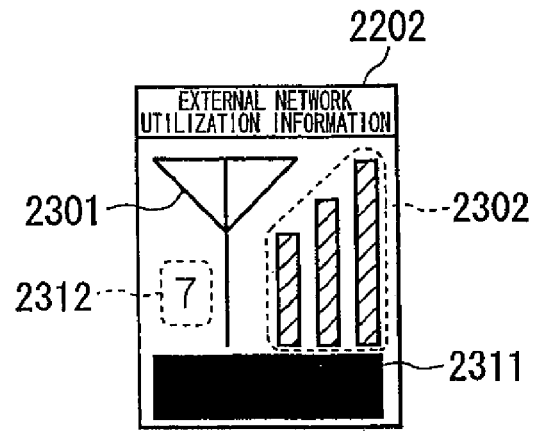

FIGS. 18A and 18B are figures showing a second example for the structure of the external network utilization information screen 2202. In the example shown in these FIGS. 18A and 18B, the amount of wireless transmission bandwidth allocated is utilized in the external network utilization information as the information about the state of wireless communication. Furthermore, the number of terminals in use is also used in the external network utilization information. In these figures, the amount of wireless transmission bandwidth allocated is displayed as the magnitude of a display bar 2311. Furthermore, the number of terminals in use is displayed as a numerical value in a display region 2312. By doing this, it is possible for the user to apprehend what amount of wireless transmission bandwidth he may himself be able to take advantage of.

FIGS. 19A through 19D are figures showing a third example for the structure of the external network utilization information screen 2202. In the example shown in these FIGS. 19A through 19D, in addition to the structure shown in the above described FIG. 17, additionally, the amount of wireless transmission bandwidth allocated is utilized in the external network utilization information as the information about the state of wireless communication. Furthermore, the number of terminals in use is also used in the external network utilization information. In these FIGS. 19A through 19D, the amount of wireless transmission bandwidth allocated is displayed as one of three levels by the number of bars 2321 which are displayed. For example, in FIG. 19A, one of the display bars 2321 is displayed, which indicates to the user that the amount of wireless transmission bandwidth which is allocated is at level 1. Furthermore, in FIG. 19B, two of the display bars 2321 are displayed, which indicates to the user that the amount of wireless transmission bandwidth which is allocated is at level 2. Yet further, in FIGS. 19C and 19D, three of the display bars 2321 are displayed, which indicates to the user that the amount of wireless transmission bandwidth which is allocated is at level 3.

Moreover, the projected data communication speed which is anticipated, based upon the amount of wireless transmission bandwidth which is allocated and the number of terminals which are in use, is displayed by the magnitude of the portions highlighted in black of those of the display bars 2321 which are displayed. This projected data communication speed may be obtained, for example, by dividing the amount of wireless transmission bandwidth which is allocated by the number of terminals which are in use. For example, in FIGS. 19A and 19C, the entire extents of the display bars 2321 which are displayed are shown as solid, which means that it is possible for one terminal to utilize the entire amount of wireless transmission bandwidth which is allocated. Furthermore, in FIG. 19B, about half of the display bars 2321 which are displayed are highlighted shown as solid, which means that it is possible for one terminal to utilize about half of the amount of wireless transmission bandwidth which is allocated. Yet further, in FIG. 19D, about one quarter of the display bars 2321 which are displayed are shown as solid, which means that it is possible for one terminal to utilize about one quarter of the amount of wireless transmission bandwidth which is allocated.

Figure 19A:
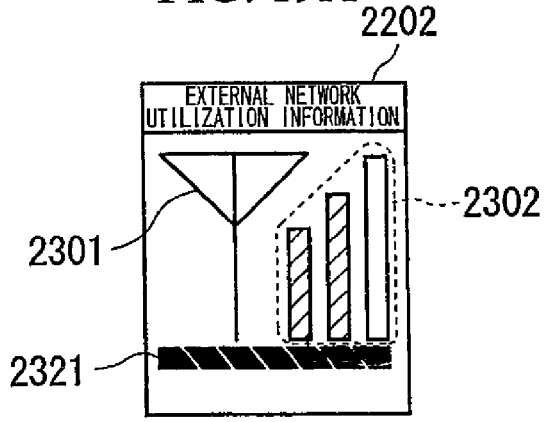
FIGS. 19A, 19B, 19C, and 19D are figures showing examples of a third structure of the external network utilization information screen 2202.
Figure 19B:
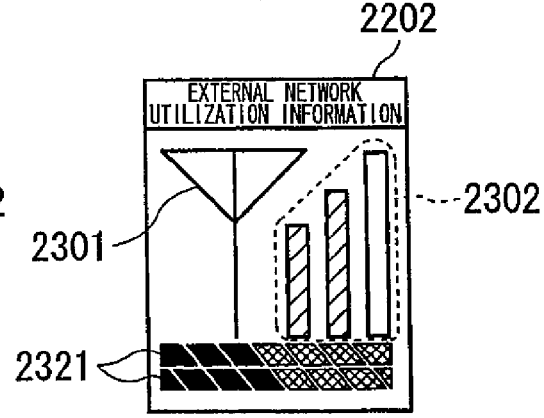
Figure 19C:
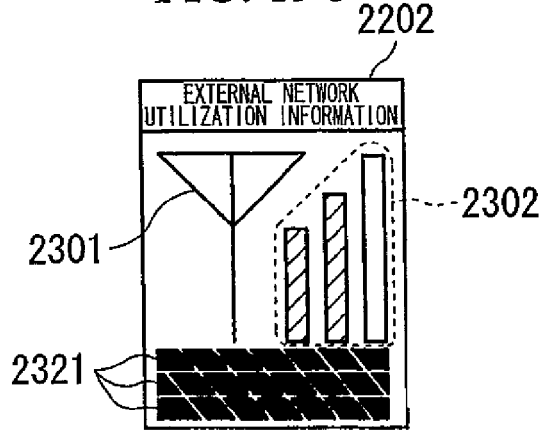
Figure 19D:
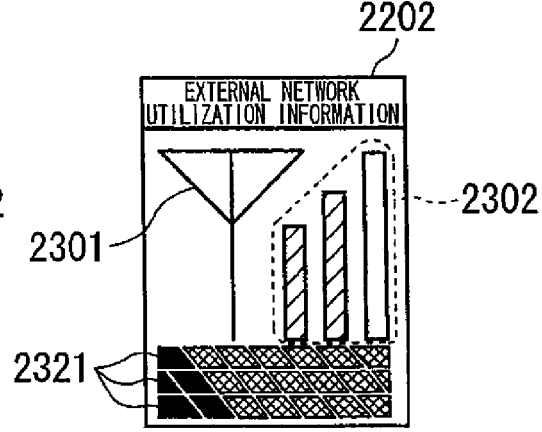

On the other hand, if FIGS. 19A and 19B are compared together, in FIG. 19A the entire amount of wireless transmission bandwidth which is allocated can be utilized by a single terminal, while in FIG. 19B about half of the amount of wireless transmission bandwidth which is allocated can be utilized by a single terminal; but, by contrast to the situation in FIG. 19A in which the amount of wireless transmission bandwidth which is allocated is at level 1, in FIG. 19B, the amount of wireless transmission bandwidth which is allocated is at level 2. Due to this, it will be understood that the projected data communication speeds in FIGS. 19A and 19B are approximately of the same order. Furthermore, if FIGS. 19A and 19C are compared together, although in both these cases the entire amount of wireless transmission bandwidth which is allocated can be utilized by a single terminal, by contrast to the situation in the FIG. 19A case in which the amount of wireless transmission bandwidth which is allocated is at level 1, in the FIG. 19C case, the amount of wireless transmission bandwidth which is allocated is at level 3; and accordingly it will be easily understood that, in the latter case, the projected data communication speed is higher. Yet further, if FIGS. 19C and 19D are compared together, although in both these cases the amount of wireless transmission bandwidth which is allocated is at level 3, when the amounts of the display bars 2321 which are shown as solid are considered, in the FIG. 19C case, the amounts shown as solid are greater than in the FIG. 19D case, so that it will be easily understood that, in this FIG. 19C case, the projected data communication speed is higher than in the FIG. 19D case. In other words, if the projected data communication speed in the FIG. 19C case is taken as 1, then in FIG. 19A it becomes about ⅓, in FIG. 19B it becomes about ⅓, and in FIG. 19D it becomes about ¼ (it should be understood that this is the case of an embodiment in which the amount of wireless transmission bandwidth which is allocated is proportional to the basic number of levels, while, as previously described, as the method of calculating the projected data communication speed, this is simply divided by the number of terminals in use).

Although, in the above, certain preferred embodiments of the present invention have been described in detail with reference to the drawings, the concrete details of the structure are not to be considered as being limited to those described above with regard to these preferred embodiments; rather, various changes and alterations may be made in the details of any particular embodiment, provided that the gist of the present invention is adhered to.

For example, the notification means in the wireless LAN terminal 2 which notifies the state of wireless connection to the external network is not to be considered as being limited to the one which provides the above described screen display. It would be acceptable for the wireless LAN terminal 2 to notify the state of wireless connection to the external network by turning on a display lamp, or the like. Furthermore, it would also be acceptable to notify the state of wireless connection to the external network by emitting a sound such as a beep or the like.

Yet further, it would also be acceptable to notify the state of the utilization environment of the external network with a concrete message, based upon the external network utilization information. For example, messages such as "the current utilization environment for the external network is very good", "the current utilization environment for the external network is good", "the current utilization environment for the external network is poor", "out of range", or the like, might be notified to the user as written messages upon a display, or via a voice synthesizer or the like.

Yet further, the wireless LAN 1 may acceptably be one which is set up in a fixed operational environment, such as a LAN within a home or a small office or the like.

Even further, the public wireless transmission network for external access may acceptably be a wireless transmission network which is accessed via a communication connection protocol other than the PPP protocol.

As has been explained above, according to the present invention, if the wireless transmission terminal which the user is utilizing accesses an external network such as the internet or the like via the wireless transmission device, by notifying the state of wireless communication between the wireless transmission device and the public wireless transmission network to the user, it is possible for the user to make a decision as to whether or not to attempt to access the external network, based upon said state of wireless communication. If this result, for example, is that the state of wireless transmission is bad, then, since it may be expected that the user will refrain from access to the external network, accordingly the access to the external network can be performed efficiently, and it becomes possible to utilize the processing power and the power consumed by the wireless transmission device more effectively. Furthermore, it is possible to alleviate uncertainty and disquiet upon the part of the user when he takes advantage of the external network.

According to the present invention, by notifying to the user the number of wireless transmission terminals which are performing data communication by taking advantage of the public wireless transmission network, it is possible for the user to make a decision as to whether or not to attempt to access the external network, based upon said number of terminals. As a result, for example, since it may be expected that the user will refrain from access to the external network if the number of terminals which are performing data communication via the public wireless transmission network is large, accordingly the access to the external network can be performed efficiently, and it becomes possible to utilize the processing power and the power consumed by the wireless transmission device more effectively. Furthermore, it is possible to alleviate uncertainty and disquiet upon the part of the user when he takes advantage of the external network. Moreover, it is possible to alleviate uncertainty and disquiet upon the part of the user when he takes advantage of the external network.

Figure 20:
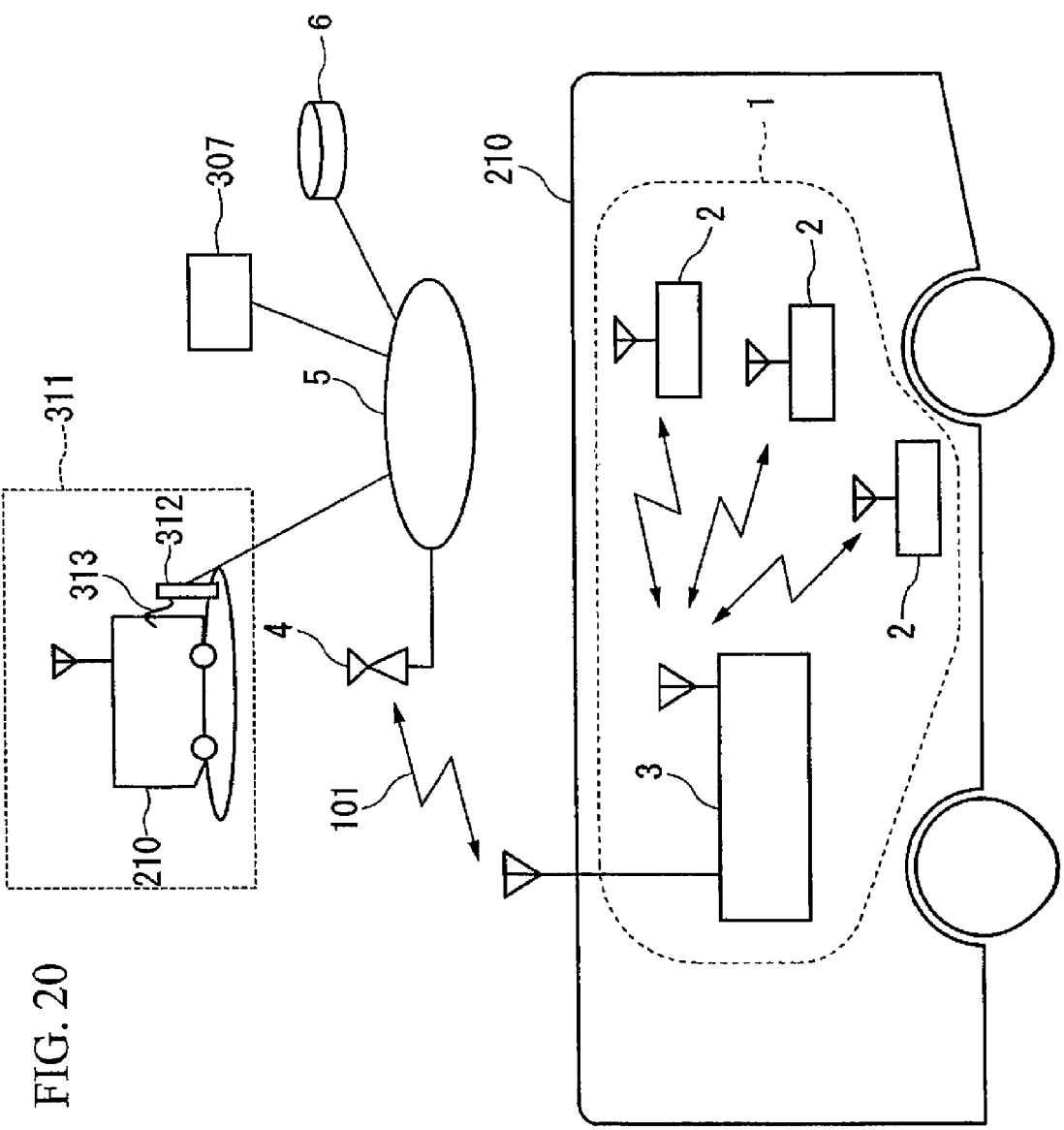
FIG. 20 is a block diagram showing an example of the structure of a system related to internet access to which a preferred embodiment of the wireless transmission system of the present invention has been applied.

FIG. 20 is a block diagram showing an example of the structure of a system related to internet access which applies a wireless transmission system according to a preferred embodiment of the present invention.

FIG. 20 is the same as FIG. 1, except for a management device 307, a bus 210 which is used as an example of a moving vehicle, and a bus center 311. Accordingly, only the features of this preferred embodiment in which it differs from the FIG. 1 preferred embodiment will be described here, while description of aspects of this preferred embodiment which are the same as ones of the FIG. 1 preferred embodiment will be curtailed. However, while the structural element 3 in FIG. 1 is simply a wireless transmission device, in FIG. 20 it is a mobile wireless transmission device.

The management device 307 is connected to the internet 5. This management device 307 performs traffic management of the moving vehicle 210, management related to web access from the interior of the moving vehicle 210, and the like.

Furthermore, in the bus center 311, a router 312 is provided which is connected to the internet. It is possible to establish a connection between the mobile wireless transmission device 3 within the moving vehicle 210 and the router 312 via a LAN cable 313. By doing this, it is possible to connect the mobile wireless transmission device 3 within the moving vehicle 210 to the internet via the router 312.

It should be understood that it would also be acceptable to provide the facilities for internet access, consisting of the router 312 and the LAN cable 313, not in the above described bus center 311, but in a bus terminal or a bus route or the like.

Furthermore, although in this preferred embodiment of the present invention the mobile wireless transmission device 3 and the router 312 are connected via the LAN cable 313, it would also be acceptable to connect them together via a high speed wireless transmission circuit.

The block diagram showing the structure of the wireless LAN terminal 2 which is shown in FIG. 20 is the same as that given in FIG. 2. Since this has already been explained, its description will here be curtailed.

Figure 21:
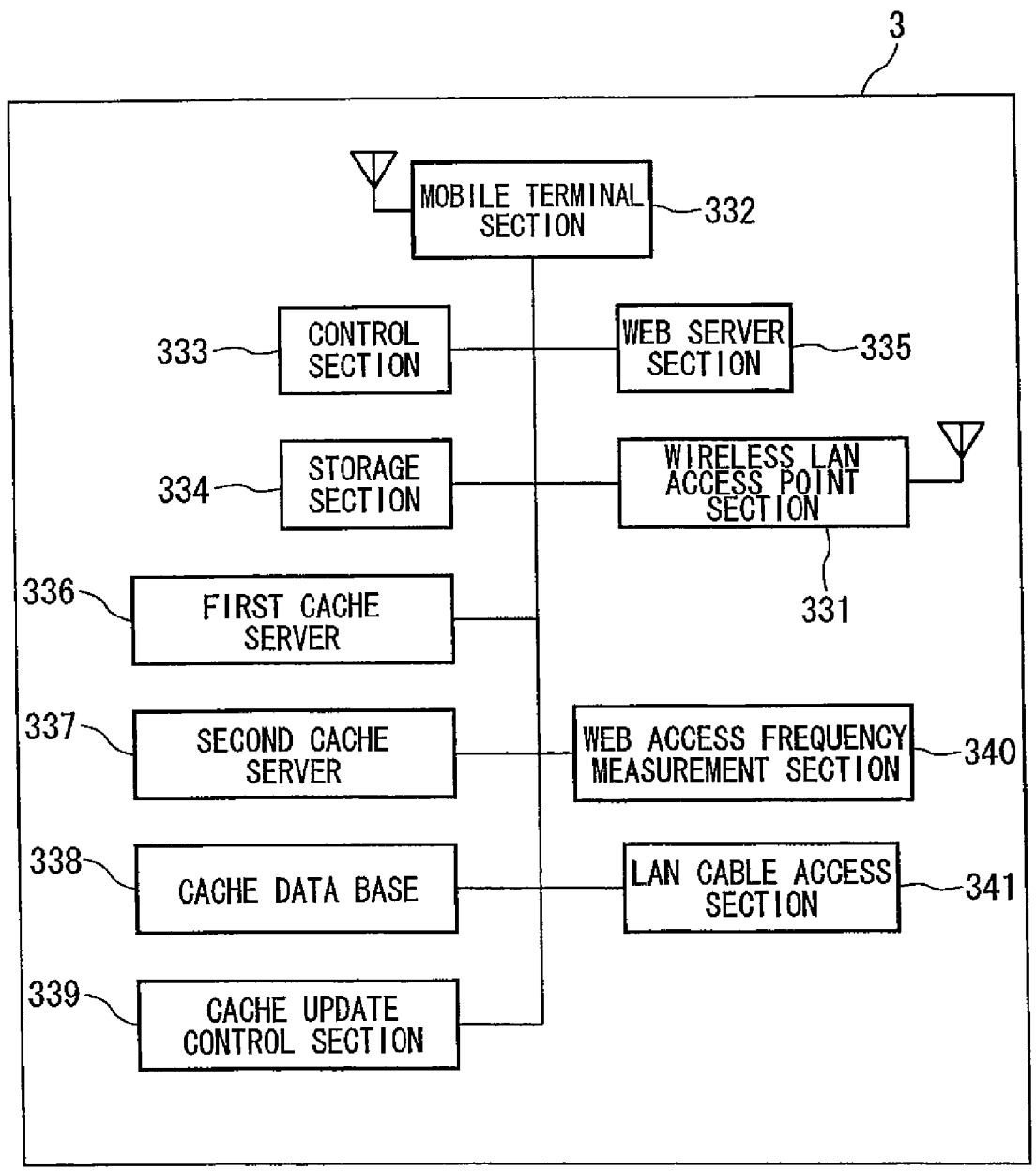
FIG. 21 is a block diagram showing the structure of a mobile wireless transmission device 3 according to a preferred embodiment of the present invention.

FIG. 21 is a block diagram showing the structure of the mobile wireless transmission device 3 according to this preferred embodiment of the present invention.

In FIG. 21, the wireless LAN access point section 331 transmits and receives wireless signals with each of the wireless LAN terminals 2, and performs data communication by establishing wireless transmission circuits with each of the wireless LAN terminals 2.

The mobile terminal section 332 transmits and receives wireless signals between itself and the mobile telephone base station 4 of the mobile telephone network, and performs data communication by establishing the wireless transmission circuit 101 for external access.

The control section 333, along with processing the data which is transmitted and received by the wireless LAN access point section 331 and the mobile terminal section 332, also controls the various portions of the mobile wireless transmission device 3. This control section 333 is endowed with the function of acting as a relay for communication between the wireless LAN terminals 2 and elements exterior to the wireless LAN system 1. Furthermore, the control section 333 is endowed with a control function related to internet access.

The storage section 334 is accessed by the control section 333, and stores various types of data. The web server section 335 opens home pages for providing them to the wireless LAN terminals 2.

The first cache server 336 stores web pages upon the internet 5 which have been accessed via the mobile terminal section 332. And, when a request for a web page occurs, it outputs said web page.

The second cache server 337 stores web pages upon the internet 5 for which it is estimated that the access frequency is high. And, when a request for a web page occurs, it outputs said web page.

The cache data base 338 accumulates management information (URLs, dates of updating, and the like) related to the web pages which are stored upon the second cache server 337.

The cache update control section 339 performs update control for the web pages which are accumulated upon the second cache server 337.

The web access frequency measurement section 340 measures the access frequency for web pages for which access attempts via the mobile terminal section 332 have been made. In concrete terms, it counts the number of users who have made access requests for each web page upon the internet 5.

The LAN cable access section 341 accesses the internet 5 via the LAN cable 13 and the router 312 which have been provided in the bus center 311.

Figures 22, 23:
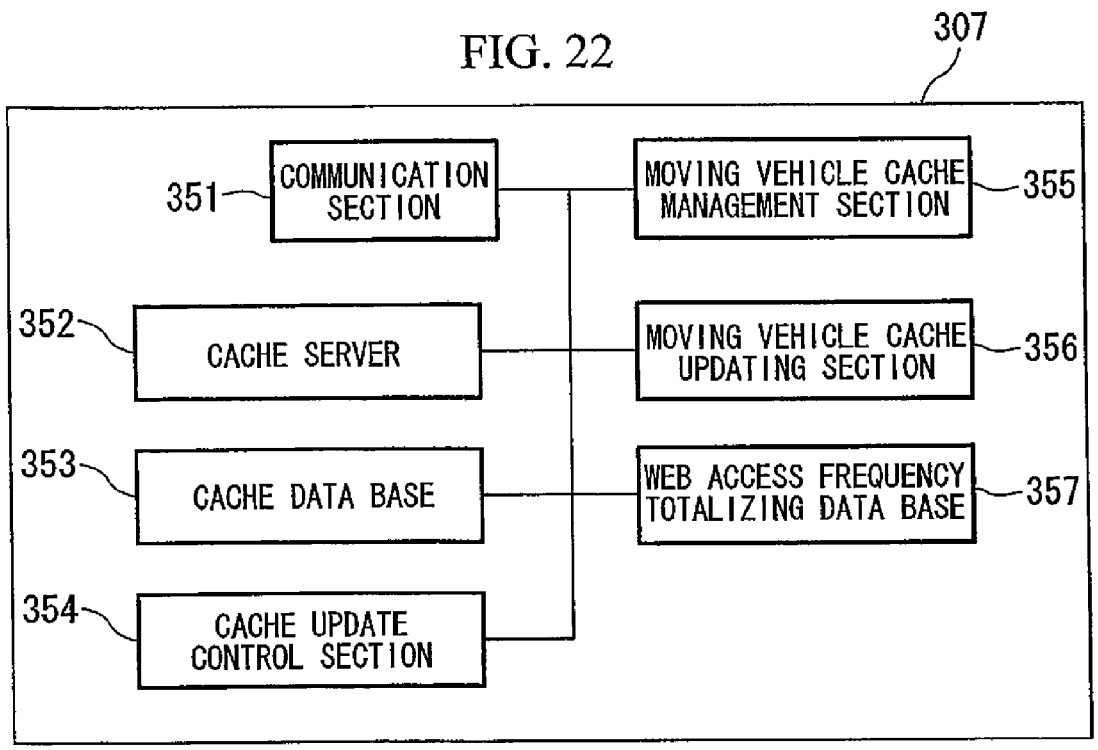
FIG. 22 is a block diagram showing the structure of a management device 307 which is shown in FIG. 20.
FIG. 23 is a figure showing an example of the structure of a web access frequency totalizing data base which is shown in FIG. 22.

FIG. 22 is a block diagram showing the structure of the management device 307 shown in FIG. 20.

Referring to this figure, the communication section 351 performs data communication via the internet 5. For example, it can transmit and receive data to and from a web server 6 upon the internet 5, the mobile wireless transmission device 3 within the moving vehicle 210 via the mobile telephone network, the mobile wireless transmission device 3 within the moving vehicle 210 via the router 312 of the bus center 311, and the like.

The cache server 352 stores web pages upon the internet 5 for which it is estimated that the access frequency is high. And, when a request for a web page occurs, it outputs that web page.

The cache data base 353 accumulates management information (URLs, dates of updating, and the like) related to the web pages which are stored upon the cache server 352.

The cache update control section 354 performs update control for the web pages which are accumulated upon the cache server 352.

The moving vehicle cache management section 355 stores the web pages which are supplied to traffic and which have been accumulated upon the second cache server 337 of the moving vehicle 210 (the moving vehicles). And it reflects this stored content upon the cache server 352. In other words, the web pages which have been accumulated upon the second cache server 337 are also accumulated upon the cache server 352.

The moving vehicle cache updating section 356 performs processing for updating the second cache server 337 of the moving vehicle. An opportunity for this updating is when, for a vehicle 210 which is moving in traffic, an update has been performed for the source of provision of a web page, or when, for a mobile vehicle 210 which is standing by in the bus center 311 or the like, an update request has been received from said mobile vehicle 210.

The web access frequency totalizing data base 357 accumulates information such as journey paths, en route time periods, URL access frequency lists, and so on. FIG. 23 is a figure which shows an example of the structure of this web access frequency totalizing data base 357. In this figure, for example, if the en route time period of the traffic path 1 is "6:00~10:00", then the access frequency for the URL 1 is 100, the access frequency for the URL 2 is 98, the access frequency for the URL 3 is 80, and so on. This access frequency list is created based upon the results of measuring the access frequencies with the web access frequency measuring section 340 of each of the moving vehicles 10.

Next, the operation of the above described preferred embodiment of the present invention will be explained.

Figure 24:
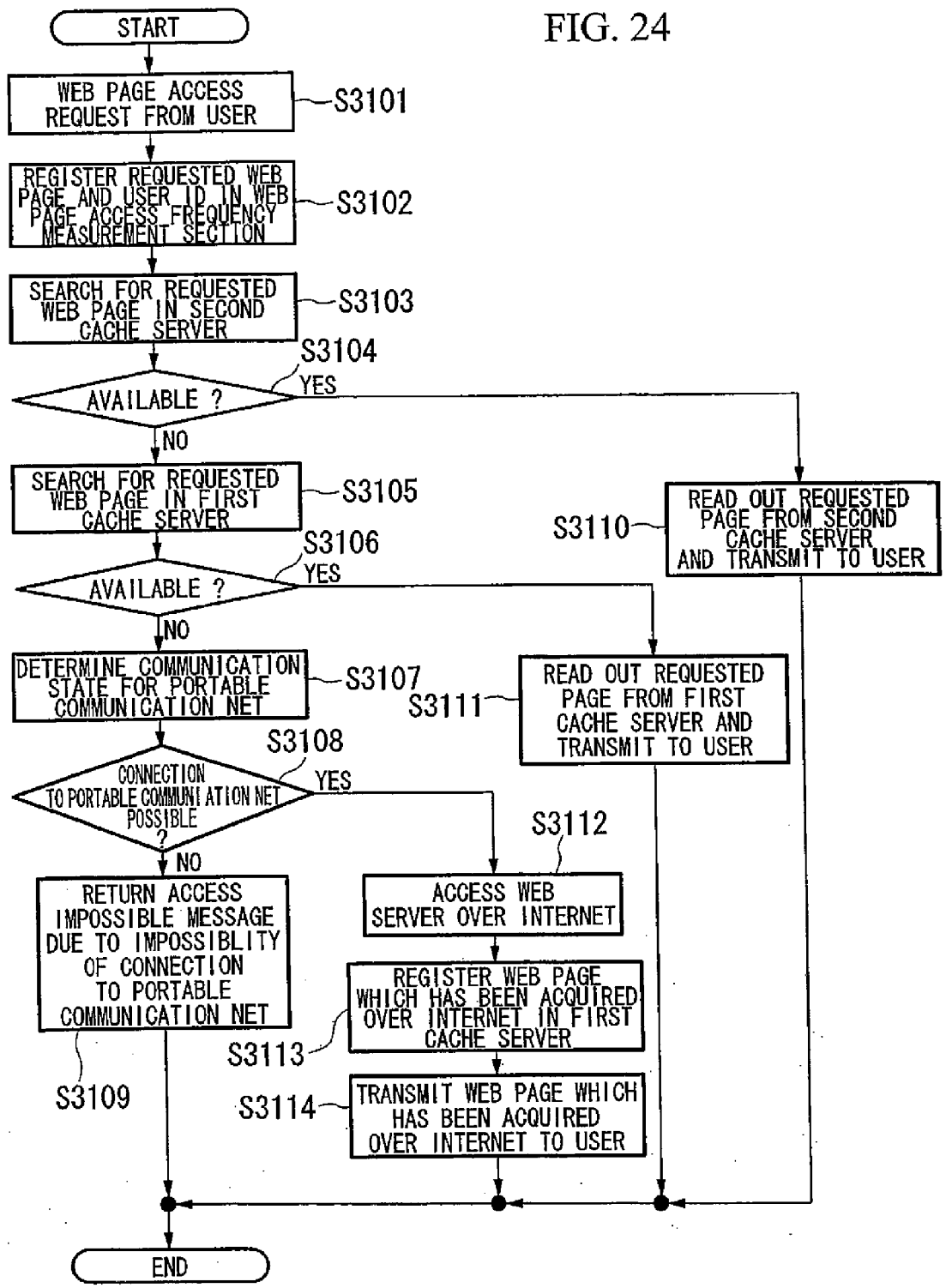
FIG. 24 is a flow chart showing the flow of a procedure which is performed when an access request to a web page by the mobile wireless transmission device 3 shown in FIG. 21 is received.

First, referring to FIG. 24, the operation when a mobile wireless transmission device 3 within a vehicle 210 which is moving in traffic has received from a user an access request to a web page will be explained. FIG. 24 is a flow chart showing the flow of processing which is performed when the mobile wireless transmission device 3 shown in FIG. 21 receives an access request to a web page.

In this figure, first, a user who is riding in the moving vehicle 210 issues an access request to a web page upon the internet 5 by using his wireless LAN terminal 2. When it receives this access request (in a step S3101), the control section 333 of the mobile wireless transmission device 3 commands it to be registered upon the web access frequency measurement section 340. Upon this command, the web access frequency measurement section 340 registers, in a measurement table of its own, the requested web page and a recognition code which specifies the wireless LAN terminal 2 which is making this access request (for example, its MAC-ID, or a recognition code or the like which has been distributed by the service provider for the mobile wireless transmission device 3 or the like), and counts up by 1 (in a step S3102) the number of users accessing said web page.

Furthermore, the control section 333 searches upon the second cache server 337, and makes a decision as to whether or not the requested web page has been accumulated thereon (in steps S3103 and S3104). And, if the web page which is being requested is accumulated upon the second cache server 337, then it reads out said web page from the second cache server 337 and transmits it to the wireless LAN terminal 2 which is the original source of the request (in a step S3110).

On the other hand, if the web page which is being requested is not accumulated upon the second cache server 337, then the control section 333 searches upon the first cache server 339, and makes a decision as to whether or not the web page which is being requested is accumulated thereon (in steps S3105 and S3106). And, if the web page which is being requested is accumulated upon the first cache server 336, then it reads out said web page from the first cache server 336 and transmits it to the wireless LAN terminal 2 which is the original source of the request (in a step S3111).

On the other hand, if the result of the above described searches is that the web page which is being requested is not accumulated upon either one of the first and the second cache servers 336 and 337, then the control section 333 makes a decision about the state of communication upon the mobile telephone network by the mobile terminal section 332. And, if it is not possible to connect to the mobile telephone network, then it transmits (in a step S3109) an "access impossible" message to the wireless LAN-terminal 2 which was the original source of the access request, to the effect that it is not possible to access the requested web page, since it is not possible to connect to the mobile telephone network.

On the other hand, if it is possible to connect to the mobile telephone network, then access is made to the web server 6 over the internet 5, and the requested web page is acquired (in a step S3112). Next, said requested and acquired web page is registered upon the first cache server 336 (in a step S3113). Furthermore, said requested and acquired web page is transmitted to the wireless LAN terminal 2 which was the original source of the request (in a step S3114).

It should be understood that the number of accessing users for each web page which has been measured by the web access frequency measurement section 340 is collected together into the management device at the bus center 311 or the like and is reflected in the web access frequency totalizing data base 357.

As has been described above, the web pages upon the internet 5 which have been accessed in the past are stored upon the first cache server 336. And, when the same web page is accessed for a second time, the web page on the first cache server 336 is transmitted back to the user. Since the frequency of access to the internet 5 using the mobile telephone network is reduced by doing this, accordingly it is possible to alleviate the communication load which is imposed upon the mobile telephone network, and the accessibility when accessing the internet 5 from within the moving vehicle is accordingly enhanced. Furthermore, it is possible to anticipate a reduction in the cost of communication.

Yet further, since the web pages upon the internet 5 for which it has been estimated that the access frequency will be high are stored upon the second cache server 337, accordingly, when a request for a web page is received from the user, by searching upon said second cache server 337 with a higher priority than searching upon the first cache server 336, it is possible to anticipate a reduction in the time period which is required for searching.

Figure 25:
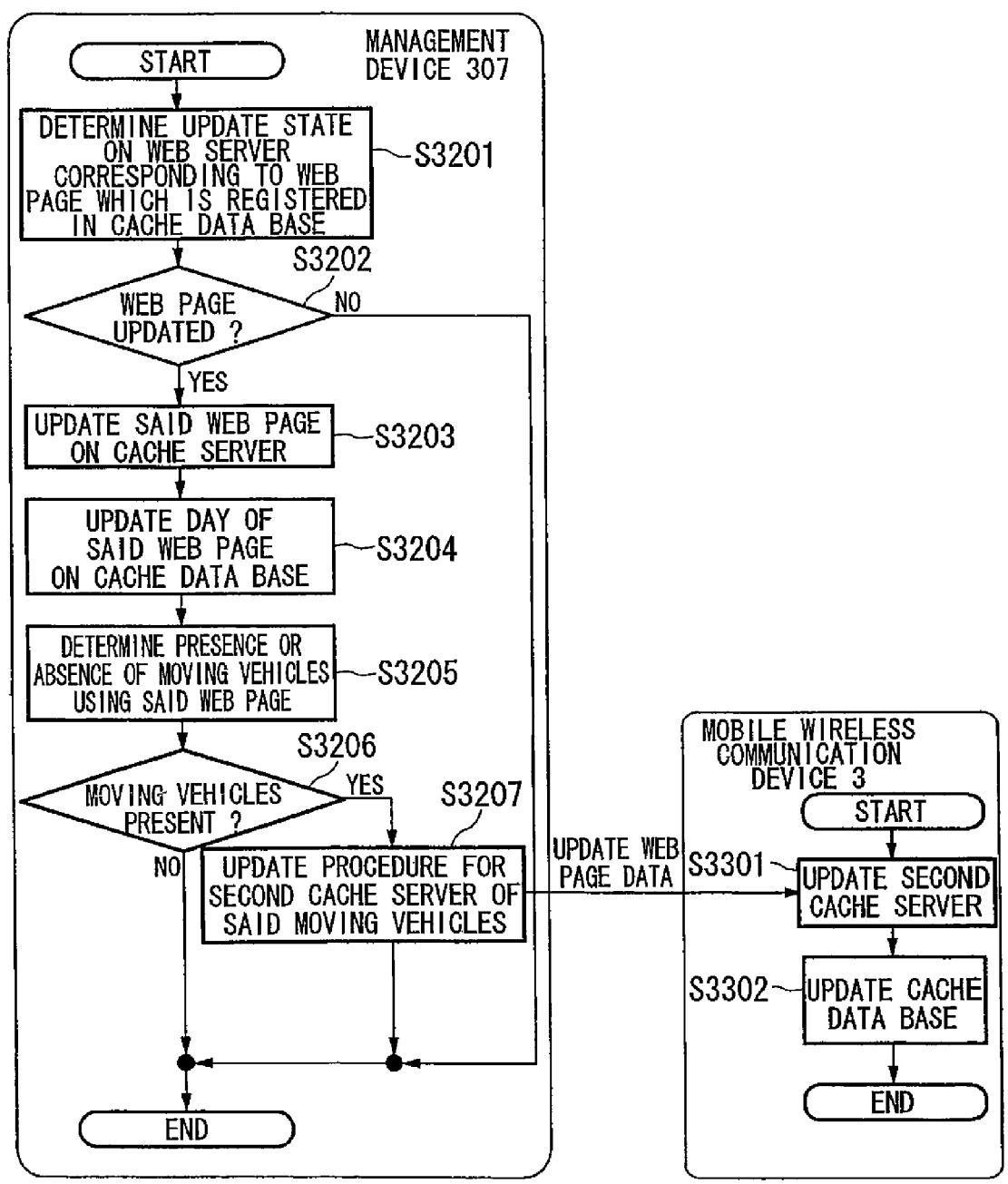
FIG. 25 is a flow chart showing the flow of a cache update procedure by the management device 307 which is shown in FIG. 22.

Next, the operation of the management device 307 related to cache updating will be explained with reference to FIG. 25. FIG. 25 is a flow chart showing the flow of a cache updating procedure performed by the management device 307 shown in FIG. 22.

Referring to this FIG. 25, first, the cache update control section 354 of the management device 307 searches, at a certain cycle period, the update state of the web pages which are registered in the cache database 53, and makes a decision as to the state of updating of said web server 6 (in steps S3201 and S3202). And, when it has detected an update of a web page, this cache update control section 354 acquires from said web server 6 the updated version of the web page, and updates said web page upon the cache server 352 (in a step S3203). Next, the cache update control section 354 updates the update time of said updated web page in the cache data base 53 (in a step S3204).

Next, the moving vehicle cache management section 355 makes a decision upon the presence or absence of a vehicle 201 moving in traffic which is using said updated web page, based upon the web access frequency totalizing data base 357 (in a step S3205). And, if such a moving vehicle 210 is present, the moving vehicle cache updating section 356 transmits the updated web page to said moving vehicle 210, in order to update the second cache server 337 of said moving vehicle 210 (in a step S3206).

Next, the cache update control section 339 of the moving vehicle 210 which has received said updated web page updates said web page upon the second cache server 337 with said updated version thereof (in a step S3301). And, next, it reflects said updated contents in the cache data base 338 (in a step S3302).

As has been described above, the management device 307 inspects the update state of the web pages, and, if an update has occurred, it reflects said update in the cache server 352. Furthermore, it performs updating of the second cache server 337 only within the moving vehicle(s) 210 in traffic which is/are using the updated web page. By doing this, along with it being possible to update the cache contents within the vehicles 210 which are moving in traffic at high efficiency, it is also possible to alleviate the load of communication using the mobile telephone network, since it is not necessary to inspect the update state of the web pages from the vehicles 210 which are moving in traffic.

Figure 26:
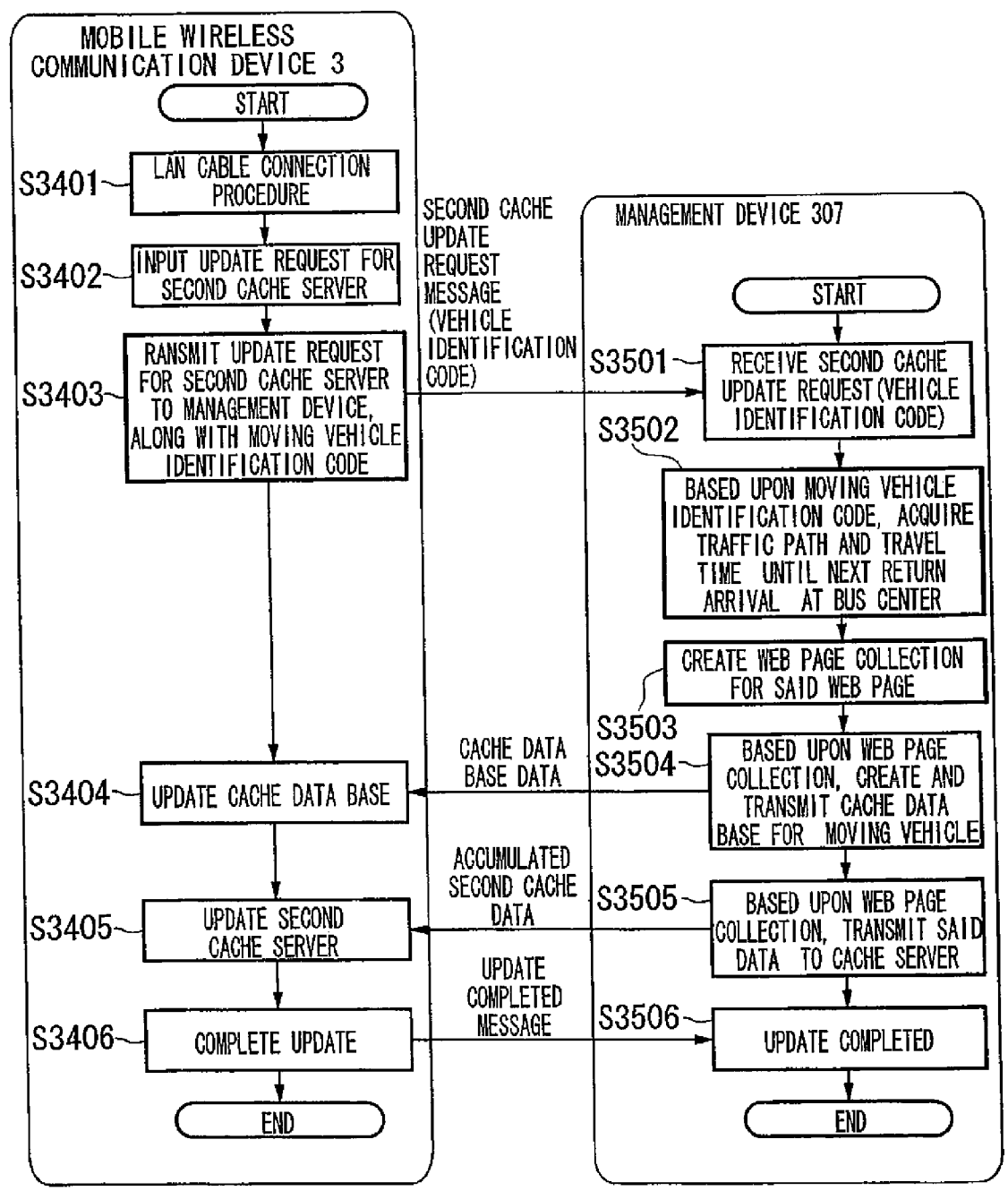
FIG. 26 is a flow chart showing the flow of an updating procedure of the second cache server 337 of the moving vehicle 210 before it enters into traffic.

FIG. 26 is a flow chart showing the flow of an update procedure for the second cache server 337 of the moving vehicle 210 before it enters into traffic. Next, the operation related to updating this second cache server 337 of the moving vehicle 210 before it enters into traffic will be explained.

Referring to this FIG. 26, first when, in the bus center 311, the mobile wireless transmission device 3 within the moving vehicle 210 and the router 312 are connected together via the LAN cable 313, the LAN cable access section 341 of the mobile wireless transmission device 3 executes a communication connection procedure via the LAN cable 313 (in a step S3401). Next, when an attendant inputs an update request for the second cache server, the cache update control section 339 transmits a second cache server update request message to the management device 307 (in steps S3402 and S3403). This update request message includes a vehicle identification code for this particular moving vehicle 210.

Next, when the management device 307 receives said update request, based upon the vehicle identification code which is included in said update request, the moving vehicle cache updating section 356 acquires (in steps S3501 and S3502) a traffic path and a traffic time until this moving vehicle 210 next arrives back at the bus center 311 from a journey planning data base (not shown in the figures). Here, the traffic path and the traffic time which are acquired are related to the traffic maneuvers which will take place until the next time that updating of the second cache server 337 will be performed.

Next, the moving vehicle cache updating section 356 refers to the web access frequency totalizing data base 357, and creates (in a step S3503) a web page collection (for example, a list of URLs), based upon said URL access frequency list in traffic path and traffic time which was acquired in the above described step S3502. In this web page collection, the web pages are listed in order of increasing access frequency (for example from level 1 to level 3).

Next, the moving vehicle cache updating section 356 creates the cache data base data for using by said moving vehicle 210, based upon said web page collection which has been created. And this cache data base data which has thus been created is transmitted to the moving vehicle 210 (in a step S3504). When this cache data base data is received, the cache update control section 339 of the moving vehicle 210 updates the cache data base 338 (in a step S3404).

Next, the moving vehicle cache updating section 356 of the management device 307 reads out said web page from the cache server 352 based upon the web page collection, and transmits it to said moving vehicle 210 as second cache accumulated data (in a step S3505). When this second cache accumulated data is received, the cache update control section 339 of the moving vehicle 210 updates the second cache server 337 (in a step S3405). Next, the cache update control section 339 transmits an update completed message to the management device 307 (in a step S3406). When this update completed message is received, the moving vehicle cache updating section 356 of the management device 307 terminates its processing, since the updating process has been completed (in a step S3506).

As described above, the management device 307 performs an updating procedure for the second cache server 337 upon the moving vehicle 210 while it is standing by in the bus center 311 or the like, based upon the web access frequency totalizing data base 357. This updating procedure will now be described in detail. Suppose that a web page which has been accumulated in advance in the second cache server 337 upon the moving vehicle 210 which is standing by in, for example, the bus center 311 or the like is one of which the access frequency within the URL access frequency list of the next traffic path and journey time band is up to level 2. Under this supposition, in the example shown in FIG. 23, if the journey time band of the traffic path 1 is "6:00~10:60", the web pages of URL1 and URL2 are accumulated in advance before said journey upon the second cache server 337. On the other hand, if even on the same traffic path 1 the journey time band is "10:00~16:00", then the web pages of URL1 and URL4 are accumulated in advance before said journey upon the second cache server 337.

In this manner it is possible to enhance the hit ratio for the second cache server during the journey, by updating the second cache server 337 for the mobile vehicle 210 in correspondence to the next journey before it starts upon its journey, based upon the access frequency in the past for the same traffic path and time band. The reason for this is that, for the same journey and the same time band, more or less, people with the same journey destination and the same people ride in the vehicle, and it may be supposed that they will access web pages with more or less the same objectives, so that the probability is high that web pages with high access frequencies as in the past will be most accessed over the same journey and in the same time band.

In the case, for example, of a vehicle which is traveling over a journey from dwellings or the like to a railroad station, the time band "6:00~10:00" is the time band for going to work or going to school, and the probability is high that during this time band, each day, as targets for information collection at the start of the day, web pages will be repeatedly accessed which provide information such as news, weather or the like.

On the other hand, the passengers during the time band "10:00~16:00" are mainly housewives or the like, and it may be anticipated that, during this time band, each day, web pages will be repeatedly accessed which provide shopping information or hobby information or the like.

Accordingly if, in correspondence to the various types of traffic, web pages whose access frequency in the past has been high are accumulated upon the second cache server 337 in advance before the vehicle 210 starts upon its journey, it may be anticipated that the hit ratio of the second cache server 337 will be enhanced. Since as a result the frequency of accessing the internet will be reduced, accordingly the frequency of utilization of the mobile telephone network will be reduced.

Since, as has been described above, according to this preferred embodiment of the present invention, web pages upon the internet 5 which have been accessed in the past are stored upon the first cache server 336, accordingly, when the same web pages are accessed for a second time, it is possible to take advantage of the web pages which are stored upon said first cache server 336. Due to this, since the frequency of access to the internet 5 over the mobile telephone network is reduced, accordingly it is possible to alleviate the communication burden which is imposed upon the mobile telephone network, and moreover the internet access environment within the moving vehicle is enhanced.

Furthermore, since web pages upon the internet 5 for which it has been estimated that the access frequency is high are stored upon the second cache server 337, accordingly it is possible to anticipate a reduction of the search time by, when a web page request from a user has been received, searching said second cache server 337 as a priority before searching the first cache server 336.

Even further, it is possible to ensure a high hit ratio upon the second cache server 337, since web pages corresponding to the next journey are accumulated in advance upon the second cache server 337 before the moving vehicle 210 sets out upon its next journey.

Yet further, since the work of updating the second cache server during a journey by utilizing the mobile telephone network may be performed only for web pages which have been updated during said journey, accordingly it becomes possible to keep the communication burden which is imposed upon the mobile telephone network to the absolute minimum possible limit.

Furthermore, by reflecting in the web access frequency totalizing data base 357 the number of users who access each web page which have been measured for the moving vehicle 210 for each journey, it is possible to reflect the access frequency measurement results for each journey, in the next vehicle journey and subsequent ones, in the accumulated contents in the second cache server. By doing this, and by caching the most suitable pages, it is possible to enhance the hit ratio in the second cache server 337.

It should be understood that it would be possible to anticipate a further improvement in the efficiency of utilization of the second cache server 337 by separating the totals of access frequency for the web pages according to the day of the week, whether the day is a working day or a holiday, or the like, and adding this information to the data base.

Although various preferred embodiments of the present invention have been described in detail above with reference to the appended drawings, the concrete structure of any of said preferred embodiments is not to be considered as being particularly limited by any of the details described, or by the drawings; it would be possible to implement various changes and variations to the details of any particular preferred embodiment, provided that the gist of the present invention is adhered to.

For example, the control section of the mobile wireless transmission device 3 may acceptably be made so as to perform control for displaying upon the wireless LAN terminal 2 a list of web pages which are accumulated upon the first cache server 336 or upon the second cache server 337. By doing this, the user is enabled to become aware of the web pages which are cached, so that the convenience of the system with regard to web page access is enhanced.

This preferred embodiment of the present invention relates to a communication system which comprises a wireless device which is fitted to a bus. Along with being endowed with the function of operating as a base station device for connection to terminal devices which are being employed by users within the bus, this wireless device it is also endowed with the function of serving as a terminal device which is connected to a base station device which is provided externally to the bus. Here, it is supposed that the communication system within the bus is a wireless LAN, and that the wireless system external to the bus is a system according to the EV-DO format; and, with these unified formats, said wireless device sets up a communication system which relays between the terminal devices which are being employed by the users and the base system device which is established externally. With the communication device according to this preferred embodiment, said communication system is only used by specified users. In other words, authentication is performed by the terminal devices, in order to prevent utilization of said communication system by users who are not specified.

In order to pay the transportation charge for the bus, the user contacts a payment card, such as for example a prepaid card, to a payment device which is provided within the bus. The wireless device writes in information related to the terminal device in the payment card, such as the authentication information, encoding information, the frequency with which it should be used, and the like. The payment device ejects the payment card when it has completed the payment for the bus transportation charge. The user then takes the payment card out of the terminal device, and the terminal device outputs a connection request to the wireless device, based upon the information related to the terminal device which has been written into the payment card. For example, it generates a signal for making a connection request by using the authentication information and the encoding information, and outputs said signal at a frequency which should be used.

The wireless device executes an authentication procedure for a terminal device based upon said signal, and, if it is a terminal device which belongs to an authorized user, permits connection thereof. Furthermore, it transmits data between itself and the terminal device with a communication system according to the EV-DO format.

Figure 27:
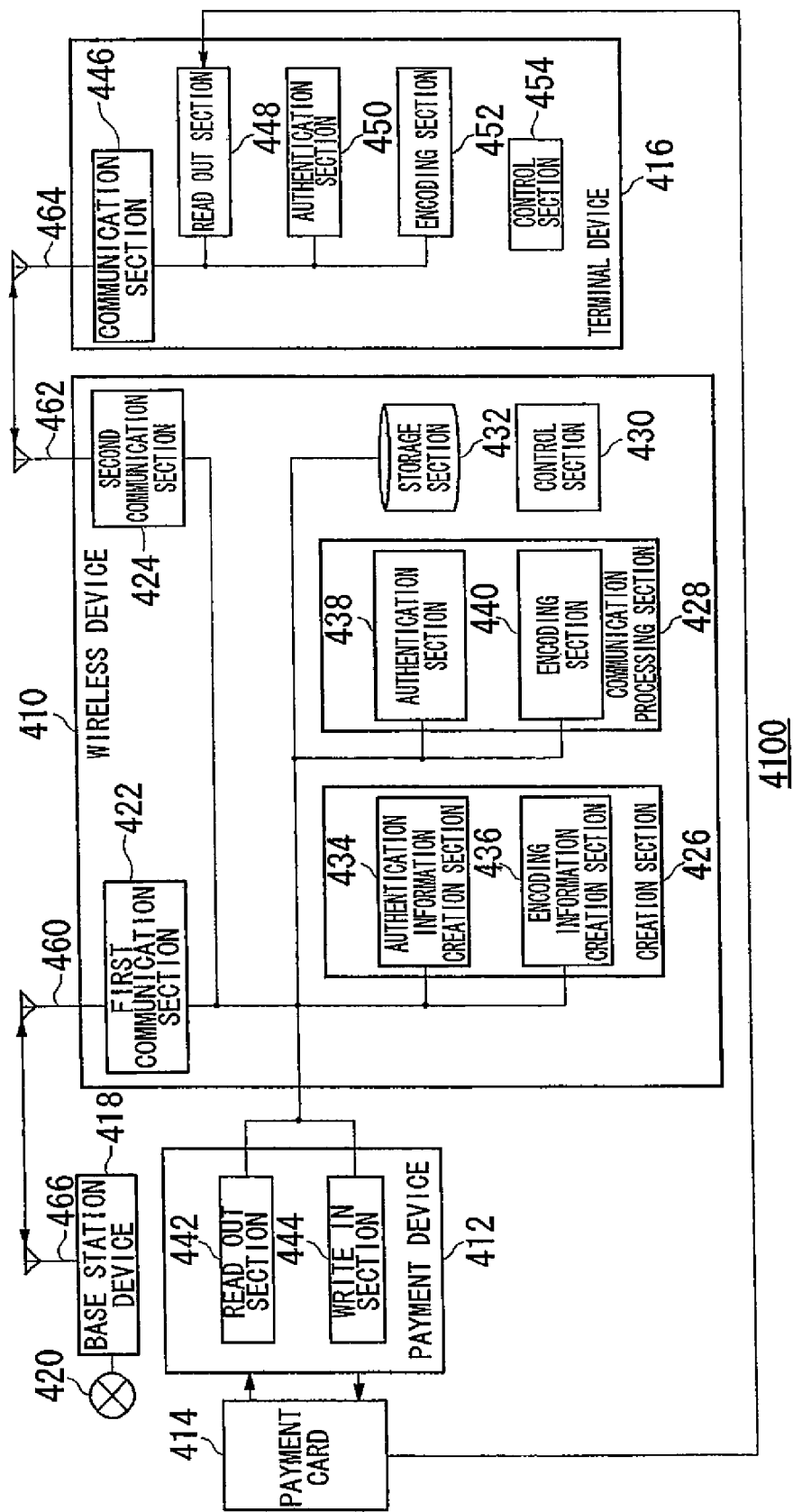
FIG. 27 is a figures showing the structure of a communication system according to a preferred embodiment of the present invention.

FIG. 27 is a figure showing a communication system 4100 according to a preferred embodiment of the present invention. This communication system comprises a wireless device 410, a payment device 412, a payment card 414, a terminal device 416, a base station device 418, and a network 420. The payment device 412 comprises a read out section 442 and a write in section 444; the wireless device 410 comprises a first antenna for communication 460, a first communication section 422, a second antenna for communication 462, a second communication section 424, a creation section 426, a communication processing section 428, a control section 430; and a storage section 432; and the terminal device 416 comprises a terminal antenna 464, a communication section 446, a read out section 448, an authentication section 450, an encoding section 452, and a control section 454. Furthermore, the creation section 426 comprises an authentication information creation section 434, an encoding information creation section 436, a communication processing section 428, an authentication section 438, and an encoding section 440.

The base station device 418 is compatible with the EV-DO format, and is connected to a backbone network 420. Furthermore, there is provided a base station antenna 466 for wireless transmission. This base station antenna 466 may also be made up from a plurality of antennas or sectors.

The first communication section 422 executes a communication procedure according to the EV-DO format, corresponding to the base section device 418. In this case, the first communication section 422 corresponds to an EV-DO terminal device. Furthermore, there is provided a first antenna for communication 460 for wireless transmission. On the other hand, the second communication section 424 executes a communication procedure for a wireless LAN which will be described hereinafter. In this case, the second communication section 424 corresponds to the base station device of this wireless LAN. Furthermore, there is provided a second antenna for communication for wireless transmission.

The payment card 414 is a card for paying for bus transportation, and, as previously described, may be exemplified by a prepaid card. When getting onto the bus, the user contacts the payment card 414 against the payment device 412. The read out section 442 reads out the information within the payment card 414, such as for example the amount of money remaining upon it, and, after having performed a procedure for deducting the cost of the current journey, the write in section 444 writes the final remaining amount of money into the payment card 414. Furthermore, the write in section 444 also writes in the information which is required for communication between the wireless device 410 and the terminal device 416.

The authentication information creation section 434 creates authentication information for the terminal device 416, for example a password or the like, and outputs it to the write in section 444 for writing into the payment card 414. And the encoding information creation section 436 creates encoding information for the terminal device 416, for example a secret key or the like, and outputs it to the write in section 444 for writing into the payment card 414.

When there has been a connection request from a terminal device which contains authentication information and encoding information which have been created by the authentication information creation section 434 and by the encoding information creation section 436, in order to use this authentication information and this encoding information which have been created, the storage section 432 stores this authentication information and this encoding information. It should be understood that it also stores information which is necessary for processing the transportation charge deduction, for example a table of transportation charges.

FIG. 28 shows the data structure of the information which is related to the terminal devices which has been stored in the storage section 432. Here, "recognition number" is a number which identifies the terminal devices 416—for example, a recognition number for a user who owns the terminal device 416 may be used. Here, by way of example, these fields are shown as A1 through AN. And "authentication information" is a password which has been generated by the authentication information creation section 434, and here, by way of example, these fields are shown as B1 through BN. And "encoding information" is a secret key which has been generated by the encoding information creation section 436, and here, by way of example, these fields are shown as C1 through CN. Moreover, "frequency information" is the frequency which is transmitted by the second communication section 424, and here it is supposed that it is fixed at f1.

When a terminal device 416 has performed a connection request, the authentication section 438 authenticates this terminal device 416, based upon the authentication information which has been created by the authentication information creation section 434 in advance and has been stored in the storage section 432. For example, if the password which has been stored in the storage section 432 and the password which is contained in the connection request from the terminal device 416 are the same as one another, then it permits connection of said terminal device 416. And, when a connection request has been performed by the terminal device 416, the encoding section 440 executes an encoding procedure based upon a code which has been generated in advance by the encoding information creation section 436 and has been stored in the storage section 432.

And, along with controlling the various timings of the wireless device 410, the control section 430 generates control signals for executing the previously described authentication procedures. Furthermore, it executes the transportation charge payment processing by the payment device 412.

The communication section 446 executes a wireless LAN communication procedure, in order to communicate with the second communication section 424. Furthermore, it is provided with the terminal antenna 464 for wireless transmission.

When the payment card 414 which has been ejected from the write in section 444 is inserted into the read out section 448, it reads out the information related to the terminal device which has been written into the payment card 414 which has thus been inserted. The payment device 412 is provided with an interface into which, in the same manner, the payment card 414 can be inserted. Furthermore, among the read out information, the authentication information is outputted to the authentication section 450, the encoding information is outputted to the encoding section 452, and the frequency of use information is outputted to the communication section 446. And the read out section 448 sets the frequency to the value which has been inputted, and accesses the wireless device 410.

When performing a connection request for the wireless device 410, the authentication section 450 writes the authentication information into a request packet. Furthermore, if there has been a response relating to authentication from the wireless device 410, it performs a procedure corresponding thereto.

The encoding section 452 performs a communication encryption procedure, based upon the encoding information which it has received from the read out section 448. The control section 454 controls the various timings for the terminal device 416.

This structure may be implemented in hardware, such as the CPU of some computer and its memory and other LSIs, or may be implemented in software as a program which fulfils a reservation management function and which has been loaded in the memory, but here it is only shown as functional blocks which may be implemented by any of these methods. It will be clear to a person of ordinary skill in the art without undue experimentation that it is possible to implement these functional blocks only by hardware, only by software, or by a combination of both hardware and software, as may be found to be most appropriate and convenient.

Figure 29:
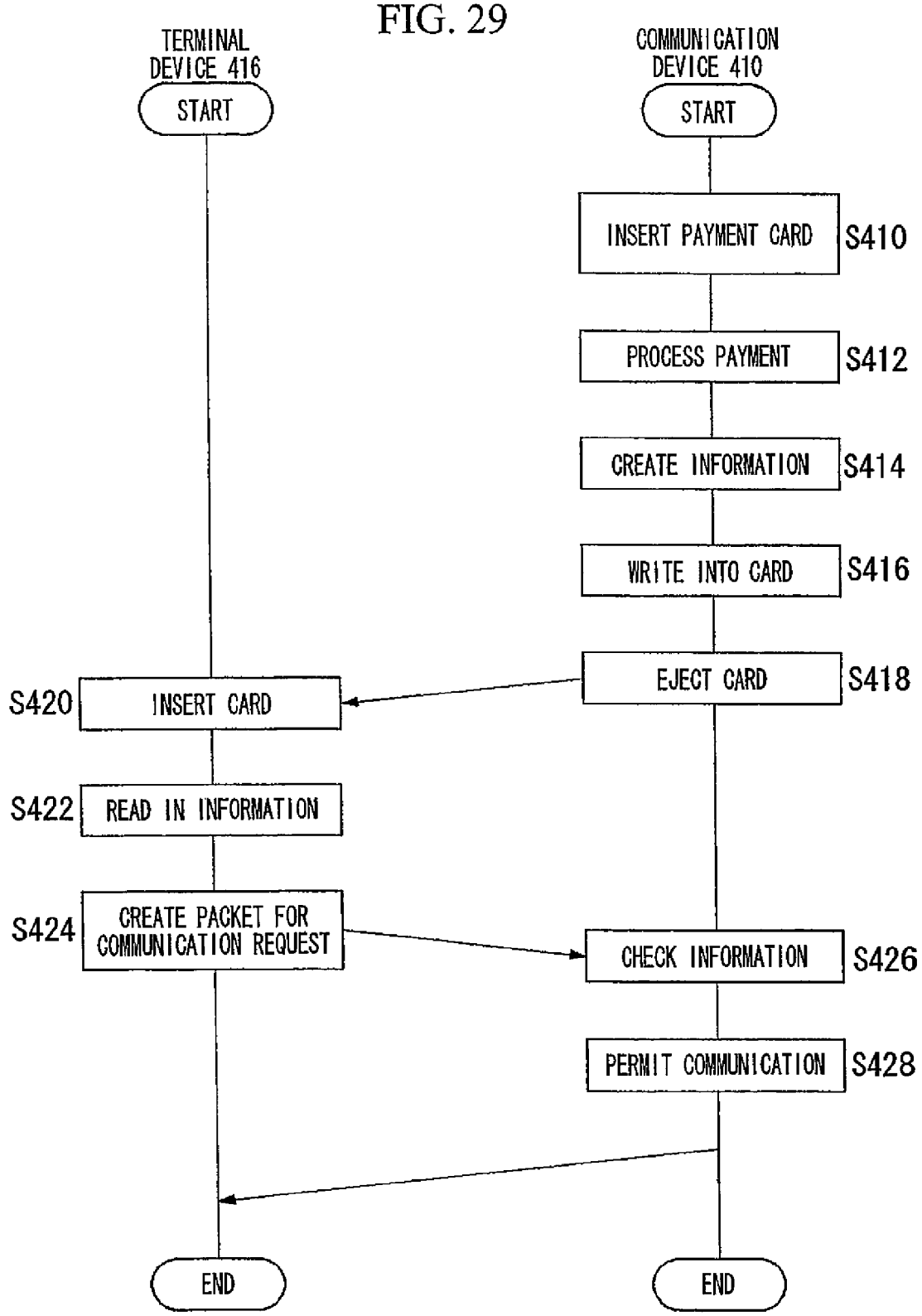
FIG. 29 is a sequence diagram showing an authentication procedure.

FIG. 29 is a sequence diagram showing the authentication procedure. The user contacts the payment card 414 against the payment device 412 (in a step S410). By the read out section 442 reading out the contents of the payment card 414, the payment device 412 performs the payment procedure (in a step S412). Furthermore, the authentication information creation section 434 and the encoding information creation section 4436 create the predetermined information (in a step S414). The write in section 444 writes in this predetermined information into the payment card 414 (in a step S416). The payment device 412 then ejects the payment card 414 to the outside (in a step S418). Next, the next user inserts his payment card 414 into the read out section 448 (in a step S420). Furthermore, the read out section 448 reads out the information (in a step S422), and outputs the information which has thus been read out to the authentication section 450, the encoding section 452, the communication section 446, and so on. Based upon the operation of the, the authentication section 450 and the encoding section 452, the communication section 446 generates a packet containing a connection request (in a step S424). The second communication section 424 receives this packet, and the authentication section 438 verifies the information which it contains (in a step S426). If the information is valid, the wireless device 410 permits communication with the terminal device 416 (in a step S428). After this, the wireless device 410 relays data for communication with the terminal device 416, and data for communication with the base station device 418.

Figure 30:
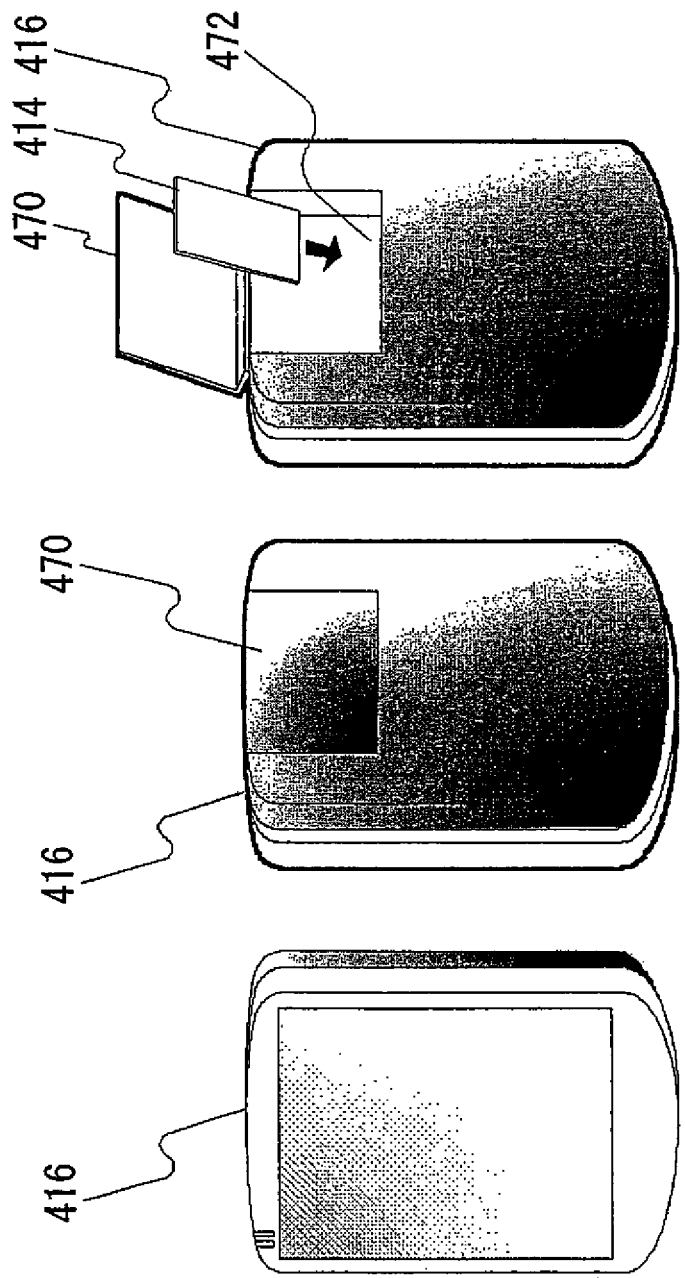
FIGS. 30A, 30B, and 30C are figures showing the external appearance of the terminal device of FIG. 27.

FIGS. 30A through 30C are external views of the terminal device 416 of FIG. 27. For this terminal device 416, FIG. 30A shows it as seen from the front at a slight angle, FIG. 30B shows it as seen from the rear at a slight angle, and FIG. 30C shows it as seen from the rear at a slight angle and moreover with a card housing section lid 470 in the open state. When this card housing section lid 470 is opened, it becomes possible to remove, or to insert, any type of card such as a payment card 414 or the like, from or into a card housing section 472. When as shown in FIG. 30B the card housing section lid 470 is closed, the payment card 414 which has been inserted into the card housing section 472 is fixed inside the terminal device 416, and the encoding information and the authentication information which have been written into the payment card 414 may be read out by wireless transmission. By employing a non contact type of communication means with the card in this manner, there is no requirement for any contact portion which would be different for each card, and furthermore it is possible to establish communication with the card irrespective of vibration or swaying of the moving vehicle, even though the card may be small, since no contact is involved.

The operation of the communication system 4100 which is structured as described above will now be explained. Referring to FIG. 27, when the user gets on to the bus carrying the payment card 414, when he contacts the payment card 414 against the payment device 412, along with a payment being deducted when he gets on, the authentication information and the encoding information which have newly been created by the authentication information creation section 434 and the encoding information creation section 436 of the wireless device 410 respectively are written into the payment card 414 by the write in section 444. The same authentication information and encoding information are also stored in the storage section 432. When the payment card 414 is inserted into the card housing section 472 of the terminal device 416, the read out section 448 of the terminal device 416 reads out from the payment card 414 the previously written in authentication information and encoding information, and the encoding section 452 encrypts the information to be transmitted to the wireless device 410 based upon said encoding information.

Furthermore, an authentication procedure with the wireless device 410 is performed using the aforesaid authentication information. The terminal device 416 transmits information via the communication section 446 and the terminal antenna 464, receives information via the second antenna for communication 462 of the wireless device 410, decodes the signal via the second communication section 424 with the encoding section 440, performs the authentication procedure with the authentication section 438, makes a decision as to whether or not this authentication information and the encoding information which has been previously stored in the storage section 432 agree with one another, and, if they do so agree, permits communication. By doing this, it becomes impossible for a user who is not riding upon the bus to receive service by taking advantage of the wireless device 410. Furthermore, since encoding information and authentication information which are specific to each terminal are used, it is difficult to impersonate or to decode the wireless information, and accordingly it becomes possible to enhance the level of safety of the personal information of the user of the system.

Furthermore, the explanation of the details of the distribution of information by the communication system 4100 goes as follows. When a user gets onto the vehicle (the bus), new encoding information is created by the encoding information creation section 436 of the wireless device 410, and new authentication information is created by the authentication information creation section 434, and, along with these being written into the payment card 414, they are also stored in the storage section 432. On the other hand, during use, when the authentication information which has been encrypted using the encoding information which has previously been stored upon the payment card 414 is transmitted to the wireless device 410, along with it being decoded by the encoding section 440, an authentication procedure is performed by the authentication section 438, and the encoding information and the authentication information which are stored in the storage section 432 are referred to, and a check is made as to whether or not they agree with one another. By creating unique encoding information and authentication information for each card, it becomes possible to distribute and to take advantage of the encoding information and the authentication information safely. Furthermore, by deleting the information which has been written into and carried by the payment card when the user gets off the vehicle, it becomes impossible for another terminal to continue to communicate by combining the same encoding information and the same authentication information.

According to this preferred embodiment of the present invention, the level of safety is enhanced by preventing leakage of the authentication information, since the authentication of the terminal device is performed according to predetermined authentication information which has been written into the card. Furthermore, since the information about the frequency of use of the wireless device is notified in advance to the terminal device, it is possible for the terminal device to anticipate reliable connection for communication with the wireless device. Yet further, since the card upon which the authentication information has been written is also used for making payment for transportation charges, there is no requirement to ask the user newly to carry an additional card.

Above, the present invention has been explained in terms of certain of the preferred embodiments thereof. However, these preferred embodiments have only been cited by way of example; it would be possible for a person of ordinary skill in the relevant art to vary some or all of their various constructional details or processes, individually or in combination, based upon this disclosure; and this would still be within the scope of the present invention, provided that its gist is not departed from.

Although, in this preferred embodiment of the present invention, the explanation was made in terms of the card housing section 472 being built integrally with the terminal device 416, the present invention is not to be considered as being limited to this special case; for example, it would also be possible for them to be provided separately. In such a case, such a separately provided card housing section 472 might be connected to the terminal device 416 via a USB cable or the like. According to this variant preferred embodiment, it would be possible to read out the payment card 414 with the terminal device 416 even if the card housing section 472 was not provided. In other words, it would be sufficient merely to read out the payment card 414.

Although, according to this preferred embodiment of the present invention, the communication network between the wireless device 410 and the base station device 418 was one which followed the EV-DO standard, this is not to be considered as being limitative of the present invention; it would, alternatively, be perfectly possible to utilize some other type of wireless transmission means for this network, such as a simple type of mobile telephone system or the like. According to such a variant preferred embodiment, it would be possible to apply the present invention in various different ways. In other words, it would be acceptable to be able to access a network which was external to the bus, or the like.

Moreover although, according to this preferred embodiment of the present invention, the explanation was made in terms of a bus which was proffered as an example, it would also be possible to apply the present invention to the provision of a wireless transmission environment within a fixed environment, rather than basing it upon a mobile environment such as a bus or a train or the like. Furthermore, although the present invention has been explained in terms of a payment card 414 or control ticket or the like being proffered and the authentication information and the encoding information being transferred to it, it would also be acceptable for the information to be transferred to a stamp which was issued in advance, or to another card or to a semiconductor memory or the like which is in the possession of the individual user over a long time period. According to such a variant preferred embodiment of the present invention, it is possible to apply the present invention in various different ways. In other words, with a predetermined card, it will be sufficient only to notify the authentication information to the terminal device 416.

With regard to the distribution of the authentication information and the encoding information which employ a control ticket, this may be done, for example, as follows. The control ticket itself employs an IC tag, and, when the control ticket is issued, the authentication information and the encoding information are written into the control ticket. Furthermore, information such as the stopping point at which the passenger will get off the moving vehicle is also written into the control ticket at the same time. When using this ticket, the user inserts the control ticket into the card housing section 472 of the terminal device 416 in the same manner as with the payment card 414 as described above, and the authentication information and the encoding information which have been written into the control ticket are read out by the read out section 448. Furthermore, based upon the insertion of the control ticket into the payment device 412 when the passenger gets off the vehicle, along with the encoding information and the authentication information which were written being deleted from the storage section 432, also the amount of money to be paid for transportation is calculated, based upon the stopping point at which the passenger got onto the vehicle which has been read out from the control ticket, and upon the stopping point at which the vehicle is stopped at the current time, and from information input by the driver such as whether the passenger is an adult or a child and for how many passengers payment is to be made and the like, and this cost of transportation is displayed, and then, when the passenger puts cash into a cash payment machine, either change is rendered, or the amount still to be paid is shown, or thanks are given if the exact amount has been paid. Even if, according to the type of the bus card, it is determined that the current bus card is one of the post-payment type, it is possible to execute a procedure which is substantially the same as the one in the case of the previously described control ticket.

Although it was explained above, according to this preferred embodiment of the present invention, that "frequency information" was carried, it should be understood that the present invention is not to be considered as being limited only to the case of carrying frequency information; it would be possible to carry other types of information related to wireless transmission, such as, for example, the format for modulation between the wireless device and the terminal device, or the communication standard such as IEEE802.11a, IEEE802.11b, IEEE802.11g, HiSWAN, wireless 1394, UWB, or the like.

A preferred embodiment of the traffic management system according to the present invention will now be described in detail with reference to the figures. First, for the convenience of explanation, a summary of this traffic management system will be explained.

The service of the wireless LAN is set up within the public transport vehicle such as a bus or a train or the like onto which a large number of passengers board, and from which a large number of passengers alight. And a wireless repeater device which comprises a wireless LAN communication means and communication means such as mobile telephones is set up within these public transport vehicles (hereinafter termed "moving vehicles"), and is connected by wireless LAN with portable terminals such as notebook type PCs or the like within the moving vehicle, and is made so that, by utilizing the mobile telephone network for network connection outside the moving vehicle, it is possible to connect from the notebook type. PCs within the moving vehicle to the internet network outside the moving vehicle.

Furthermore, as a service which combines a wireless transmission system and a moving vehicle such as a bus or a train, since for example, with a bus which operates upon a conventional road, the traffic time may vary one way or the other due to conditions such as road congestion or the like, accordingly a system is also set up to transmit information such as the state of traffic or the like, i.e. the current position of the bus and/or the departure time instant from a stopping point, by using the wireless transmission system, and, via a central computer (a host computer) or the like, to display the most recent traffic state at stopping points. Furthermore, in the same manner, a service may also be implemented for providing information related to the traffic state of the bus or the train or the like by taking advantage of the web (the internet). By doing this, it becomes possible to provide a feeling of spiritual confidence to the passengers who are waiting for the bus or the like, since it is possible for them to know in advance after approximately what time the bus will arrive at its stopping point or the like at which they are waiting.

Figure 35:
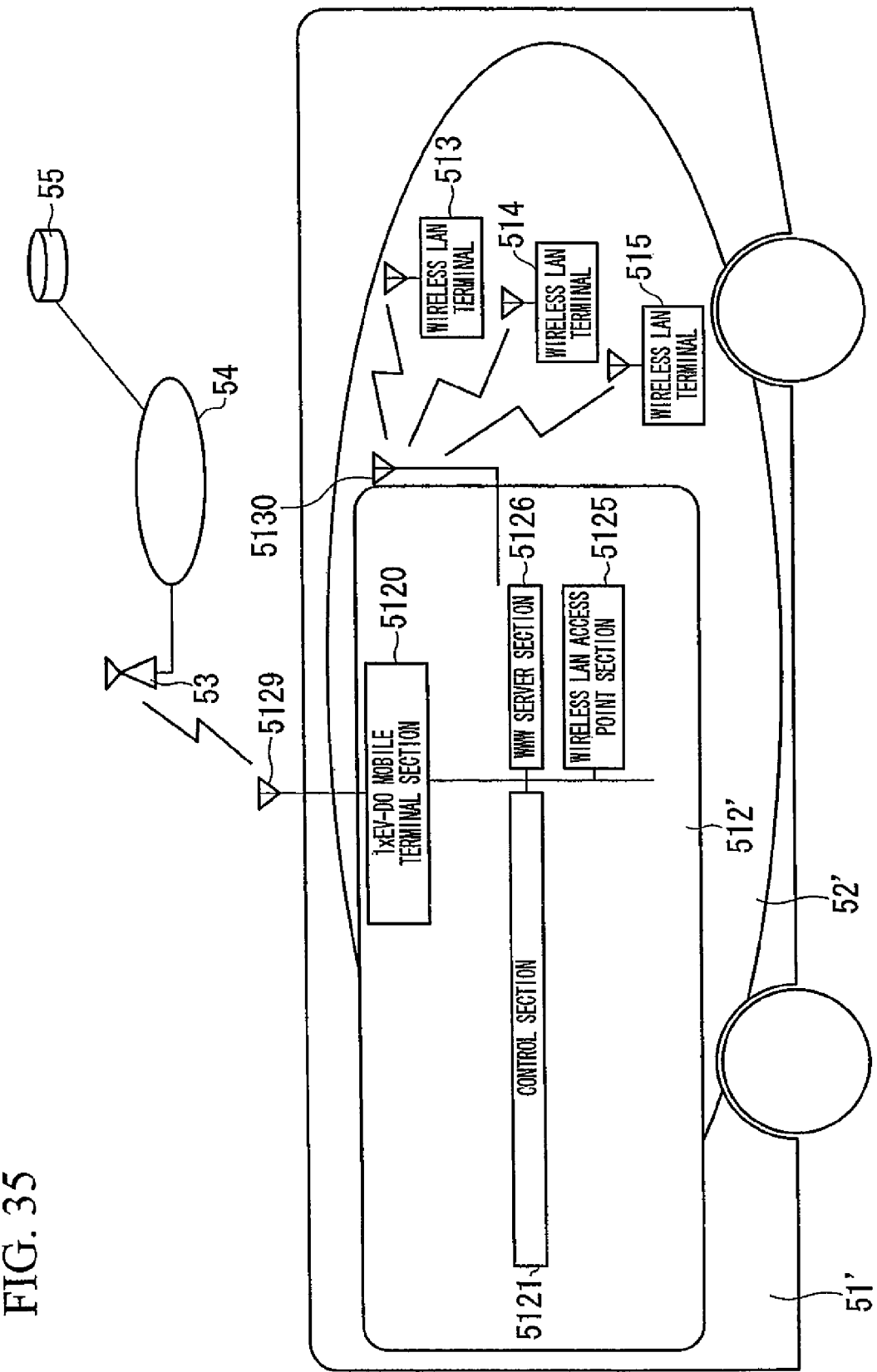
FIG. 35 is a structural figure of a communication system in a moving vehicle.

FIG. 35 is a structural view showing the communication system in the moving vehicle. The wireless repeater device 512' of the moving vehicle 51' is connected to a network 54 via a base station 53 of the 1xEV-DO (1x Evolution Data Only) type, and moreover a WWW server 55 which provides web information is connected to the network 54. Furthermore, the wireless repeater device 512' in the interior of the moving vehicle 51' and wireless LAN terminals 513, 514, and 515 which are owned by the various passengers are present within the area of a local network 52' of a wireless LAN access point section 5126 which is included in the wireless repeater device 512'. Due to this, each of the passengers is able to download from the web server 55 the web information which he desires into his own one of the wireless LAN terminals 513, 514, and 515 via the wireless repeater device 512'.

However, with a communication system as shown in FIG. 35, each of the wireless LAN terminals 513, 514, and 515 cannot download information or the like related to the stopping points for the vehicle at which the passengers will want to get off the vehicle. In other words, with the communication system technology shown in FIG. 35, from the point of view of a person who is riding upon the bus or the like, he is not able to know after approximately what time period the bus will arrive at the stopping point which is his personal objective. Furthermore, when the stopping point at which a passenger who is riding upon the bus has decided to get off the bus has become the next stopping point, although he indicates his intention to get off the bus to the attendant by pressing a getting off button which is provided within the bus, it sometimes may happen that, undesirably, he goes past his desired stop because he cannot press the getting off button when he tries to do so, because of congestion within the bus which prevents him reaching the getting off button. Yet further, although the next stopping point for the bus may be displayed to the passengers by broadcasting an announcement within the bus of the next stopping point, or by displaying an announcement of the next stopping point upon a notice board upon the front of the bus, since various passengers within the moving vehicle such as a bus are all present at the same time and riding in the bus, sometimes it happens that such a broadcast within the bus is not heard (or at least not noticed) due to conversation between the passengers, or that a passenger cannot easily see the notice board because his seat happens to be located in a dead corner of the bus. Or, if his seat happens to be at the rear of the bus, the condition also sometimes occurs that he is not able to know what is the next stopping point of the bus, because a tall person happens to be sitting or standing in front of him, so that he cannot easily see the notice board.

Furthermore, if this is a bus which is used every day by the same persons, such as one which carries commuters or school children, then, although it is possible for the persons who are familiar with the route of the bus to know the next stopping point of the bus by watching the external scenery without listening to a broadcast within the vehicle and without watching the notice board or the like, on the other hand, in the case of a person who is riding upon the bus for the first time, he cannot make a decision as to whether or not the next stopping point is the stopping point at which he wishes to get off if he does not know the name of the next stopping point, so that he may undesirably pass his desired alighting point. Furthermore, in the case of a passenger who has been dozing or the like, he may undesirably miss the broadcast within the vehicle of the name of the next stopping place, and when he wakes up it may happen that the situation occurs that he becomes confused by the external scenery and presses the getting off button, so that if, for example, he takes notice directly before passing the stopping point, the driver may abruptly apply the brakes of the vehicle in order to stop the vehicle, or the situation may occur that the vehicle changes its running lane abruptly, or the like, and thereby a situation may take place in which the behavior of the bus as viewed in traffic becomes improper and undesirable.

Thus, with the present invention, the traffic management system is set up to be very convenient to use from the point of view of the passenger, since the exact traffic information or the exact getting off information is notified to the portable terminal which is being carried by the passenger within the moving vehicle such as a bus or a train or the like. In the following, the details of this traffic management system according to this preferred embodiment of the present invention will be explained in detail with reference to the drawings.

Figure 31:
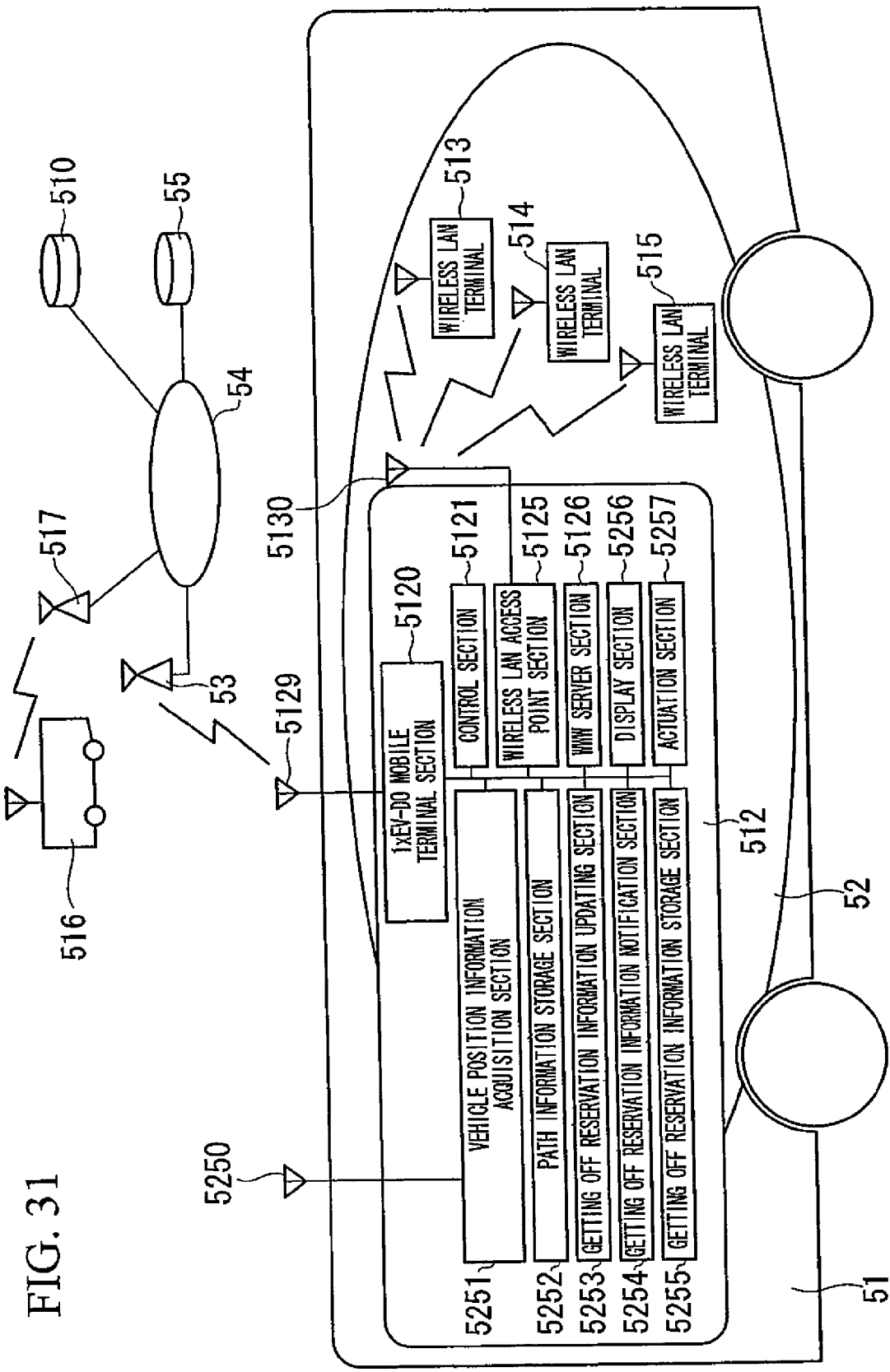
FIG. 31 is a schematic figure showing the structure of a traffic management system according to a preferred embodiment of the present invention.

FIG. 31 is an overall view showing the structure of a traffic management system according to the present invention. With the traffic management system of FIG. 31, a wireless repeater device 512 of the moving vehicle 51 is connected to a network 54 via a 1xEV-DO base station 53. Furthermore, a moving vehicle 516 of an identical structure to the moving vehicle 51 is also connected to the network 54 via a 1xEV-DO base station 517. Yet further, to the network 54 there are also connected a data center 510 which performs integrated management of data related to traffic information and a WWW server 55 which provides web information (internet information). Moreover, a wireless repeater device 512 is provided within the moving vehicle 51, and also passengers are riding within the moving vehicle 51 who own individual wireless LAN terminals 513, 514, and 515. Yet further, the interior of the moving vehicle 51 constitutes the interior of a local network 52 of a wireless LAN access point section 5125 which is included in the wireless repeater device 512.

Furthermore, the wireless repeater device 512 comprises a 1xEV-DO mobile terminal section 5120, a control section 5121, a wireless LAN access point section 5125, the WWW server section 5126, a vehicle position information acquisition section 5251, a path information storage section 5252, a getting off reservation information updating section 5253, a getting off reservation information notification section 5254, a getting off reservation information storage section 5255, a display section 5256, and an actuation section 5257. It should be understood that the structure of the wireless repeater device for the moving vehicle 516 is exactly the same. Accordingly, in the following explanation, only the wireless repeater device 512 of the moving vehicle 51 will be described.

The 1xEV-DO mobile terminal section 5120 of the wireless repeater device 512 can connect wirelessly with a 1xEV-DO base station 53 external to the moving vehicle 51. Furthermore, this 1xEV-DO base station 53 is connected to the network 54 via a cable, and thus is capable of communicating with the WWW server 55 which are present upon the network 54 and with the data center 510. Even further, via the antenna 5250, the vehicle position information acquisition section 5251 can specify the position of the vehicle by a GPS or the like which is not shown in the figure. Moreover, it is possible to access a getting off reservation page of the WWW server section 5126 of the wireless repeater device 512 from the wireless LAN terminals 513, 514, and 515.

With this getting off reservation page of the WWW server section 5126, along with reading out the vehicle position which has been acquired by the vehicle position information acquisition section 5251, the traffic path information and the map information for the moving vehicle 51 are also read out from the path information storage section 5252. And, based upon the traffic path and the map information, a display process is performed according to the present position of the moving vehicle 51, and, for example, the position information for the moving vehicle 51 is displayed upon the wireless LAN terminal 513 which has made access. Furthermore, when the stopping point at which the passenger plans to get off is selected from the wireless LAN terminal 513, the getting off reservation information updating section 5253 stores a recognition code (for example, an IP address for connection to the internet or a MAC address for identifying the information device which is connected to the LAN, or a recognition code which has been distributed by the wireless repeater device, or the like) which identifies the stopping point at which the passenger plans to get off and his wireless LAN terminal 513 in the getting off reservation information storage section 5255.

Yet further, while the moving vehicle 51 is passing the stopping points in sequence, the getting off reservation information updating section 5253 reads out, based upon the next stopping point information which is obtained from the vehicle position information acquisition section 5251 and the path information storage section 5252 of the moving vehicle 51, the getting off reservation information which is stored in the getting off reservation information storage section 5255, and makes a decision as to whether or not there exists a getting off reservation for the next stopping point. And, if indeed there exists such a getting off reservation, it transmits the getting off information as a notification message to the wireless LAN terminal 513 which corresponds to the recognition code which has been set up in association with this next stopping point. Although, in the above, the explanation has been made in terms of the wireless LAN terminal 513 having accessed the wireless repeater device 512, if the wireless LAN terminals 514 or 515 access the wireless repeater device using the same method, they can also receive similar getting off information from the wireless repeater device 512 as a notification message.

Figure 32:
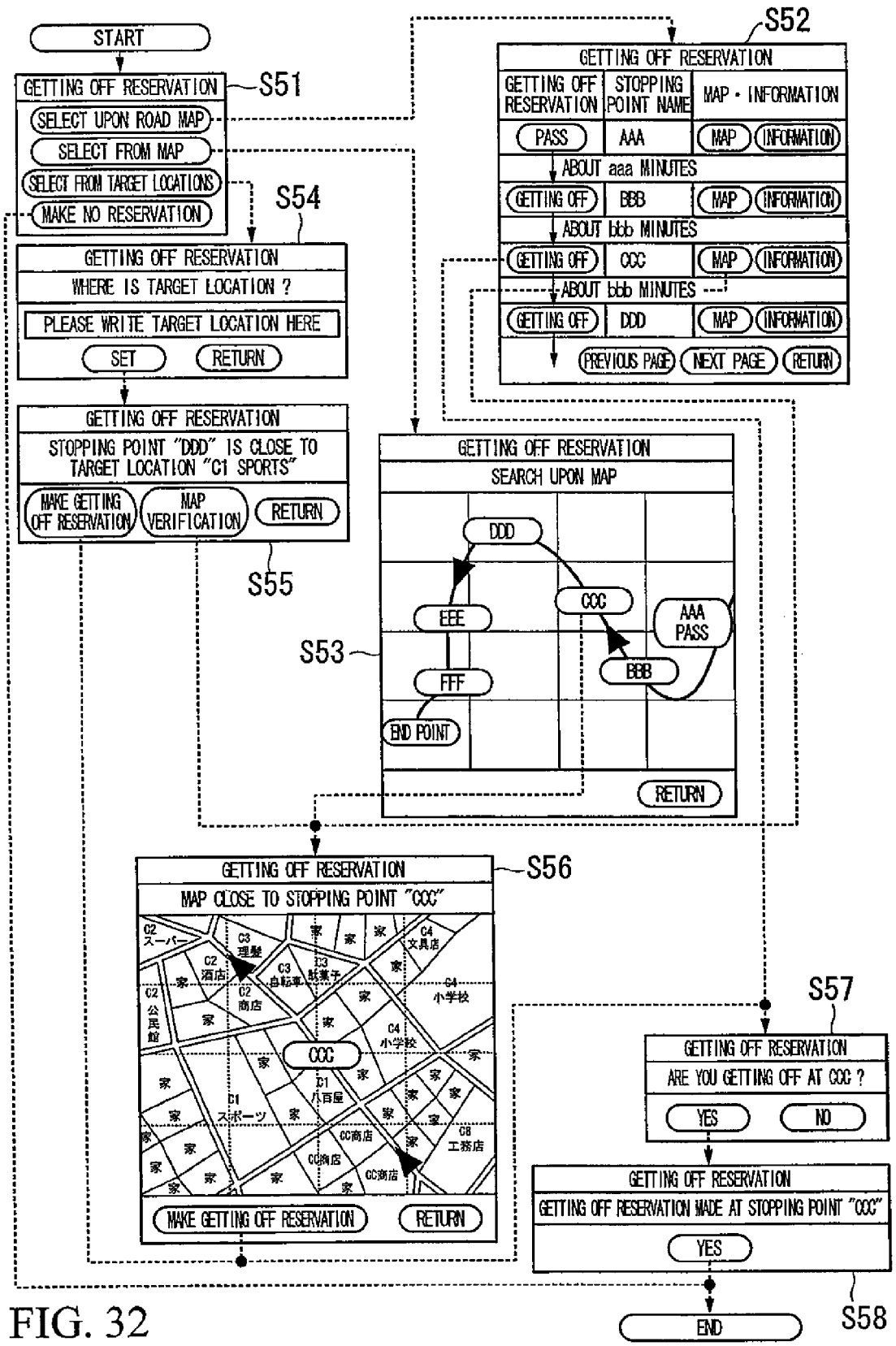
FIG. 32 is an explanatory figure showing the flow of a procedure which is executed when any one of the wireless LAN terminals in the traffic management system of FIG. 31 makes a getting off reservation for a wireless repeater device.

FIG. 32 is an explanatory figures showing the flow of a procedure which is executed, with the traffic management system of FIG. 31, in the case that any one of the wireless LAN terminals makes a getting off reservation with the wireless repeater device. Accordingly, the flow of this getting off reservation procedure will be explained with reference to FIGS. 31 and 32. First, when a getting off reservation screen for the wireless repeater device 512 is opened by the wireless LAN terminal which is being carried by a passenger who is riding upon the moving vehicle 51, three methods are displayed as methods of specifying a getting off stopping point (in a step S51): "selection from road map", "selection from map", and "selection from list of target locations".

If in the step 51 the item "selection from road map" has been selected, along with displaying a map of the road upon which the bus is traveling at the present time, the names of stopping points, estimated journey times, and so on, for each stopping point of the bus, there are displayed upon the screen (in a step S52) a "getting off" button for making a getting off reservation, a "map" button for displaying a map of the area which includes the stopping point, and an "information" button for displaying information related to the vicinity of the stopping point. Here, when the passenger selects the "getting off" button for the stopping point at which he wishes to make a reservation for getting off, a getting off reservation re-verification screen "getting off at XXX?" is displayed (in a step S57). When the passenger selects the "yes" button on this screen, a getting off reservation for the said stopping point is stored in the getting off reservation information storage section 5255 of the wireless repeater device 512, and a reservation completed screen "getting off reservation made for stopping point XXX" is displayed, and the getting off reservation procedure is thereby completed (in a step S58).

Furthermore, if in the step 51 the item "selection from map" has been selected, then a map upon which the path has been written based upon the current position of the moving vehicle 51 is displayed (in a step S53). Here, the legend "passed" is appended to stopping points which have already been passed. Furthermore, by selecting the button for the desired stopping point (for example "CCC"), it is possible for the passenger to display an enlarged map which includes this stopping point "CCC" which has been selected (in a step S56). Here, if the passenger selects the button "make a getting off reservation", then the screen for re-verifying the getting off reservation "getting off at XXX?" is displayed (in the step S57). Furthermore, when the passenger selects the "yes" button, a getting off reservation for the said stopping point is stored in the getting off reservation information storage section 255 of the wireless repeater device 512, and the reservation completed screen "getting off reservation made for stopping point XXX" is displayed, and the getting off reservation procedure is thereby completed (in the step S58).

Yet further, if in the step 51 the item "selection from list of target locations" has been selected, a screen for input of the name of the target location is displayed (in a step S54). Here, when the passenger inputs the name of the stopping location which is his objective, and selects the "accept" button, the name of this target location and the name of the closest stopping point (for example "CCC") are displayed (in a step S55). Furthermore, when the "verify map" button is selected, a map which includes the said stopping point is displayed (in a step S56). Moreover, if it is possible to display the target location within this map, the position of the target location is shown on the map by a flashing display so as to make it easy to recognize it by eye, and/or it may be displayed in a different color. Yet further, at the same time, it is also possible to draw upon the map a line which shows a path from the stopping point to the objective (the target location). Furthermore, by selecting the button for the desired stopping point (for example "CCC"), it is possible for the passenger to display an enlarged map which includes this stopping point "CCC" which has been selected (in a step S56). And, if the passenger selects the button "make a getting off reservation", then the screen for re-verifying the getting off reservation "getting off at XXX?" is displayed (in the step S57). Furthermore, when the passenger selects the "yes" button, a getting off reservation for the said stopping point is stored in the getting off reservation information storage section 255 of the wireless repeater device 512, and the reservation completed screen "getting off reservation made for stopping point XXX" is displayed, and the getting off reservation procedure is thereby completed (in the step S58).

It should be understood that, for the estimated travel time between stopping points which is given upon the "select from road map" screen of the step S52, if, for example, each of the moving vehicles transmits the time instants of arrival, departure, and transit for each of the stopping points to the data center 510 via the 1xEX-DO wireless transmission circuit net and the network 54, then, based upon the time instants of arrival, departure, and transit which have been obtained from a moving vehicle which has previously passed along the same road, the data center 510 can estimate the anticipated transit times for this moving vehicle which is passing along the road after said previous vehicle, and can transmit these anticipated transit times from the data center 510 to the moving vehicle 51.

Furthermore, if a getting off reservation is stored in the getting off reservation information storage section 5255, it is supposed that, apart from the stopping point for which this getting off reservation has been made, a recognition code which can identify the wireless LAN terminal which has made the reservation (for example, an IP address, a MAC address, or a recognition code which has been allocated to the wireless repeater device 512 or the like) has been stored at the same time. By doing this and storing the recognition code at the same time, if and when the next stopping point is the stopping point at which the passenger plans to get off, it is possible to notify that the next stopping point is the one for which the reservation is made to the device with the recognition code for which a getting off reservation has been made for this stopping point (in other words, to the wireless LAN terminal from which the reservation was made). It should be understood that it would also be possible to arrange for this notification to be performed via an audio message such as a beep or the like. Moreover, although the matter is not particularly described herein, apart from making a getting off reservation in the above manner, it would also be possible to provide a change/deletion screen for changing or deleting the reservation stopping point at which the passenger desires to get off.

Figure 33:
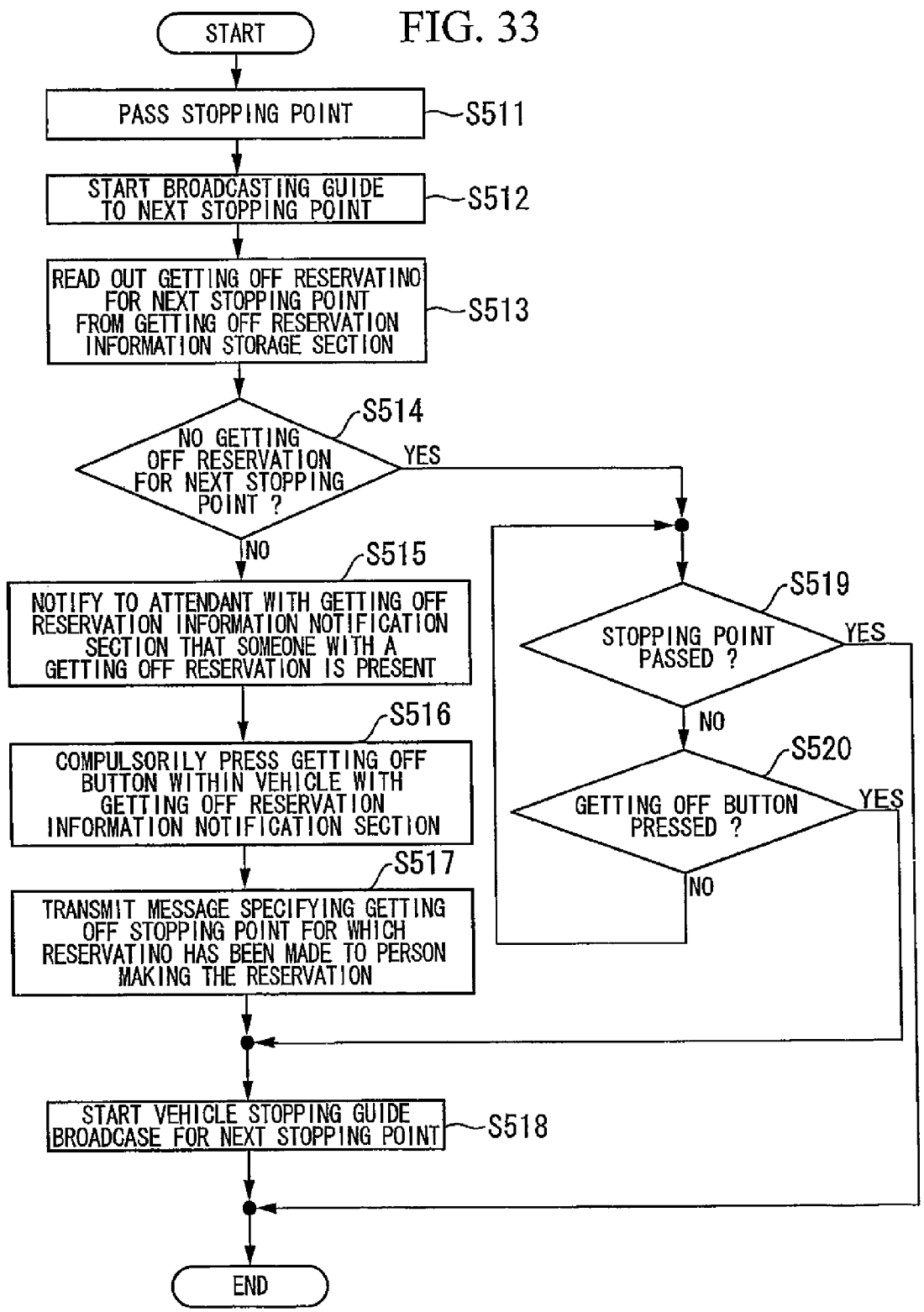
FIG. 33 is an example of a flow chart showing the flow of a reservation notification procedure in the traffic management system of FIG. 31.

FIG. 33 is an example of a flow chart which shows the flow of the reservation notification procedure in the traffic management system of FIG. 31. First, when the moving vehicle 51 passes some stopping point (in a step S511), a guide broadcast is started for the next stopping point (in a step S512). And the getting off reservation information for the next stopping point is read out from the getting off reservation information storage section 5255 (in a step S513), and the presence or absence of a getting off reservation is decided upon (in a step S514). Here, if there is a getting off reservation (the case of NO in the step S514), the getting off reservation information notification section 5254 notifies the vehicle attendant to the effect that a getting off reservation is present (in a step S515). Furthermore, the getting off button within the vehicle is forcibly pressed, so that this getting off button is illuminated, and the buzzer sounds (in a step S516). By doing this, along with notifying to all of the passengers in the vehicle that the vehicle is going to stop at the next stopping point, also the attendant is warned to stop the vehicle there. Furthermore, a message is notified to the person who made the getting off reservation that the next stopping point is the one for which he made the getting off reservation (in a step S517). And a guide broadcast is emitted within the vehicle to the effect that the vehicle is going to stop at the next stopping point (in a step. S518).

Furthermore, if the result of the decision as to the presence or absence of a getting off reservation in the step S514 is that no getting off reservation has been made for the next stopping point (YES in the step S514), then as in the prior art the moving vehicle 51 continues to be driven while a decision is made as to whether or not to pass the predetermined starting point (in a step S519), and a decision is made as to whether or not the getting off button has been pressed (in a step S520). Furthermore, when each stopping point is passed, the steps of the above procedure are started again from the step S511 for the next stopping point, and the previously described procedure is thereby repeated.

Figure 34:
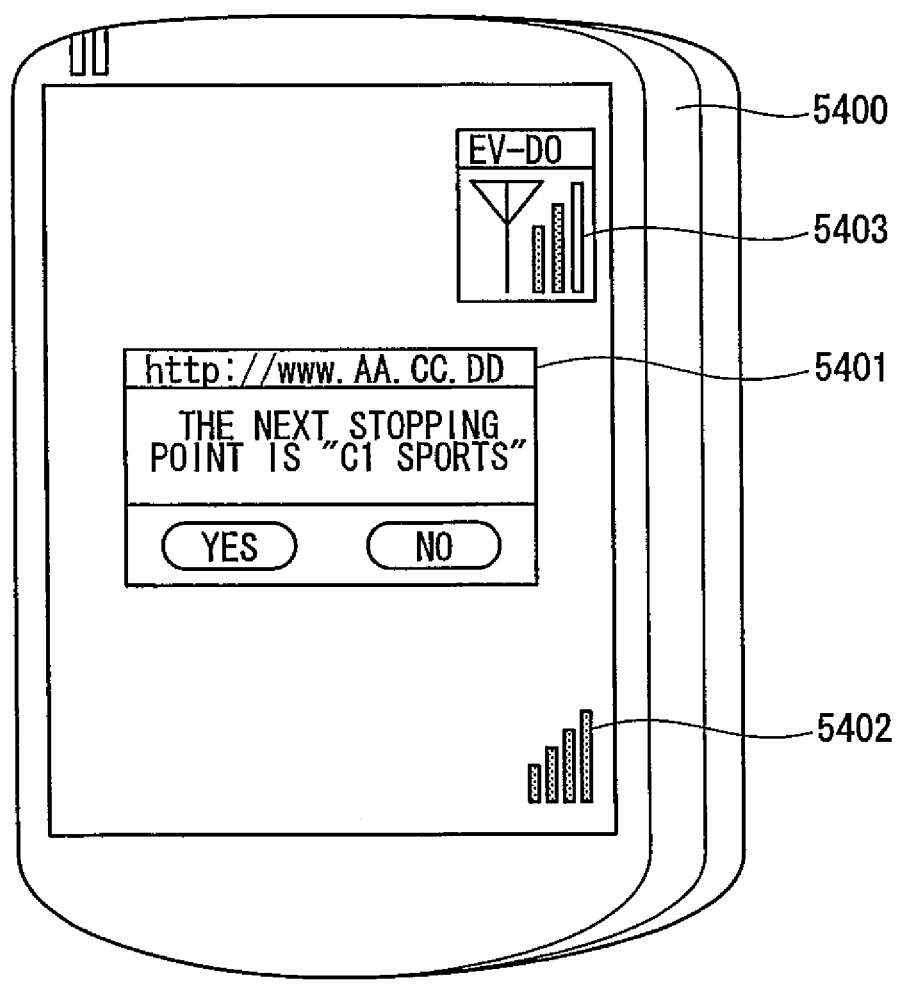
FIG. 34 is a figure showing an example of notification of a next getting off stopping point which has been displayed upon a PDA by this traffic management system.

FIG. 34 is a figure showing an example of notification of the next getting off stopping point which has been displayed upon a PDA (Personal Digital Assistant) by the traffic management system. As shown in FIG. 34, if a passenger has registered upon a PDA 5400 which is endowed with a wireless LAN communication function, as a getting off reservation, that his stopping point is the next stopping point, then a message to this effect is notified via the wireless LAN of the local network 52 from the wireless repeater device 512 of FIG. 31, and this notification message 5401 is displayed upon the screen of this PDA 5400 of the passenger (for example, upon the wireless LAN terminal 51 of FIG. 31). Furthermore, at the same time, when a message is generated by vibrating the case of the PDA 5400, or a sound message is generated from a speaker which is not shown in the figures, and is received by the passenger who owns the PDA 5400, this passenger is able to know that the next stopping point is the stopping point for which he has made the getting off reservation.

By doing this, even if the passenger has been dozing or the like, the undesirable occurrence of his going past his desired stopping point for which he has made a reservation and not being able to get off there can be prevented in advance. Furthermore by verifying, when the vehicle stops at the stopping point at which the passenger plans to get off, whether or not the recognition code of the PDA 5400 for which the getting off reservation has been made is still a recognition code of a wireless LAN terminal which is present within the moving vehicle, it is possible for the vehicle attendant to verify whether or not the passenger is actually going to get off at this stopping point for which he has made a reservation.

Here, the format for transmission of a notification message from the wireless repeater device 512 of FIG. 31 to the PDA 5400 of FIG. 34 will be explained. When, for example, the wireless LAN terminal 513 of FIG. 31 has been connected to the wireless repeater device 512, wireless electromagnetic waves are generated from the 1xEV-DO mobile terminal 5120 of the wireless repeater device 512 and are transmitted to the 1xEV-DO base station 53 external to the moving vehicle 51 via the antenna 5129. Due to this, software (for example, software which is set up in Java (a registered trademark)) which displays the EV-DO antenna 5403 upon the PDA 5400 which indicates the connection state from the wireless repeater device 512 to the 1xEV-DO base station 53 exterior to the moving vehicle 51 is executed, and a notification message is transmitted from the wireless repeater device 512 to the wireless LAN terminal 513 (in other words, to the PDA 5400).

Along with the wireless repeater device 512 of FIG. 31 being accessed in order to acquire information for displaying the antenna bar (the EV-DO antenna 5403 of FIG. 34), information is also acquired as to whether or not the next stopping point is the stopping point at which the passenger plans to get off. Here, if the next stopping point is in fact the stopping point at which the passenger plans to get off, a notification message 5401 to that effect is displayed upon the screen of the PDA 5400, thereby performing the desired notification procedure for the owner of the PDA 5400. Moreover, the software which displays the EV-DO antenna 5403 may also itself keep the stopping point at which the passenger plans to get off, and may make a decision based upon the information about the next stopping point which has been notified from the wireless repeater device 512 of FIG. 31. Furthermore, it would also be acceptable always to display the next stopping point, at the same time as displaying the EV-DO antenna 5403.

Furthermore, if the passenger normally gets off at the same stopping point (as in the case of a person who is going to work or a child who is going to school), a recognition code (for example, a MAC-ID) which identifies the wireless transmission terminal which the passenger owns may be combined with his getting off stopping point, and may be registered as normal getting off reservation information for getting off at the same stopping point in the getting off reservation information storage section 5255 of the wireless repeater device 512. By doing this, when a person (this passenger) who is carrying the wireless transmission terminal which this passenger owns gets into the vehicle, the recognition code of this wireless transmission terminal and the normal getting off reservation information which is stored in the getting off reservation information storage section 5255 are compared together, and, if the recognition code of this wireless transmission terminal is registered in the getting off reservation information storage section 5255, it is handled as a getting off reservation. In this manner, along with it being made unnecessary for this repeat passenger to set a getting off reservation each time he rides in the vehicle, also it is possible to alleviate the burden of traffic upon the wireless LAN within the vehicle.

Moreover, it would also be acceptable to provide a functional portion such as the wireless repeater device 512 which is related to setting getting off reservations and a device which is endowed with the function of acting as an access point for the wireless LAN at each of the stopping points of the vehicle, and to register the getting off reservation in the wireless repeater device which is provided at the stopping point, and, when said moving vehicle 51 has arrived at a stopping point, to transfer the getting off reservation information from the wireless repeater device at that stopping point to the wireless repeater device 512 within the moving vehicle 51. By doing this, it is possible for the user (the passenger) to perform setting of his getting off reservation at his stopping point of departure, while he is waiting for the arrival of the moving vehicle 51 at that stopping point. Furthermore it is also acceptable, when the moving vehicle 51 upon which the passenger wishes to ride has arrived at that stopping point, to transmit a notification message to the effect that the moving vehicle upon which the passenger desires to ride has arrived to the wireless transmission terminal at the stopping point at which the getting off reservation has been made, and to display upon this moving vehicle 51 information such as to make it possible to identify the vehicle, such as its destination or the like. By doing this, it is possible for the passenger to find the moving vehicle 51 which is his objective without making any mistake, and to get into that moving vehicle 51, even at a stopping point at which a plurality of moving vehicles upon different routes stop.

It should be understood that although, with the above described preferred embodiment of the present invention, the structure is such that a computer which is carried upon the vehicle (a sub-computer) fulfils the functions of the vehicle position information acquisition section 5251, the path information storage section 5252, the getting off reservation information updating section 5253, the getting off reservation information notification section 5254, the getting off reservation information storage section 5255, the display section 5256, and the actuation section 5257, it would also be possible, as an alternative, to make a structure in which all of these functions, or some of them, were entrusted to a host computer which was connected via a communication network to said sub-computer.

Furthermore, although this preferred embodiment of the present invention has been explained, by way of example, in terms of a bus being the moving vehicle, this should not be construed as being limitative of the present invention; in fact this preferred embodiment of the present invention may equally well be applied to a moving vehicle which is a vehicle of some other type, such as a train or the like. Yet further, although this preferred embodiment of the present invention has been explained, by way of example, in terms of the public communication external to the moving vehicle being a net according to the 1xEV-DO standard, this should not be construed as being limitative of the present invention; it would also be possible to utilize some other type of wireless transmission means, such as a PHS network or a mobile telephone network or the like.

Next, a concrete preferred embodiment of the present invention will be explained in which, when the vehicle such as a bus or the like arrives at or passes a stopping point, the arrival time instant at, and/or the departure time instant from, the stopping point is estimated. First, information from various vehicles about the arrival time instants at and the departure time instants from stopping points, and the like, is uploaded to the management center. At this time, the relevant weather information is also uploaded to the management center.

By doing this, the management center is able to estimate the time instant that each of the vehicles will arrive at its next stopping point, based upon the arrival time instants at, and the departure time instants from, the various stopping points for the various vehicles. Furthermore, the management center calculates the vehicle stopping times at the stopping points from the time instant information which it has acquired from each of the vehicles, and totals these items of time information according to the stopping points, the time instants, the weather, and the like. At this time, the management center estimates the time instant of arrival at the next stopping point, based upon the journey times for the vehicles which have previously traversed the same path. It should be understood that this estimation of the arrival time instant is performed by considering vehicles which do stop at the stopping point and vehicles which do not stop at the stopping point as traversing different paths.

Figure 36:
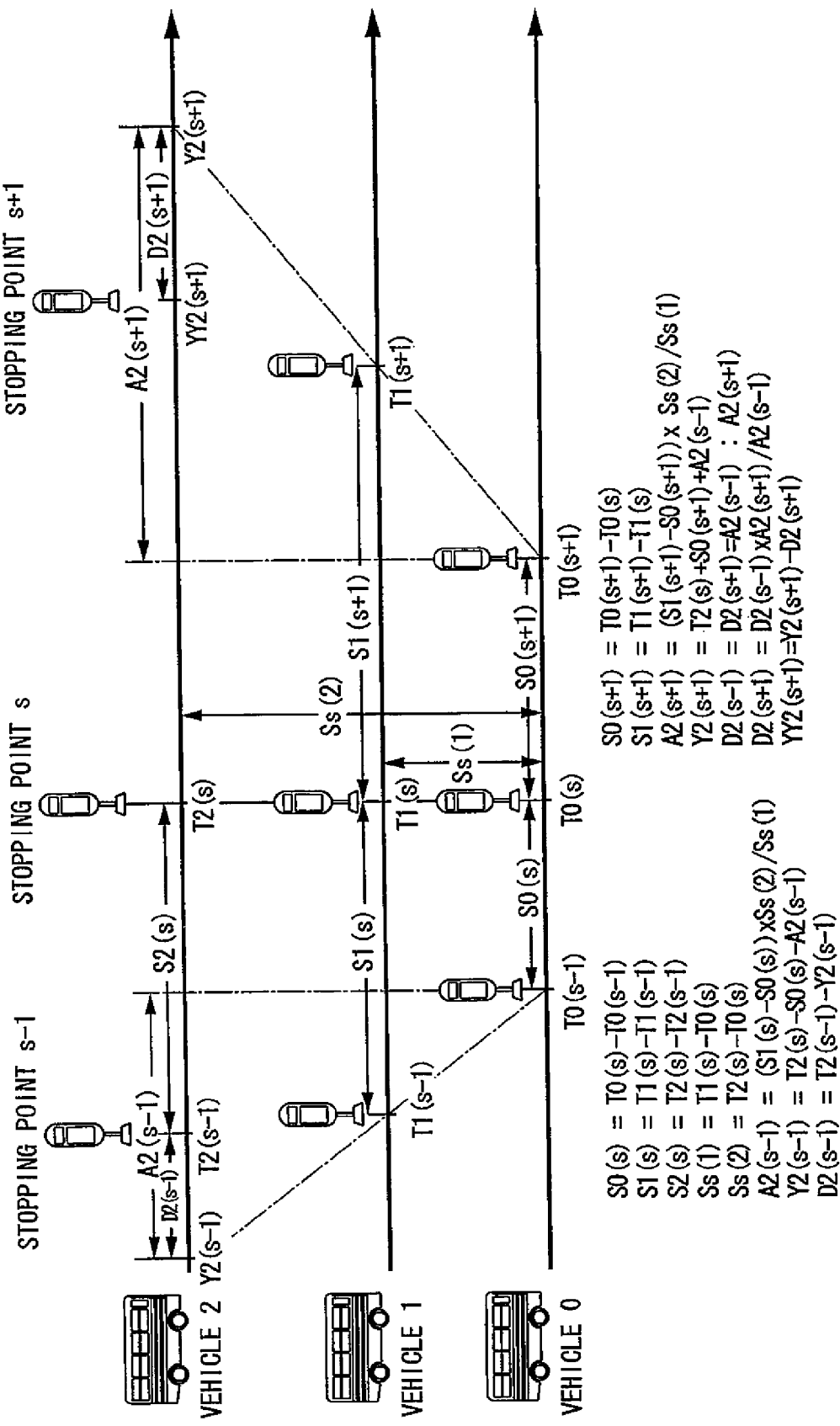
FIG. 36 is a schematic figure showing, in a preferred embodiment of the present invention, how an arrival time instant is estimated, if a vehicle does not stop at a stopping point.
Figure 37:
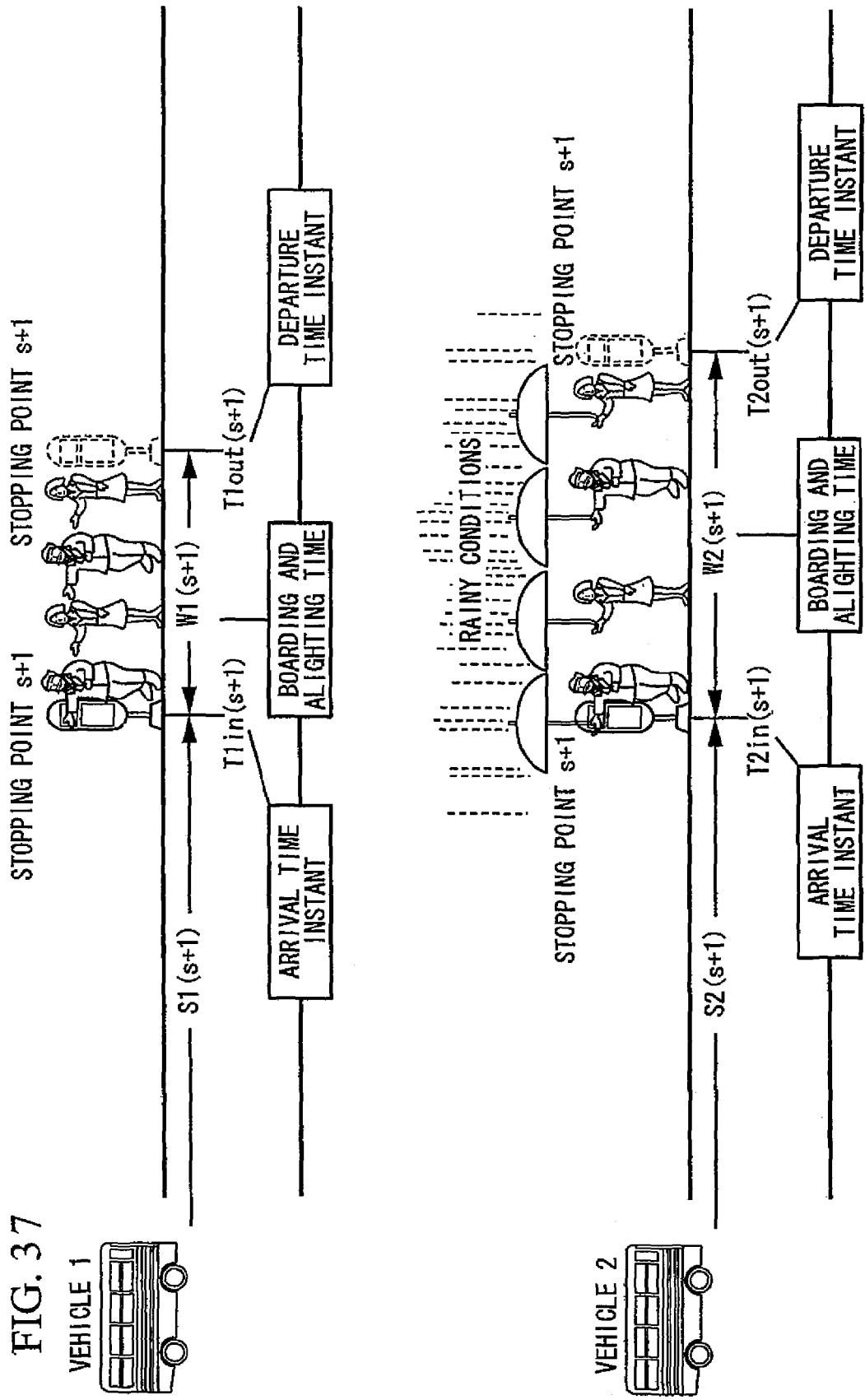

FIG. 36 is a schematic view showing, for this preferred embodiment of the present invention, how the estimation of the arrival time instant is performed in the case that the vehicle does not stop at the stopping point. Furthermore, FIG. 37 is a schematic view showing, again for this preferred embodiment of the present invention, how the estimation of the arrival time instant is performed in consideration of the number of passengers for the stopping point and the weather and so on. Yet further, FIG. 38 is a schematic view showing, again for this preferred embodiment of the present invention, how the calculation of the arrival time instant at the stopping point is performed.

Referring to FIG. 36, the vehicle 2 passes the stopping point S, and the time instant YY2(S+1) that it arrives at the stopping point S+1 is estimated based upon the data for the vehicle 0 and the vehicle 1 which have previously traversed the same path. It should be understood that, if the vehicle 2 stops at the stopping point S, data is used for a vehicle 0 and for a vehicle 1 which also have stopped at the same stopping point S. Furthermore, when estimating the arrival time instant at a stopping point S+n which is further on, this is performed using statistical values which have been accumulated in a data base for the vehicle stopping time (the boarding and alighting time) at each of the stopping points which are present between the stopping point S and the stopping point S+n. It should be understood that, since statistical values are accumulated in the data base while taking account of the number of passengers for the stopping points, the time instants, the weather, and so on, as shown in FIG. 37, accordingly said statistical values are acquired from the data base and are used for obtaining the arrival time instant and the departure time instant for each stopping point.

Figure 38:
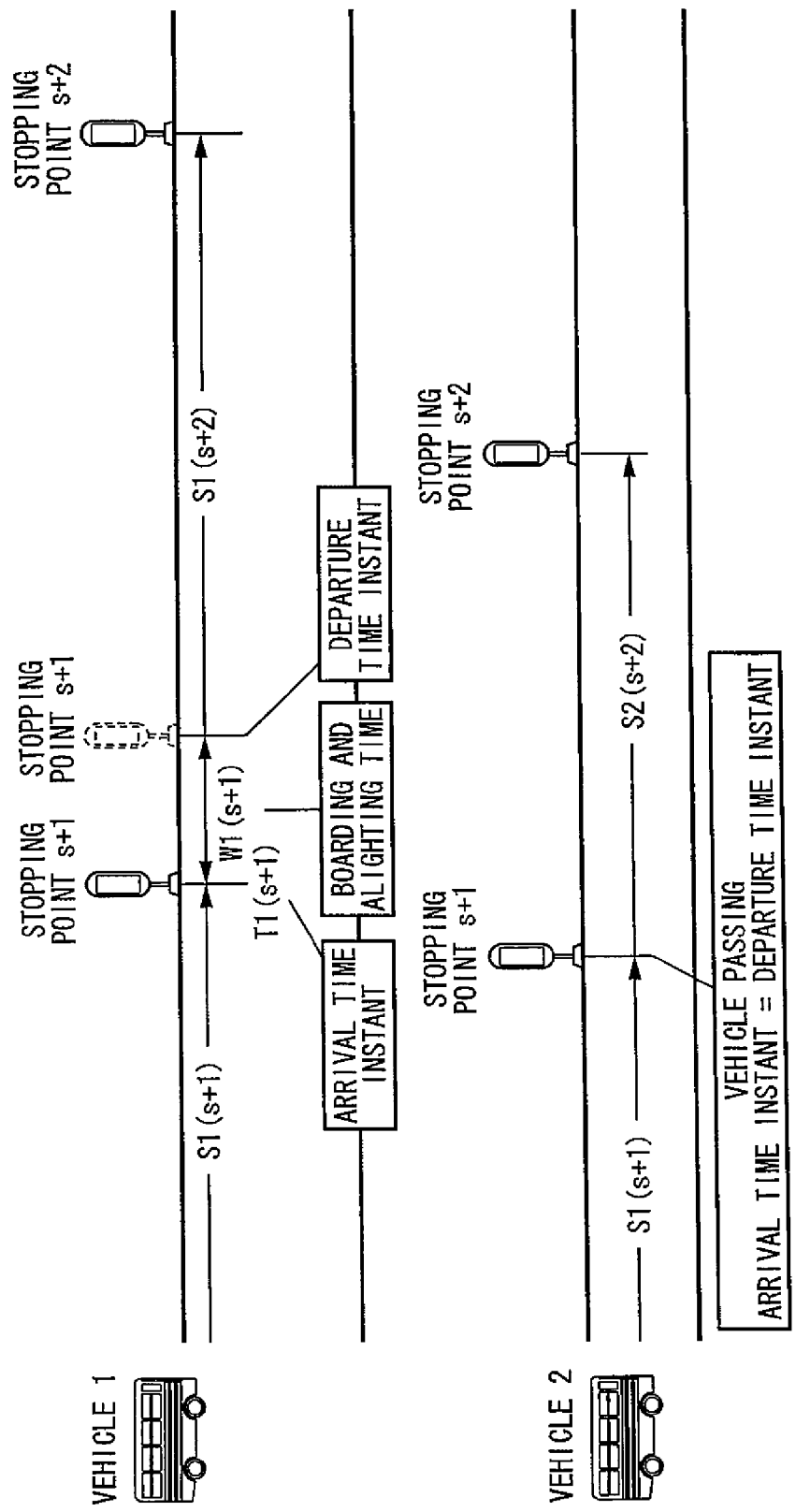
FIG. 38 is a schematic figure showing, in a preferred embodiment of the present invention, how an arrival time instant at a stopping point is obtained.

Next, referring to FIG. 38, the arrival time instant at the stopping point is obtained by calculation. In other words, the arrival time, instant at the stopping point S+2 is obtained by the following method:

[arrival time instant at stopping point S+2]=[arrival time instant at stopping point S+1](T1(S+1))+ vehicle stopping time at stopping point S+1](W1(S+1)+[journey time from stopping point S+1 to stopping point S+2](S1(S+2)).

Figure 39:
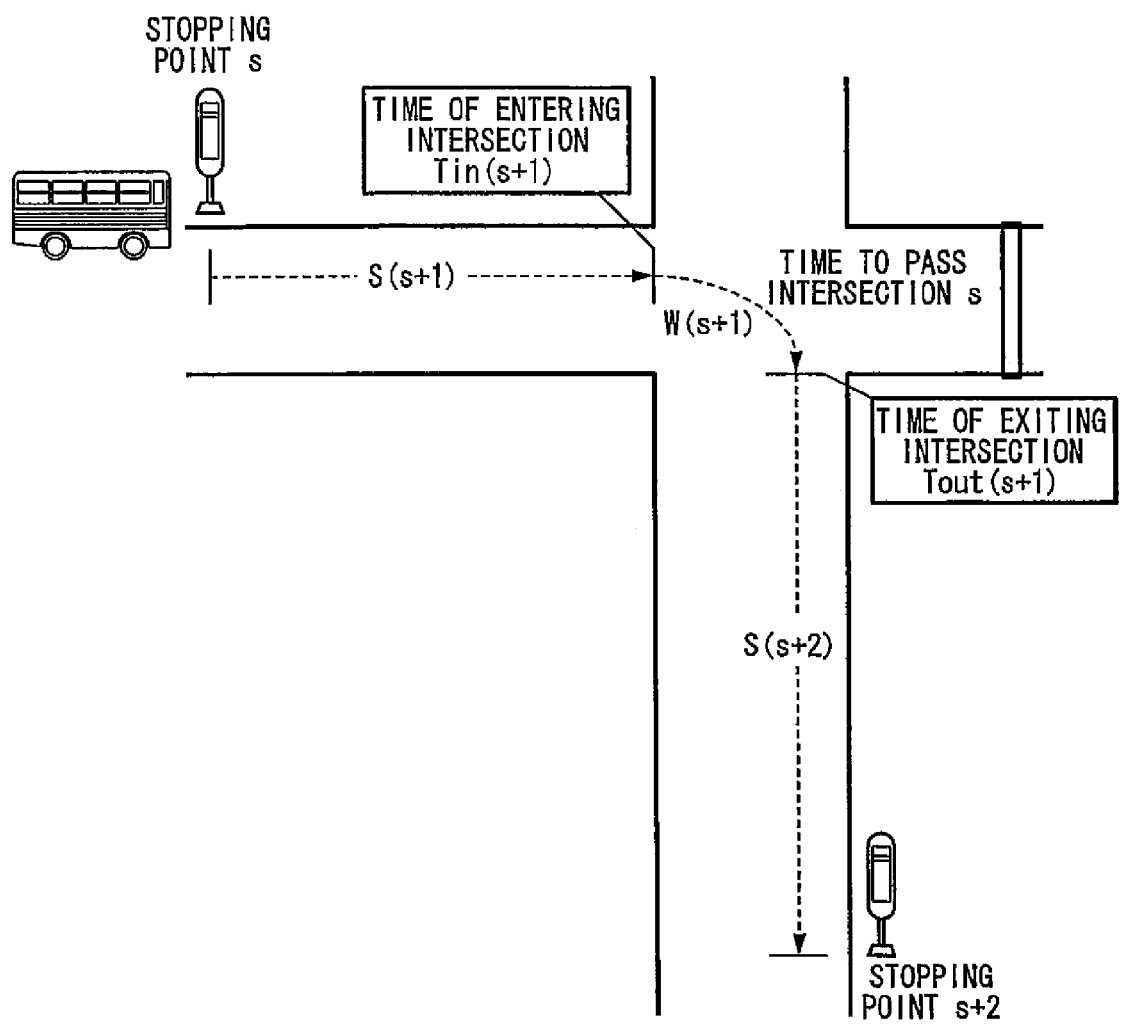
FIG. 39 is a schematic figure showing, in a preferred embodiment of the present invention, how an arrival time instant is estimated, in consideration of the traffic conditions in the vicinity of intersections.

FIG. 39 is a schematic figure showing, for this preferred embodiment of the present invention, the estimation of arrival time instant when traffic conditions in the vicinity of an intersection are considered. As shown in this figure, in the vicinity of the intersection, road conditions are occurring in which the path up to the intersection is congested and, when the intersection is crossed, the congestion disappears; while the opposite road conditions are occurring. Due to this, in the estimation of journey time, an estimate is made by dividing the intersection at this sequence as a branch point. It should be understood that, in order to perform the estimation of the arrival time instant in consideration of this kind of road conditions, it is necessary to upload the time instant at which each of the vehicles enters the intersection and the time instant at which it leaves the intersection to the data center.

Furthermore, if an accident has occurred, the position at which the accident has occurred is uploaded to the data center as GPS coordinates by the driver of the vehicle who has recognized said accident, and correction processing is performed by adding, to the estimated arrival time instant for the following vehicle or vehicles, an excess time period item which is determined according to the seriousness of the accident and according to its potential to cause ongoing obstruction.

It should be understood that although, in the above explanation, as the time instant for uploading to the data center, the stopping point and the arrival time instant at the intersection, or the departure time instant were suggested by way of example, the present invention should not be considered as being limited by these possibilities, which are only suggestions. Furthermore, with the objective of enhancing the accuracy of the results of estimating the arrival time instants and the departure time instants, it is desirable to separate the distance between the stopping points into shorter intervals, and to perform the uploading of the data in each of those intervals. By doing this, it becomes possible to estimate the arrival time instant more accurately, even if the distance between the stopping points is long, or a longer time period than usual is required because of congestion due to an accident or the like.

Figure 40:
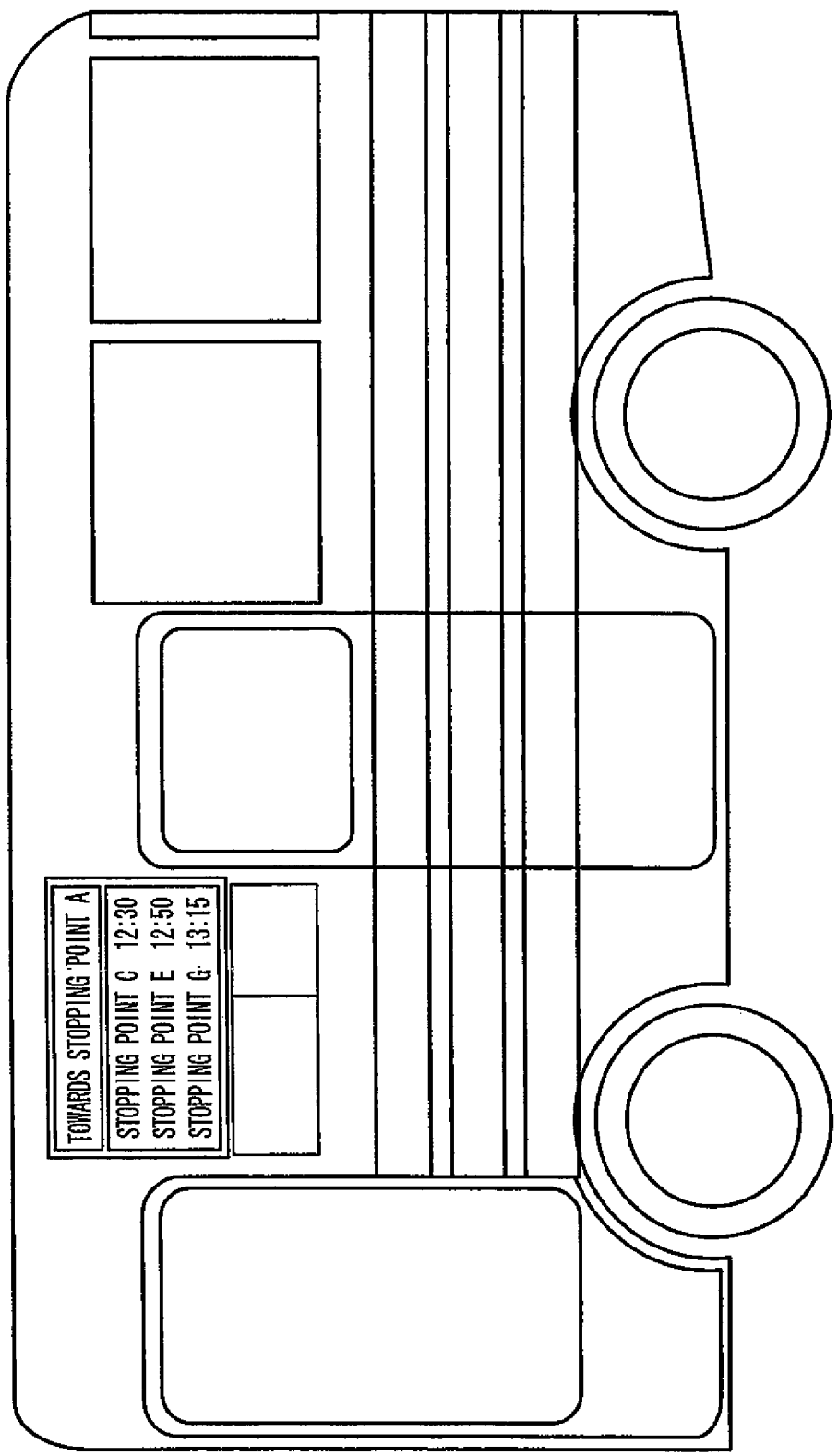
FIG. 40 is a schematic figure showing, in a preferred embodiment of the present invention, a state of display upon the outside of the vehicle of estimated arrival time instants at stopping points.

FIG. 40 is a schematic figure showing, for this preferred embodiment of the present invention, the state of a display upon the exterior of the vehicle of estimated arrival time instant at various stopping points. As shown in FIG. 40, by displaying the estimated arrival time instants at stopping points upon the outside of the vehicle, it is possible to inform the approximate arrival times of the bus to the passengers before they mount into the bus. Furthermore, it would be possible to provide the same time instant information from a server over the internet.

As has been explained above, with the traffic management system according to the present invention, a wireless LAN is set up within a vehicle such as a bus or a train, and, via this wireless LAN, information is provided to the portable terminals which are owned by the passengers within the bus relating to stopping points such as stations or the like at which the passengers may get off from the bus. For example, as information which may be provided upon the portable terminals, the stopping point or station for getting off may be notified, the journey time to pass a stopping point or a station may be notified, or the like. Furthermore, in the case that the moving vehicle is a train, it would also be acceptable to arrange, when a commuter ticket is read in by a portable terminal, to derive the stopping station or the stopping time or the like automatically.

If getting off notification is provided to portable terminals, the stopping points at which the passengers who are riding upon the vehicle and are using portable terminals are registered in advance. When this is done, the host computer performs getting off notification at an appropriate timing to the portable terminal of a passenger who has thus registered after having passed the stopping point one before the one at which he wishes to get off. At this time, it is most desirable for the decision as to the position of the moving vehicle which the host computer performs to be made by referring to a GPS or to a map, but it would also be acceptable to decide this position according to information when an attendant in the vehicle operates a recorded getting off guide voice tape manually.

Furthermore, although it may be the case that the host computer is provided within the moving vehicle, or that it is provided at a command location on the ground, this makes no difference to its notification function, whichever the case may be. Furthermore, it would also be possible to receive only the position information from a command location on the ground, and for the identification of the portable terminals which have been registered to be processed within the moving vehicle. In other words, in this traffic management system, it would be possible to envisage various methods of subdividing its functions. To put it in another manner, although the traffic management system of the present invention is built up from a host computer which is provided upon the ground, a sub-computer which is carried in the moving vehicle, and portable terminals which are owned by the passengers who are traveling in the moving vehicle, the detailed manner in which the various functions of the system are allocated to these various elements is not particularly specified.

Furthermore, as a function which is similar to that of a car navigation device, it would also be possible for the present position of the moving vehicle to be decided upon by a system upon the host computer which is on the ground, and for the time instant at which a specified ground point is passed, and/or the time interval required, to be notified to the portable terminals by using the present position data and the actual traffic speed data. For example, if it is arranged to calculate the time period for passing to the next stopping point by utilizing, at the time point at which the previous stopping point is passed, of data such as the time period required by the bus which is running one before this bus and the like, then it is possible to estimate the time periods for passing the stopping points accurately by reflecting the congestion state of the road and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A communication apparatus, comprising:
   a generating unit which generates authentication information for a terminal apparatus;
   a storage unit which stores information related to said communication apparatus and said authentication information which is generated by said generating unit of said communication apparatus;
   a writing unit which writes said authentication information which has been generated and said information related to said communication apparatus which has been stored into a transportation payment card;
   an ejection unit which ejects said transportation payment card to the exterior of said communication apparatus;
   a communication unit which transmits and receives signals to and from a terminal apparatus to which said transportation payment card has been presented, based upon said information related to said communication apparatus which has been written into said transportation payment card;
   an acquiring unit which acquires authentication information from said terminal apparatus via said communication unit;
   an authentication unit which authenticates said terminal apparatus, based upon said authentication information which has been acquired and said authentication information which has been stored; and
   a permission unit which permits data communication between said terminal apparatus which has been authenticated and said communication unit.

2. A communication apparatus as described in claim 1, wherein, in the information related to said communication apparatus which is stored in said storage unit, there is included individual identification information for said communication apparatus, and frequency information.

3. A communication apparatus as described in claim 1, wherein the transportation payment card, into which said writing in unit has written said authentication information which has been generated and said information related to said communication apparatus which has been stored, is a transportation payment card whose main purpose is some other purpose than having said authentication information which has been generated and said information related to said communication apparatus which has been stored written into it.

4. A communication apparatus as described in claim 1, further comprising a repeater unit which repeats to said network data which is the object of communication with said terminal apparatus which has been authenticated.

5. A terminal apparatus, comprising:
- a presentation reception unit which physically receives presentation from an external apparatus of a transportation payment card into which information related to a communication apparatus which is an object of communication, and authentication information, have been written;
- an acquisition unit which acquires, from said transportation payment card which has been presented and received, said information related to said communication apparatus which is an object of communication, and said authentication information;
- a communication unit which transmits and receives signals to and from said communication apparatus which is an object of communication, based upon said information related to said communication apparatus which is an object of communication which has been acquired;
- a generating unit which generates, from said authentication information which has been acquired, a signal for an authentication procedure for said communication apparatus which is an object of communication; and
- the communication unit transmits said signal for said authentication procedure which has been generated to said communication apparatus.

6. A terminal apparatus as described in claim 5, wherein said transportation payment card which has been presented to said presentation reception unit is a transportation payment card whose main purpose is some other purpose than having said information related to said communication apparatus which is the object of communication and said authentication information written into it.

7. A terminal apparatus as described in claim 5, wherein, in said information related to said communication apparatus which is the object of communication which has been acquired by said acquisition unit, there is included individual identification information for said communication apparatus which is the object of communication, and frequency information.

8. A method for authentication, comprising:
- writing by a communication apparatus information related to said communication apparatus and authentication information into a transportation payment card, before establishing communication with a terminal apparatus,
- performing transmission and reception of signals to and from said communication apparatus, by said terminal apparatus which has received presentation of said storage medium, based upon said information related to said communication apparatus which has been written into said transportation payment card, and
- permitting data communication based upon said authentication information.

* * * * *